(12) United States Patent
Banu et al.

(10) Patent No.: US 8,611,959 B2
(45) Date of Patent: Dec. 17, 2013

(54) LOW COST, ACTIVE ANTENNA ARRAYS

(75) Inventors: Mihai Banu, New Providence, NJ (US); Yiping Feng, North Brunswick, NJ (US); Vladimir I. Prodanov, San Luis Obispo, CA (US)

(73) Assignee: Blue Danube Labs, Inc., New Providence, NJ (US)

( * ) Notice: Subject to any disclaimer, the term of this patent is extended or adjusted under 35 U.S.C. 154(b) by 59 days.

(21) Appl. No.: 13/173,300

(22) Filed: Jun. 30, 2011

(65) Prior Publication Data

US 2012/0142280 A1 Jun. 7, 2012

Related U.S. Application Data

(60) Provisional application No. 61/360,737, filed on Jul. 1, 2010.

(51) Int. Cl.
*H04M 1/00* (2006.01)
*H04B 1/04* (2006.01)

(52) U.S. Cl.
USPC .... 455/562.1; 455/13.3; 455/129; 455/276.1; 330/101; 375/356

(58) Field of Classification Search
USPC ............ 455/12.1, 13.3, 107, 129, 275, 276.1, 455/561, 562.1; 330/100, 101; 375/356
See application file for complete search history.

(56) References Cited

U.S. PATENT DOCUMENTS

| | | | |
|---|---|---|---|
| 5,243,703 A | 9/1993 | Farmwald et al. | |
| 5,361,277 A | 11/1994 | Grover | |
| 5,712,822 A | 1/1998 | Petrosino | |
| 6,511,020 B2 * | 1/2003 | Higgins | 455/12.1 |
| 6,531,358 B1 | 3/2003 | Yu | |
| 6,563,358 B1 | 5/2003 | Goulette | |
| 8,259,884 B2 * | 9/2012 | Banu et al. | 375/356 |
| 2009/0086867 A1 | 4/2009 | Banu et al. | |

OTHER PUBLICATIONS

International Search Report issued for PCT/US2011/042527, dated Nov. 10, 2011 (2 pages).
Parker, D. and Zimmermann, D. "Phased Arrays—Part I: Theory and Architectures," IEEE Trans. Microwave Theory and Techniques, vol. 50, Mar. 2002 (10 pages).
Parker, D. and Zimmermann, D. "Phased Arrays—Part II: Implementations, Applications, and Future Trends," IEEE Trans. Microwave Theory and Techniques, vol. 50, Mar. 2002 (11 pages).
Prodanov, V. and Banu, M. "GHz Serial Passive Clock Distribution in VLSI Using Bidirectional Signaling," Proceedings, 2006 IEEE Custom Integrated Circuits Conference (4 pages).
Thompson, A.R. et al., "Design of the Analog Receiving System," Interferometry and Synthesis in Radio Astronomy, (22 pages) (2001).

* cited by examiner

*Primary Examiner* — Quochien B Vuong
(74) *Attorney, Agent, or Firm* — Wilmer Cutler Pickering Hale and Dorr LLP

(57) ABSTRACT

A transmitter system including: a bidirectional signaling (BDS) network having first and second networks for carrying first and second carrier signals, and having a set of n phase synchronous location pairs $(a_i, b_i)$; and also including tunable transmitter circuits for driving an antenna array, each tunable transmitter circuit having an output line for carrying an output signal and first and second input lines electrically connected to the first and second networks of the BDS network at locations of a corresponding one of the set of phase synchronous location pairs, and including a multiplier having a first input electrically connected to the first input line of that tunable transmitter circuit; a phase setting circuit electrically connected to the multiplier for controlling the phase of the output signal of that tunable transmitter circuit; and an amplitude setting circuit for controlling the amplitude of the output signal of that tunable transmitter circuit.

27 Claims, 37 Drawing Sheets

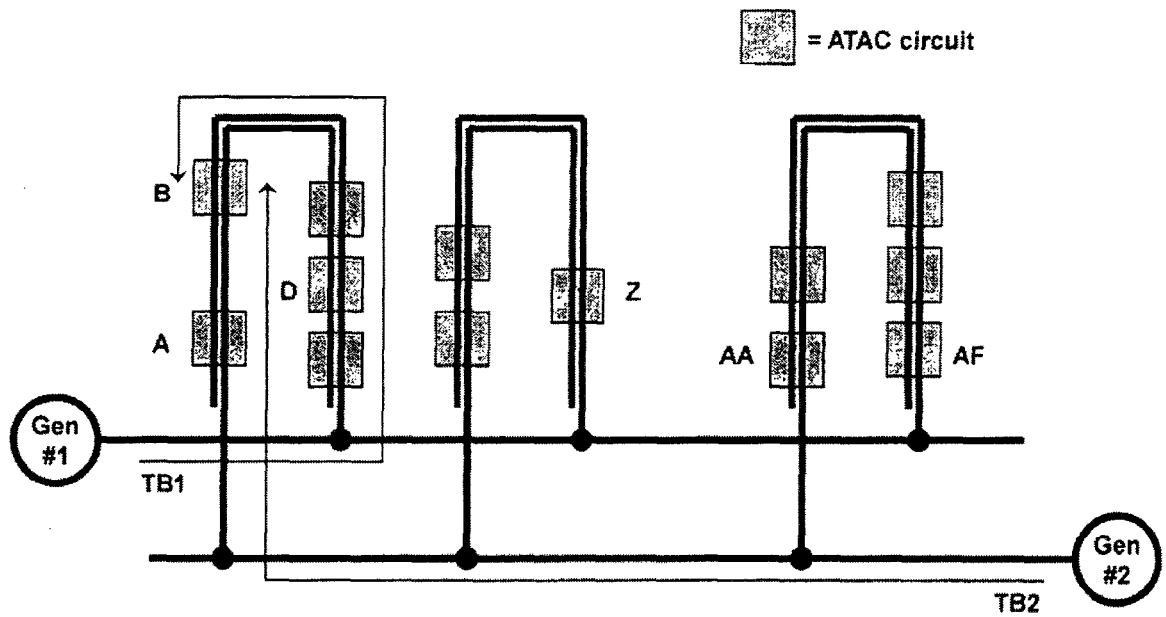
Fig. 1c
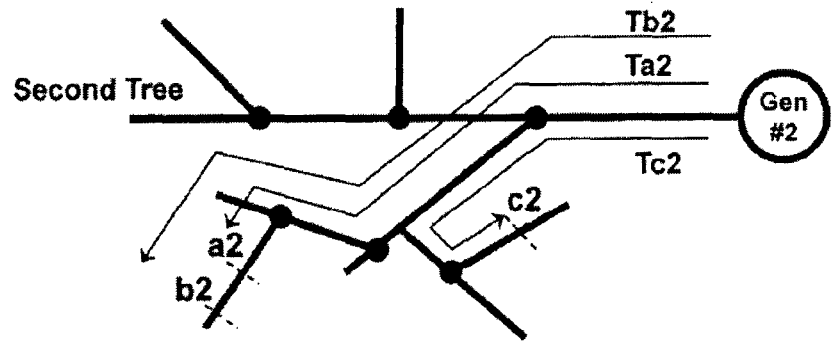
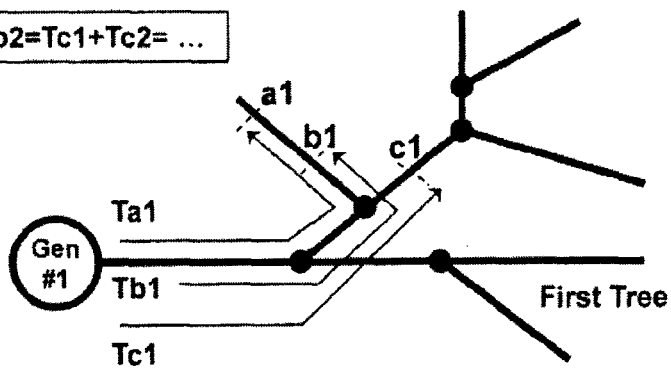
Fig. 2

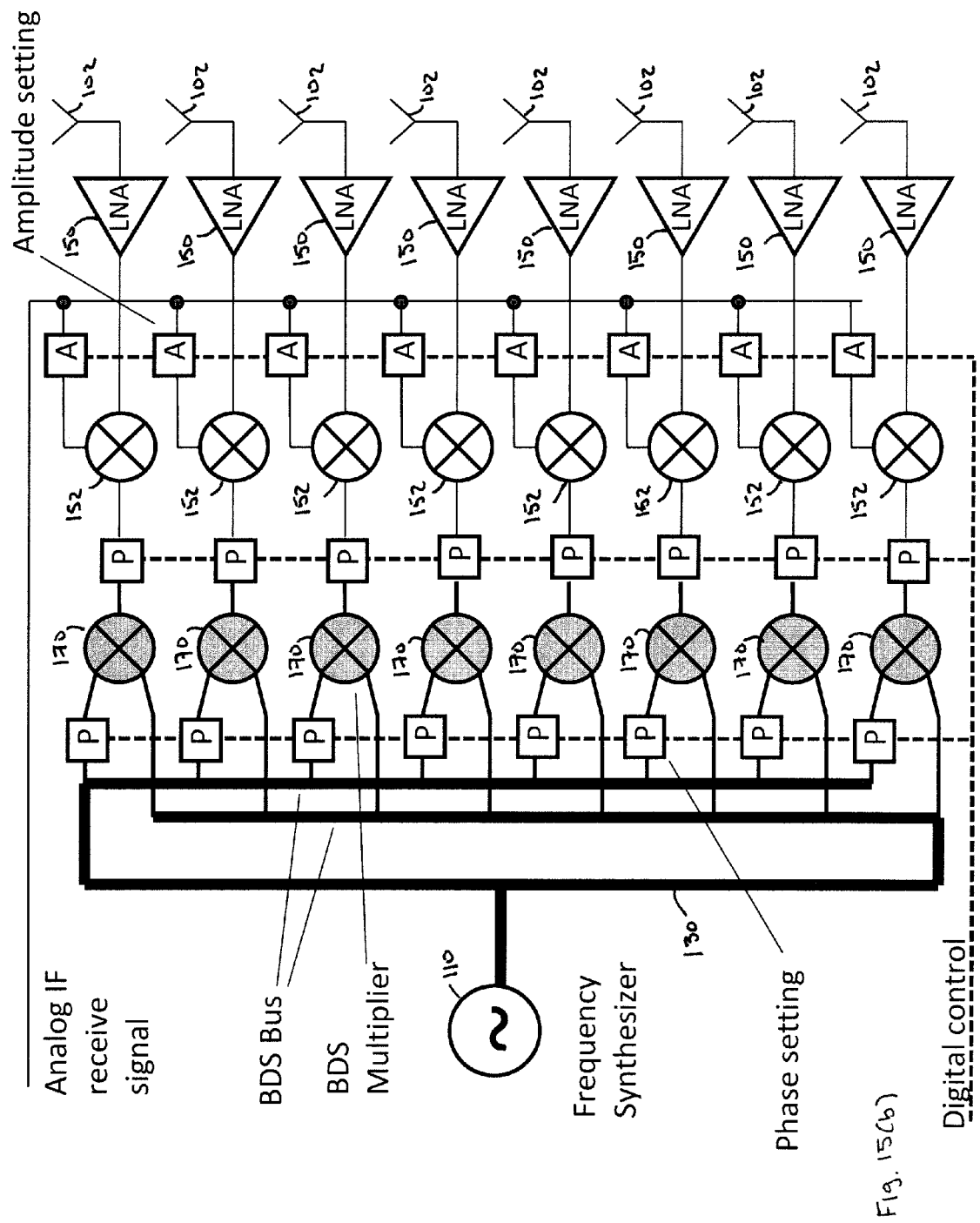

LOW COST, ACTIVE ANTENNA ARRAYS

This application claims the benefit of U.S. Provisional Application No. 61/360,737, filed Jul. 1, 2010, all of which is incorporated herein by reference.

TECHNICAL FIELD

Embodiments of the present invention generally relate to active arrays such as phased arrays for smart antennas.

BACKGROUND OF THE INVENTION

Antenna arrays are used in applications such as radars and beam-based communication systems. For example, see R. Mailloux, "Phased Array Antenna Handbook," 2nd edition, Artech House, 2005; D. Parker and D. Zimmermann, "Phased Arrays-Part I: Theory and Architectures," IEEE Trans. Microwave Theory and Techniques, vol. 50, March 2002; D. Parker and D. Zimmermann, "Phased Arrays-Part II: Implementations, Applications, and Future Trends," IEEE Trans. Microwave Theory and Techniques, vol. 50, March 2002. The main reason for using antenna arrays is their capability of generating special dynamic radiation patterns such as steerable beams without any mechanical movement.

In general, each array element of an antenna array consists of a passive antenna called an antenna element or simply an antenna and a circuit block. Usually, the antenna elements are placed on a regular grid. The pitch of this grid is approximately or equal to half the wavelength at which the antenna array operates. The circuit block of the array element may be as simple as a passive phased shifter or as complex as an entire radio including amplifiers, mixers, filters, data converters, and digital circuits. If the antenna array contains only passive components, it is called a passive antenna array. If the antenna array contains active components, it is called an active antenna array.

Antenna arrays can generate many radiation patterns. For example, they may accept incoming signals from certain directions and block incoming signals from other directions or may transmit only narrow beams even though each antenna element radiates widely. Such radiation patterns are extremely useful in many applications. In radar using antenna arrays, the transmitted signals are focused in a particular spatial direction and the only accepted signal reflections are from the same direction without any physical movement of antennas as in conventional systems. In wireless communication systems, using spatial channels for transmitted and received signals, a technique usually called beam steering, increases the communication system capacity substantially.

The way an antenna array generates special dynamic radiation patterns is by properly combining the received signals from the antenna elements in receive mode and by properly exciting the antenna elements in transmit mode. Depending on how these operations are performed, antenna arrays are called either analog or digital. In analog arrays the receive and transmit radiation patterns are formed by analog circuits while in digital array they are formed by digital processing under software control.

To date, the most successful analog antenna arrays are the traditional phased arrays. Historically, the Passive Electronically Steered Array (PESA) has been developed first. This design uses a signal distribution/combining network called a corporate feed and passive adjustable phase shifters at each antenna element. These components have high loss limiting the system performance. Adding Receive/Transmit (Rx/Tx) amplifier modules per individual antenna element helps this problem resulting in Active Electronically Steered Array or AESA, currently the prevalent military radar architecture. For both PESA and EISA, the corporate feed and the programmable phase shifters are high performance expensive components.

The corporate feed is a passive tree network made of multiple transmission line sections interconnected with multiple splitters/combiners. The corporate feed has one input/output (I/O) port connected to the beginning of the tree trunk and many I/O ports connected to the end of the top branches of the tree. The network is electrically symmetric such that a signal applied at the trunk port arrives simultaneously at all branch ports. The network is reciprocal such that signals applied at the branch ports travel the same amount of time to arrive at the trunk port. In other words, the flight time of the signal from the trunk port to any branch port and vice versa is a constant. In addition, the corporate feed is a signal-combining network. When different input signals are applied to the branch ports simultaneously, the signal at the trunk port is the sum of these input signals. The practical realization of the corporate feed is expensive because this network contains many signal splitting/combining operations and because the transmission line sections must be accurately matched in length and terminated electrically with accurate impedances. All these design conditions are error prone.

While at one end of the antenna-array technology spectrum are the traditional PESA/EISA phased arrays, which generate radiation patterns exclusively with analog methods, at the other end of this spectrum are software-configured digital systems. Typically, these systems use 4-12 independent radios connected to 4-12 independent antennas, respectively. There are no physical connections between these radios or these antennas. Each radio contains data converters converting the received signals from analog format to digital format and converting transmitted signals from digital format to analog format. The respective 4-12 digital transmit and 4-12 digital receive signals are generated and/or processed by a digital signal processor under the control of special software usually called "beam forming/steering" software.

The software-configured digital arrays can be readily built with standard hardware and are extremely flexible in terms of programmability but suffer from fundamental shortcomings. First, the hardware of these systems is naturally expensive since there are many (4-12) radio systems present. Furthermore, these radios must have very high performance to ensure that the digital representations of the antenna signals (which are always analog) are correct. Second, the software generating the signals is extensive and runs in real time, requiring substantial processing power. Third, having only 12 or less antennas per system limits the array performance. A common compromise is to form dynamic patterns (e.g. beams, etc.) only in azimuth (horizontal directions) with fixed elevation (vertical direction) patterns. In the case of forming beams, typically, these are elongated cones spanning narrow but long regions. In contrast to this, a PESA/EISA analog phased array with hundreds or thousands of antennas generates narrow round beams steerable in both azimuth and elevation.

In principle, the number of antennas in software-configured digital arrays can be scaled with a corresponding increase in system cost and size. A common approach to limiting the physical size of the system is to place as much of the radio hardware as possible on phased array panels. Such highly compacted digital arrays with many tens or even hundreds of elements are intended for applications, where cost is not a primary technology driver, such as some military radars.

Between the two technology extremes defined by all analog processing or all digital processing, there are other known possibilities for implementing active antenna arrays, partially with analog techniques and partially with digital techniques. For example, a large array may be segmented into many sub-arrays, each sub-array being designed as an analog system. However, the signals to/from each sub-array would be generated in the digital domain.

SUMMARY OF THE INVENTION

Embodiments of the present invention include methods and systems for distribution and aggregation of receive and transmit signals in an active antenna array or sub-array with amplitude and phase control at every antenna element. The methods and systems included in the embodiments of the present invention contain at least one of the bidirectional signaling networks (BDS network) described before. For example, see V. Prodanov and M. Banu "GHz Serial Passive Clock Distribution in VLSI Using Bidirectional Signaling," Proceedings, 2006 IEEE Custom Integrated Circuits Conference; and U.S. patent application Ser. No. 12/176,897, filed on Jul. 21, 2008.

In general, a BDS network comprises a set of signal distribution tree-networks called a "BDS bus" and a set of local processing circuits. These local processing circuits are called Arrival-Time-Averaging Client (ATAC) circuits and are defined in the specification of the U.S. patent application Ser. No. 12/176,897. An important ATAC circuit is an analog multiplier called a BDS Multiplier. In the present invention, we use ATAC circuits or combinations of ATAC circuits with tunable output-amplitude and tunable output-phase under the control of electronic signals. We call these ATAC circuits or combinations of such ATAC circuits Tunable Amplitude and Phase ATAC circuits or TAPA circuits. The TAPA circuits comprise sub-circuits, which can change the amplitude and phase of signals under electronic control called "A/P-Setting" circuits. In general, an A/P-Setting circuit could provide full amplitude control, partial amplitude control, or zero amplitude control and full phase control, partial phase control, or zero phase control. If an A/P-Setting circuit provides only amplitude control, it is called "A-Setting" and if an A/P-Setting circuit provides only phase control, it is called "P-Setting".

In accordance with one embodiment of the present invention, there is provided an active array transmitter circuit comprising a BDS bus with two BDS trees, a plurality of TAPA circuits, a plurality of mixer circuits, a plurality of A-Setting circuits and a plurality of antennas. The BDS bus is excited with a local oscillator signal provided by a frequency synthesizer or other external source. Each TAPA circuit has first and second input signal terminals connected to first and second BDS trees of the BDS bus, respectively. Each TAPA circuit has an output signal terminal connected to a first input signal terminal of a mixer circuit. Each mixer circuit has first and second input signal terminals and one output signal terminal coupled to one antenna. The second signal input of each mixer circuit is connected to the output of an A-Setting circuit. Each A-Setting circuit has an input signal terminal and an output signal terminal. The input signal terminals of all A-Setting circuits are connected together and receive a modulated intermediate frequency (IF) signal from an external source. Each TAPA circuit comprises an analog multiplier with first and second inputs and one output and first, second, and third P-Setting circuits, each P-Setting circuit with one input and one output. The input of the first P-Setting circuit is connected to the first input of the TAPA circuit. The output of the first P-Setting circuit is connected to the first input of the analog multiplier. The input of the second P-Setting circuit is connected to the second input of the TAPA circuit. The output of the second P-Setting circuit is connected to the second input of the analog multiplier. The input of the third P-Setting circuit is connected to output of the analog multiplier. The output of the third P-Setting circuit is connected to the output of the TAPA circuit. The active array transmitter circuit further comprises means to control independently the setting of all P-Setting and A-Setting circuits it includes.

In accordance with another embodiment of the present invention, there is provided an active array transmitter circuit comprising a BDS bus with two BDS trees, a plurality of TAPA circuits and a plurality of antennas. The first BDS tree of the BDS bus is excited with a local oscillator signal provided by a frequency synthesizer or other external source. The second BDS tree of the BDS bus is excited with a modulated carrier. The carrier in the second BDS tree has the same frequency as the local oscillator signal in the first BDS tree. Each TAPA circuit has first and second input signal terminals connected to first and second BDS trees of the BDS bus, respectively. Each TAPA circuit has an output signal terminal coupled to one antenna. Each TAPA circuit comprises an analog multiplier with first and second inputs and one output, an A/P-Setting circuit with one input and one output and first and second P-Setting circuits, each P-Setting circuit with one input and one output. The input of the A/P-Setting circuit is connected to the first input of the TAPA circuit. The output of the A/P-Setting circuit is connected to the first input of the analog multiplier. The input of the first P-Setting circuit is connected to the second input of the TAPA circuit. The output of the first P-Setting circuit is connected to the second input of the analog multiplier. The input of the second P-Setting circuit is connected to output of the analog multiplier. The output of the second P-Setting circuit is connected to the output of the TAPA circuit. The active array transmitter circuit further comprises means to control independently the setting of all A/P-Setting and A-Setting circuits it includes.

In accordance with another embodiment of the present invention, there is provided an active array receiver circuit comprising a BDS bus with two BDS trees, a plurality of TAPA circuits, a plurality of mixer circuits, a plurality of A-Setting circuits and a plurality of antennas. The BDS bus is excited with a local oscillator signal provided by a frequency synthesizer or other external source. Each TAPA circuit has first and second input signal terminals connected to first and second BDS trees of the BDS bus, respectively. Each TAPA circuit has an output signal terminal connected to a first input signal terminal of a mixer circuit. Each mixer circuit has first and second input signal terminals and one output signal terminal. The second input signal terminal of each mixer circuit is coupled to an antenna via a low noise amplifier or directly. The output signal terminal of each mixer circuit is connected to the input of an A-Setting circuit. Each A-Setting circuit has an input signal terminal and an output signal terminal. The output signal terminals of all A-Setting circuits are connected together and carry a modulated intermediate frequency (IF) signal to an external circuit such as IF radio receiver stage. Each TAPA circuit comprises an analog multiplier with first and second inputs and one output and first, second, and third P-Setting circuits, each P-Setting circuit with one input and one output. The input of the first P-Setting circuit is connected to the first input of the TAPA circuit. The output of the first P-Setting circuit is connected to the first input of the analog multiplier. The input of the second P-Setting circuit is connected to the second input of the TAPA circuit. The output of the second P-Setting circuit is connected to the second input of the analog multiplier. The input of the third P-Setting circuit is connected to output of the analog multiplier. The output of the third P-Setting circuit is connected to the output of the TAPA circuit. The active array receiver circuit further comprises means to control independently the setting of all P-Setting and A-Setting circuits it includes.

In accordance with another embodiment of the present invention, there is provided a circuit for use in active array receivers and transmitters comprising a BDS bus with two BDS trees, an extra distribution network, and a plurality of TAPA circuits connected to the two BDS trees and to the extra distribution network. The extra distribution network caries a signal identical with the signal of the second BDS tree but shifted ninety degrees in phase compared to the signal of the second BDS tree at all places where the TAPA circuits connect to the BDS trees and to the extra distribution network respectively. Each TAPA circuit has first, second, and third input signal terminals connected to the first BDS tree of the BDS bus, to the extra distribution network, and to the second BDS tree of the BDS bus, respectively. Each TAPA circuit has an output signal terminal, which provides the output for the circuit of this embodiment. Each TAPA circuit comprises an analog multiplier with first and second inputs and one output and first and second A/P-Setting circuits. The output of the analog multiplier is connected to the output of the TAPA circuit. The first A/P-Setting circuit has first and second inputs connected to the first and second TAPA inputs respectively, and an output connected to the first input of the analog multiplier. The second A/P-Setting circuit has an input connected to the third signal terminal of the TAPA circuit and an output connected to the second input of the analog multiplier. The first A/P-Setting circuit comprises means to scale in magnitude its input signals and add them. The circuit of this embodiment further comprises means to control independently the setting of all A/P-Setting circuits it includes.

In accordance with another embodiment of the present invention, there is provided a circuit for use in active array receivers and transmitters comprising a BDS bus with two BDS trees and a plurality of up/down frequency conversion circuits connected to the two BDS trees. Each up/down frequency conversion circuit has first, second, and third input signal terminals and an output signal terminal providing an output of the circuit of this embodiment. The first input signal terminal of the up/down frequency conversion circuit is connected to the first BDS tree and the second input signal terminal of the up/down frequency conversion circuit is connected to the second BDS tree. Each up/down frequency conversion circuit comprises first, second, and third A/P-Setting circuits, first and second mixers, and an analog processing block. The first A/P-Setting circuit has an input connected to the first input signal terminal of the up/down frequency conversion circuit and an output connected to the first input of the first mixer. The second A/P-Setting circuit has an input connected to the second input signal terminal of the up/down frequency conversion circuit and an output connected to the first input of the second mixer. The first mixer has first and second inputs and one output. The second input of the first mixer is an input of the circuit of this embodiment. The output of the first mixer is connected to the input of the analog processing block. The analog processing block has one input and one output and provides a linear filtering function. The output of the analog processing block is connected to the second input of the second mixer. The second mixer has first and second inputs and one output connected to the input of the third A/P-Setting circuit. The third A/P-Setting circuit has an input and an output connected to the output of the up/down frequency conversion circuit. The circuit of this embodiment further comprises means to control independently the setting of all A/P-Setting circuits it includes.

In general, in one aspect the invention features a transmitter system for an array of antenna elements, the transmitter system including: a bidirectional signaling (BDS) network including a first network for carrying a first carrier signal and a second network for carrying a second carrier signal, and having a set of n phase synchronous location pairs ($a_i$, $b_i$), each corresponding to a location $a_i$ on the first network and a location $b_i$ on the second network; and a plurality of tunable transmitter circuits, each for driving a corresponding different antenna element of the array of antenna elements, wherein each tunable transmitter circuit of the plurality of tunable transmitter circuits has an output line for carrying an output signal and first and second input lines electrically connected to the first and second networks of the BDS at locations of a corresponding one of the set of phase synchronous location pairs. Each tunable transmitter circuit includes: a multiplier having a first input electrically connected to the first input line of that tunable transmitter circuit; a phase setting circuit having a control input for receiving a phase control signal, the phase setting circuit electrically connected to the multiplier for controlling the phase of the output signal of that tunable transmitter circuit; and an amplitude setting circuit after the multiplier and having a control input for receiving an amplitude control signal, the amplitude setting circuit for controlling the amplitude of the output signal of that tunable transmitter circuit.

Other embodiments may include one or more of the following features. Within each tunable transmitter circuit, the phase setting circuit is electrically connected to the multiplier within that tunable transmitter circuit to implement a configuration selected from the group consisting of a first configuration and a second configuration, the first configuration having the phase setting circuit between the first input line of the tunable transmitter circuit and the first input of the multiplier, and the second configuration having the phase setting circuit between the output of the multiplier and the output line of the tunable transmitter circuit. Each tunable transmitter circuit further includes a power amplifier having an input electrically connected to the amplitude setting circuit within that tunable transmitter circuit and for providing a drive signal to the corresponding antenna element of the array of antenna elements.

Still other embodiments may include one or more of the following further features. Each tunable transmitter circuit of the plurality of tunable transmit circuits further includes an up-conversion mixer having a first input for receiving a signal derived from a IF transmit signal, a second input for receiving a signal from the output of the multiplier in that tunable transmitter circuit, and an output for providing a signal to the output line of that tunable transmitter circuit. Within each tunable transmitter circuit of the plurality of transmitter circuits the multiplier within that tunable transmitter circuit has a second input electrically connected to the second input of that tunable transmit circuit. The transmitter system also includes an up-conversion mixer for mixing the first carrier signal and an IF transmit signal to generate the second carrier signal on the second network of the BDS network.

Yet other embodiments may include one or more of the following additional features. Within each tunable transmitter circuit of the plurality of transmitter circuits the multiplier within that tunable transmitter circuit has a second input electrically connected to the second input of that tunable transmit circuit. Each tunable transmitter circuit of the plurality of tunable transmitter circuits further includes an up-conversion mixer with a first input electrically coupled to the output of the multiplier in that tunable transmit circuit, a second input for receiving the IF transmit signal, and an output electrically coupled to the amplitude setting circuit in that tunable transmit circuit. Each tunable transmit circuit of the plurality of tunable transmit circuits (1) further includes a second multiplier having an output, a first input, and a second input electrically connected to the second input line of that tunable transmit circuit, (2) wherein the first mentioned multiplier in that tunable transmit circuit has an output and a second input for receiving the IF transmit signal, and (3) wherein the first input of the second multiplier is electrically connected to the output of the first mentioned multiplier in that tunable transmit circuit.

In general in another aspect, the invention features a receiver system for an array of antenna elements, the receiver system including: a bidirectional signaling (BDS) network including a first network for carrying a first carrier signal and a second network for carrying a second carrier signal, and having a set of n phase synchronous location pairs ($a_i$, $b_i$), each corresponding to a location $a_i$ on the first network and a location $b_i$ on the second network; and a plurality of tunable receiver circuits, each for receiving input from a corresponding antenna element of the array of antenna elements, wherein each tunable receiver circuit of the plurality of tunable receiver circuits has an output line and first and second input lines electrically connected to the first and second networks of the BDS at locations of a corresponding one of the phase synchronous location pairs. Each tunable receiver circuit includes: a multiplier having a first input electrically connected to the first input line of that tunable receiver circuit and having an output; a phase setting circuit having a control input for receiving a phase control signal for controlling phase of a signal passing through the phase setting circuit, the phase setting circuit electrically connected to the multiplier; a mixer having a first input for receiving a signal from the corresponding antenna element of the array of antenna elements, a second input for receiving a local carrier signal obtained from the BDS network, and an output; and an amplitude setting circuit having an input, an output, and a control input for receiving an amplitude control signal for controlling amplitude of a signal passing through the amplitude setting circuit, the amplitude setting circuit connected to one of the mixer for that tunable receiver circuit and the multiplier for that tunable receiver circuit.

Other embodiments may include one or more of the following features. Within each tunable receiver circuit of the plurality of tunable receiver circuits, the phase setting circuit is electrically connected to the multiplier within that tunable receiver circuit to implement a configuration selected from the group consisting of a first configuration and a second configuration, the first configuration having said phase setting circuit between the first input line of the tunable receiver circuit and the first input of said multiplier, and the second configuration having said phase setting circuit electrically connected to the output of said multiplier. Each tunable receiver circuit of the plurality of tunable receiver circuits further includes a low noise amplifier having an input for receiving a signal from the corresponding antenna element of the plurality of antenna elements and an output electrically connected to the first input of the mixer in that tunable receiver circuit. Within each tunable receiver circuit of the plurality of receiver circuits the multiplier within that tunable receiver circuit has a second input electrically connected to the second input of that tunable receiver circuit. Within each tunable receiver circuit of the plurality of tunable receiver circuits, the second input of the mixer for that tunable receiver circuit is electrically connected to the output of the multiplier for that tunable receiver circuit.

Yet other embodiments may include one or more of the following further features. Within each tunable receiver circuit of the plurality of tunable receiver circuits the input of the amplitude setting circuit in that tunable receiver circuit is electrically connected to the output of the mixer in that tunable receiver circuit. The receiver system further includes a receive signal line and within each tunable receiver circuit of the plurality of tunable receiver circuits the output of the amplitude setting circuit in that tunable receiver circuit is electrically connected to the receive signal line. Within each tunable receiver circuit of the plurality of tunable receiver circuits the output of the amplitude setting circuit for that tunable receiver circuit is electrically connected to one of the first and second networks of the BDS network.

Still other embodiments may include one ore more of the following features. Within each tunable receiver circuit of the plurality of tunable receiver circuits the second input of the mixer for that tunable receiver circuit is electrically connected to the second input line of that tunable receiver circuit. Within each tunable receiver circuit of the plurality of tunable receiver circuits the second input of the multiplier in that tunable receiver circuit is electrically connected to the output of the mixer in that that tunable receiver circuit. Within each tunable receiver circuit of the plurality of tunable receiver circuits the output of the multiplier for that tunable receiver circuit is electrically coupled to the input of the amplitude setting circuit for that tunable receiver circuit. Within each tunable receiver circuit of the plurality of tunable receiver circuits the output of the amplitude setting circuit for that tunable receiver circuit is electrically connected to one of the first and second networks of the BDS network.

In general, in still another aspect the invention features a transceiver system for an array of antenna elements, the transceiver system including: a bidirectional signaling (BDS) network including a first network for carrying a first carrier signal and a second network for carrying a second carrier signal, and having a set of n phase synchronous location pairs ($a_i$, $b_i$), each corresponding to a location $a_i$ on the first network and a location $b_i$ on the second network; and a plurality of transceiver circuits, each for connecting to a corresponding different antenna element of the array of antenna elements. Each transceiver circuit includes: (1) a transmitter circuit for driving the corresponding antenna element of the array of antenna elements, the transceiver circuit having an output line for carrying an output signal and first and second input lines electrically connected to the first and second networks of the BDS at locations of a corresponding one of the set of phase synchronous location pairs, and including a multiplier having a first input electrically connected to the first input line of that transmitter circuit; and (2) a receiver circuit for receiving input from the corresponding antenna element of the array of antenna elements, the receiver circuit having an output line and first and second input lines electrically connected to the first and second networks of the BDS at locations of a corresponding one of the phase synchronous location pairs, and including: (a) a multiplier having a first input electrically connected to the first input line of that receiver circuit and having an output; and (b) a mixer having a first input for receiving a signal from the corresponding antenna element of the array of antenna elements, a second input for receiving a local carrier signal obtained from the BDS network, and an output.

Other embodiments may include one or more of the following features. Within each transceiver circuit of the plurality of transceiver circuits, the output line of the receiver circuit in that transceiver circuit is electrically connected to one of the first and second networks of the BDS network. Within each transceiver circuit of the plurality of transceiver circuits, the transmitter circuit further includes: a phase setting circuit having a control input for receiving a phase control signal, the phase setting circuit electrically connected to the multiplier in that transmitter circuit for controlling the phase of the output signal of that transmitter circuit; and an amplitude setting circuit after the multiplier in that transmitter circuit and having a control input for receiving an amplitude control signal, the amplitude setting circuit for controlling the amplitude of the output signal of that transmitter circuit. Within each transceiver circuit of the plurality of transceiver circuits, the receiver circuit further includes: a phase setting circuit having a control input for receiving a phase control signal, the phase setting circuit electrically connected to the multiplier in that receiver circuit for controlling phase of the output signal of the receiver circuit; an amplitude setting circuit electrically connected to the output of the mixer in that receiver circuit and having a control input for receiving an amplitude control signal. Within each transceiver circuit of the plurality of transceiver circuits the output of the amplitude setting circuit within the receiver circuit for that transceiver circuit is electrically connected to one of the first and second networks of the BDS network.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 1(a)-(c) depict schematic diagrams of a synchronization system having two independent tree networks with paired branches, excited by two independent generators.

FIG. 2 depicts a schematic diagram of a synchronization system having two general tree networks with sensing points chosen such as to create phase synchronization pairs (a1,a2), (b1,b2), (c1,c2) . . . (n1,n2).

FIGS. 15(a)-(b) depict schematic diagrams of wireless receivers for a phased-array antenna system with LO signal distributed through a BDS system, with IF signal down-conversion at each individual antenna, with LNA at each individual antenna, and with amplitude or phase control for antenna received signals.

DETAILED DESCRIPTION

Before presenting detailed descriptions of various embodiments of the invention, it is useful to first understand the operation of the bidirectional signal distribution concept which will be used in those various embodiments.

Figure 1A:
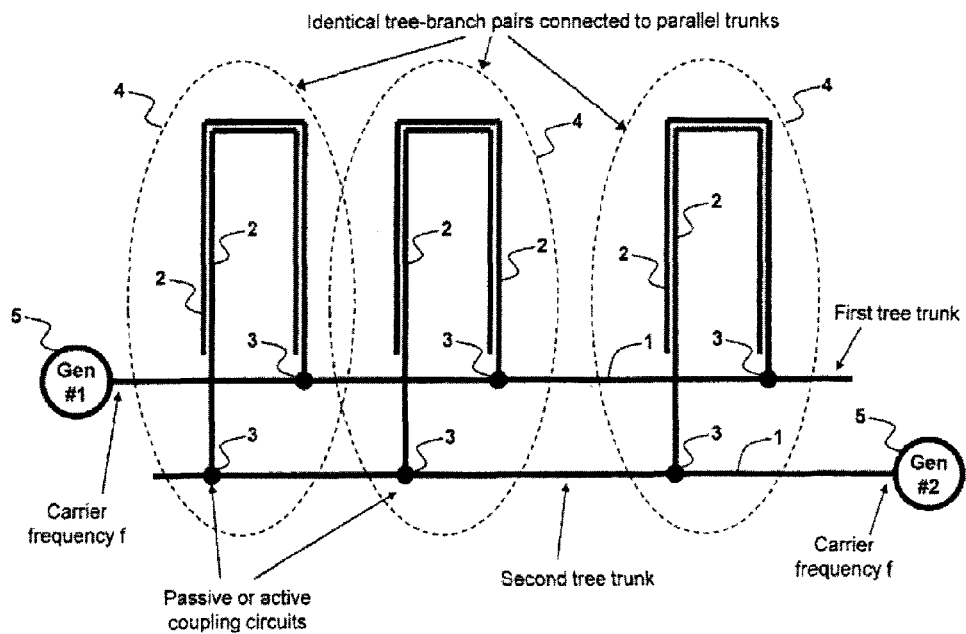

FIG. 1(a) depicts a schematic diagram of two independent tree networks, each consisting of a tree trunk 1 and tree branches 2. We will refer to this below generally as a BDS (bidirectional signaling) bus. The tree trunk and the tree branches of each of the tree networks are properly terminated signal transmission lines (termination circuits are not shown in FIG. 1(a) for simplicity), such as electrical microstrip lines, optical wave-guides, sound propagating guides, or simple electrical traces. The difference between trunk 1 and branches 2 is not in substance but rather in name, based on the relative position of the signal transmission lines (TL) with respect to the tree network input port. Trunk 1 is defined as the signal transmission line connected directly to the input port. Branches 2 are coupled to trunk 1 through passive or active circuits 3. The signal delays through these coupling circuits are assumed to be either identical for all coupling circuits or in known relationships to each other.

The tree networks described with regard to FIG. 1(a) are particular cases of a larger class of tree networks referred to herein as TL-tree networks. In general, a TL-tree network has a trunk, which is a TL coupled to the TL-tree input, and many branches, which are TLs coupled either to the trunk or to other branches. The level of the TL-tree network is the largest number of branches through which a signal applied at the TL-tree input travels plus one (counting the trunk as a branch). For example, the TL-trees in FIG. 1 are two-level trees (input signals travels through one trunk and one branch).

The two tree networks in FIG. 1(a) have parallel trunks which run close to each other and their branches are paired such that all pairs 4 have substantially identical physical structure. The position where each branch pair connects to the parallel trunks is not critical. The two branches in every pair are in close proximity to each other (e.g. parallel or conforming to each other).

Two generators 5 apply input signals to the tree networks in FIG. 1(a). The generator signals may be modulated or un-modulated carriers of frequency f. So, for example on generated signal might be an un-modulated carrier of frequency f and the other generated signal might be a modulated carrier of frequency f. A carrier is any periodic signal when modulation is not present (zero modulation) and the carrier frequency is the frequency of the carrier when modulation is not present. When modulation is present, such as phase or frequency modulation, the carrier is usually not a periodic signal.

Also note that if only un-modulated carrier signals are being carried on both sides of the BDS bus, one generator can be used instead of two. In that case, the generator is connected to the input of one tree and an end of that tree is connected to the input of the second tree.

Figure 1B:
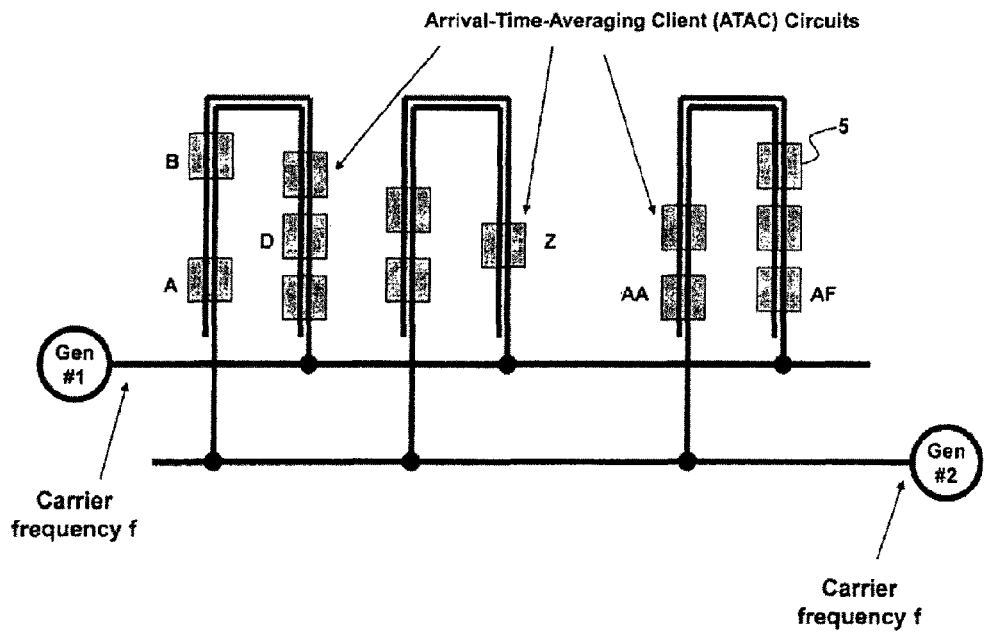

The signal distribution system shown in FIG. 1(b) includes a number of substantially identical circuit blocks called "Arrival-Time-Averaging Client" or ATAC circuits attached to the network. Block 6 represents one of the ATAC circuits in FIG. 1a. Other ATAC circuits in FIG. 1a are labeled A, B, D, Z, AA, and AF.

Each ATAC circuit has two inputs and one output. The ATAC circuit inputs are each connected at the same location to a different branch of the pair of branches. Some of the ATAC circuits may be connected in reverse order from the others. For example, if the "normal" connection order is defined as first input of the ATAC circuit attached to the first tree network and second input of the ATAC circuit attached to the second tree network, then some of the ATAC circuits may be connected with their first input attached to the second tree network and their second inputs attached to the first tree network.

The ATAC circuits are assumed to not load the transmission lines forming the tree branches in any significant way. In other words, the signals traveling on each tree are assumed to be undisturbed by the presence of the ATAC circuits. As a further clarification, if the system in FIG. 1(b) is purely electrical, the input impedance of the ATAC circuits is assumed large with respect to the characteristic impedance of the transmission lines such that the ATAC circuits just sense the voltages or currents on the branches with no significant effects in the tree signals. This assumption is reasonable in practice if the number of ATAC circuits is not excessive.

When the generator signals are periodic pulses (zero modulation), the pulses arrive at the two ATAC circuit inputs at different times. The ATAC circuit generates output pulses in the middle of the period between the two input pulses, hence the name of the circuit. In other words, the ATAC circuit output pulses are placed at the average time between the arrival times of the input pulses. The functionality of the ATAC circuit for the case of periodic pulses is described as in the clock extracting circuits in more detail in Wayne D. Grover "Method and Apparatus for Clock Distribution and for Distributed Clock Synchronization" U.S. Pat. No. 5,361,277, Nov. 1, 1994; Michael Farmwald and Mark Horowitz, "Apparatus for Synchronously Generating Clock Signals in a Data Processing System" U.S. Pat. No. 5,243,703, Sep. 7, 1993; and Charles D. Miller "Signals Distribution System" U.S. Pat. No. 5,712,882, Jan. 27, 1998, the disclosures of which are incorporated herein by reference in their entirety. Practical implementations include PLL and DLL circuits.

The outputs of the ATAC circuits in the system of FIG. 1(b) have phase synchronous carriers. That this is true can be more fully appreciated from the following analysis. For simplicity, consider the case of generator signals, which are periodic and have no modulation. FIG. 1(b) also shows the different signal propagation paths and times specifically indicated. The ATAC circuits labeled A, B, C, Z, AA, AF, will be referred as Client A, B, C, etc.

Referring to FIG. 1(b), the signal propagating times from the tree inputs to Client B are TB1 and TB2. We define a parameter called "Synchronization Flight Time" or SFT as the sum of TB1 and TB2:

$$SFT = TB1 + TB2$$

FIG. 1(c) shows the signal paths to Client D and the associated signal travel times TD1 and TD2. These two quantities can be expressed in terms of TB1 and TB2 as follows:

$$TD1 = TB1 - AT1$$

$$TD2 = TB2 + AT1$$

The quantity AT1 is the signal travel time on the tree branches between the positions of Clients B and D. Adding the above two relations, we have:

$$TD1 + TD2 = SFT$$

Note that this relation was derived without any specific assumptions regarding the position of Client D on its branch pair. Therefore, for the branch pair considered, SFT is a constant. By similar arguments, it can be shown that all branch pairs have a constant SFT. Furthermore, it can be shown that the SFT of all branch pairs have the same value, and therefore SFT is a system constant.

Thus, it can be concluded that for the distribution system in FIG. 1(a) (e.g. parallel lines in close proximity to each other), all Clients (ATAC circuits) placed at arbitrary position on the branch pairs detect signals whose combined total travel time from their respective generators is a constant (SFT). The average pulse arrival time is an absolute time instance equal to half the value of SFT (assuming time zero is defined at the instance when pulses are generated by the generator). Thus, all Client outputs are in precise phase synchronization. This property is independent of the pulse generation times.

Although the Clients in the system of FIG. 1(a) are positioned at different coordinates in space, their outputs are in precise phase alignment if the inputs are periodic signals, i.e. un-modulated carriers. The addition of angle modulation whose bandwidth is small with respect to the carrier, does not change the practical system behavior in any significant way.

Since SFT is a system invariant, any function of SFT is also an invariant. For this reason, in general one can use any client circuit producing an output, which is a function of SFT, to obtain global phase synchronization. For clarity, the term "function" here refers not to any specific formula but rather to the general mathematical concept associating a single value for every element (e.g., number) from a fixed set.

A circuit implementing a function of SFT is called Synchronization Client or "S-Client". ATAC circuits are particular cases of all possible S-Clients. A simple S-Client, which is not an ATAC circuit, would be a DLL (Delay Locked Loop) locking at a constant time offset from the average pulse arrival times. The constant time delay $\Delta T$ may be derived from the period of the pulse trains traveling over the two networks. Other examples of S-Clients for the case when sinusoidal carrier signals are used are analog multipliers, examples of which can be found in NRAO, A Proposal for a Very Large Array Radio Telescope, Vol. II, National Radio Astronomy Observatory, Green Bank, W. Va., Ch. 14, 1967; and Richard R Goulette "Technique for Distributing Common Phase Clock Signals" U.S. Pat. No. 6,531,358 B1, May 13, 2003, the disclosures of which are incorporated herein by reference in their entirety. Other examples include analog multipliers with phase offsets.

To appreciate why a multiplier is useful for generating a synchronous time from the two carrier signals on the BDS bus consider the following. The multiplier takes as its two inputs a first carrier signal on the first line at point X and a second carrier signal on the second line also at point X. Relative to a reference point within the dual bus, the first carrier signal is shifted in phase by an amount $-\Delta\phi$ and the second carrier signal is shifted in phase by an amount $+\Delta\phi$. That is, the two carrier signals can be represented by $a_1 \sin(\omega_0 t + \phi_0 - \Delta\phi)$ and $a_2 \sin(\omega_0 t + \phi_0 + \Delta\phi)$. Thus, the multiplier produces as its output the product of these two signals, which is represented as follows:

$$a_1 \sin(\omega_0 t + \phi_0 - \Delta\phi) \times a_2 \sin(\omega_0 t + \phi_0 + \Delta\phi) = a_1 a_3 [\cos(2\Delta\phi) - \cos(2\omega_0 t + 2\phi_0)]$$

In other words, the simple multiplication of two un-modulated carrier signals at the two points at equal electrical distance (length) from the midpoint yields a DC term $a_1 a_2 \cos(2\Delta\phi)$ and a phase invariant term $a_1 a_2 \cos(2\omega_0 t + 2\phi_0)$ at twice the transmitted signal frequency. The DC term can be easily eliminated through AC coupling and the remaining $a_1 a_2 \cos(2\omega_0 t + 2\phi_0)$ term provides a synchronized signal with a precise phase relationship to the reference phase.

Referring back to FIG. 1(a), a first generalization of the illustrated system is one in which the trunks are distorted in shape. Starting with the original system in FIG. 1(a), one can distort the trunks with no consequences to the carrier synchronization of the client outputs, as long as the trunks have the same section lengths. One effect of changing the trunk length or even distorting their physical shapes (as long as both trunks have the same section lengths) is a global timing reference shift. Similarly, the same is true if all branches are distorted in length and shape, while still maintaining the same length sections between two locations.

An even further generalization is one in which there are two trees, not equal in shape or dimensions, each tree having one trunk and any number of branches connected in any number of levels and with a generator exciting each tree trunk, as shown in FIG. 2. One can choose pairs of tree points such that each pair contains a point from the first tree and a point from the second tree. These pairs are called phase synchronization pairs. Each phase synchronization pair has a unique SFT. In general, one can identify many phase synchronization points with the same SFT. For example, one can chose two points arbitrarily, one on each tree and form a first pair.

For this particular first pair, there is a SFT calculated as the sum of the signal propagation time from the Generator #1 to the first tree point in the pair with the signal propagation time from the Generator #2 to the second tree point in the pair. Next, one can step away from the Generator #1 on the first tree and towards the Generator #2 on the second tree and find other point pairs with the same SFT. Moreover, one can search other branches and find additional pairs with the same SFT. Clearly, for any dual-tree network, there are many possible SFT and associated sets of tree point pairs. A set of synchronization pairs with the same SFT is called a collection of synchronization pairs. FIG. 2 illustrates a collection of three phase synchronization pairs (a1, a2), (b1, b2), and (c1,c2).

The more general system in FIG. 2 may be used to generate signals with phase synchronous carrier based only on a subset of points. In fact, in general the same network configuration is capable of generating many sets of carrier-synchronized outputs, each set using a specific collection of phase synchronization pairs. The network of FIG. 1(a) is a special case where all adjacent points on the tree branches placed next to each other form a collection of phase synchronization pairs.

Now we will describe how the bidirectional signaling concept is employed to implement transceivers for use with an antenna arrays to produce directional and steerable beam patterns.

Active Array Transmitter Based on Corporate Feed Signal Distribution

Figure 3:
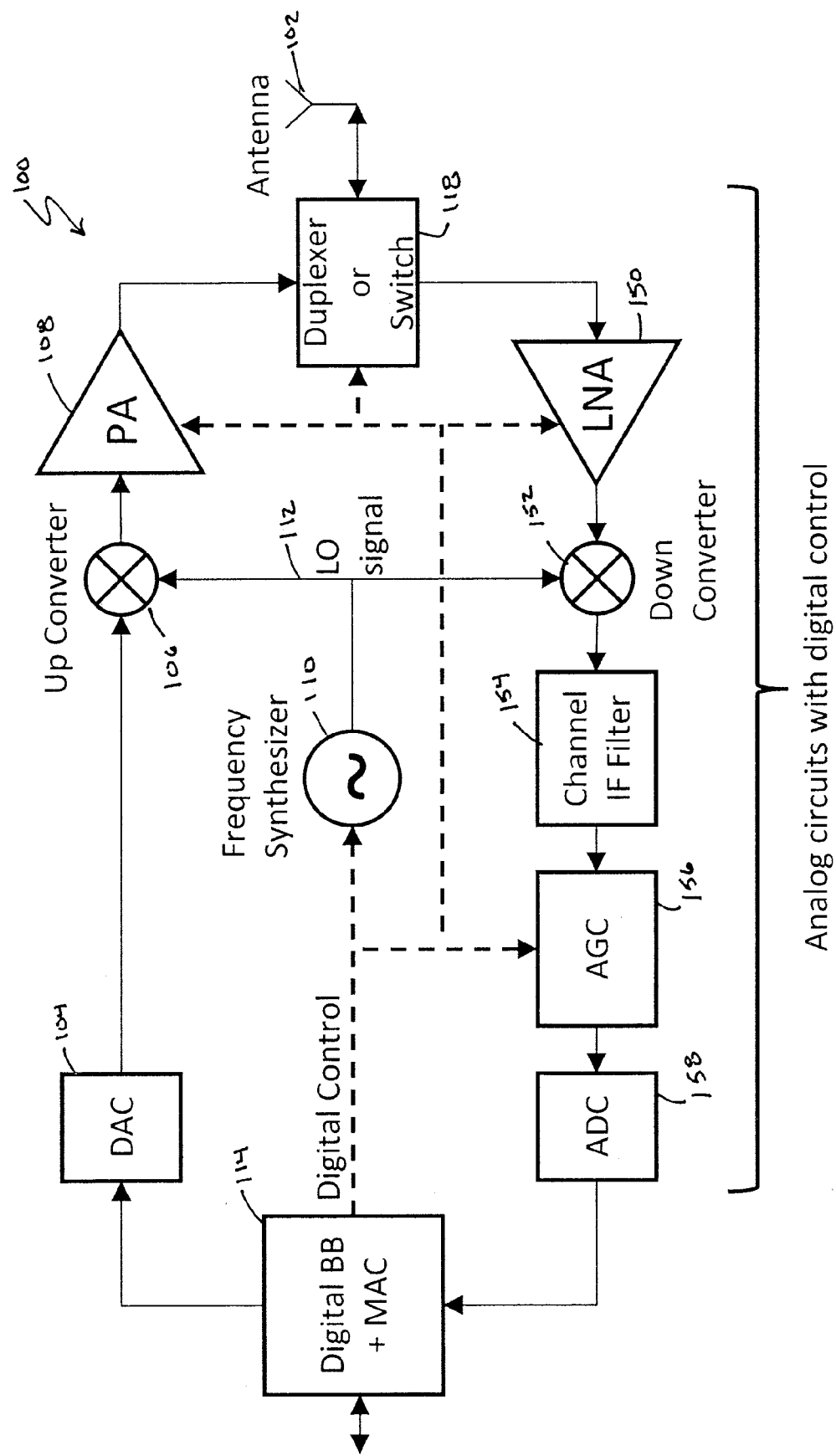
FIG. 3 depicts a schematic diagram of a typical wireless transceiver radio including up-conversion mixers (Up Converter), down-conversion mixers (Down Converter), power amplifier (PA), low-noise amplifier (LNA), frequency synthesizer (Frequency Synthesizer) generating local oscillator (LO) signals, receiver channel filters (Channel IF Filter), receiver automatic gain control amplifiers (AGC), transmitter digital-to-analog data converters (DAC), receiver analog-to-digital data converters (ADC), and digital processing hardware (Digital BB+MAC).

FIG. 3 depicts a schematic diagram of a typical wireless transceiver radio 100 using a single antenna 102. The transmitter portion includes a digital-to-analog (DAC) converter 104, an up-converter mixer (Up Converter) 106, and a power amplifier (PA) 108. A frequency synthesizer (Frequency Synthesizer) 110 generates the local oscillator (LO) signal 112, used by up-converter mixer 106. The transmitted signal is created in the digital domain by the Baseband (BB) and Media Access Control (MAC) processors 114 and converted into analog format by DAC 104. The analog signal at the output of DAC 104 is an intermediate frequency (IF) signal, which is a modulated signal of an IF carrier. In general, the IF-carrier frequency is much lower than the carrier frequency transmitted by antenna 102. This restriction is imposed by the operation of the DAC. Usual DACs, which are not excessively expensive, cannot generate at very high carrier frequencies. The carrier frequency is translated upwards by the up-converter mixer 106 from IF to the antenna carrier frequency, which will be called radio frequency or RF.

In the cases of zero or very low IF, the transmitter would include two DACs and two up-converter mixers (not shown in FIG. 3). The two DACs would receive two independent signals from the digital processors, usually called In-phase (I) and Quadrature-phase (Q) signals. After independent up-conversion from IF to RF, the I and Q signals at RF would be added and applied to the power amplifier as a single combined signal. The reason for using I and Q signals in the cases of zero or low IF is to generate single-side band transmitted signals, as required by most modern wireless communication systems. When the IF is high enough (e.g. larger than the transmitted signal bandwidth), there is no need for I/Q processing and a single IF signal is sufficient. The system depicted in FIG. 3 represents the case where DAC 104 generates an IF signal that is at a high enough frequency to avoid the need for I/Q processing. In practice, such IF can be chosen low enough not to require a very expensive DAC.

It is emphasized that all considerations in this specification are valid in general irrespective of the IF value (zero IF, low IF, medium IF or even very high IF). For simplicity reasons only, in the transmitter case and in the receiver case (see sections below) we show systems without I/Q processing (IF frequency larger than signal bandwidth), but the same solutions and architectures are valid for the cases with I/Q processing. The I/Q cases are simple extensions which are obvious to a person of ordinary skill in the field.

FIG. 3 shows that the transmitted signal is coupled from the output of power amplifier 108 to antenna 102 through a duplexer or antenna switch 118. These devices are used when both a transmitter and a receiver are electrically connected to the antenna. Typically, a duplexer is used in frequency division multiplexing (FDD) systems, when transmit and receive RFs are different. The duplexer is a passive filter mutually isolating the transmit and the receive paths, while the antenna is electrically connected to both the transmit and receive circuits at all times. Typically, an antenna switch is used in time division multiplexing (TDM) systems with the same receive and transmit RFs. In transmit mode, the antenna is electrically connected only to the transmitter and in receive mode the antenna is electrically connected only to the receiver.

(Note that throughout the description contained herein when it is said that one element is connected or electrically connected to another element, unless specifically indicated otherwise, that could be through an intermediate element. In other words, unless explicitly stated otherwise, it is not meant to imply only a direct connection.)

Figure 4:
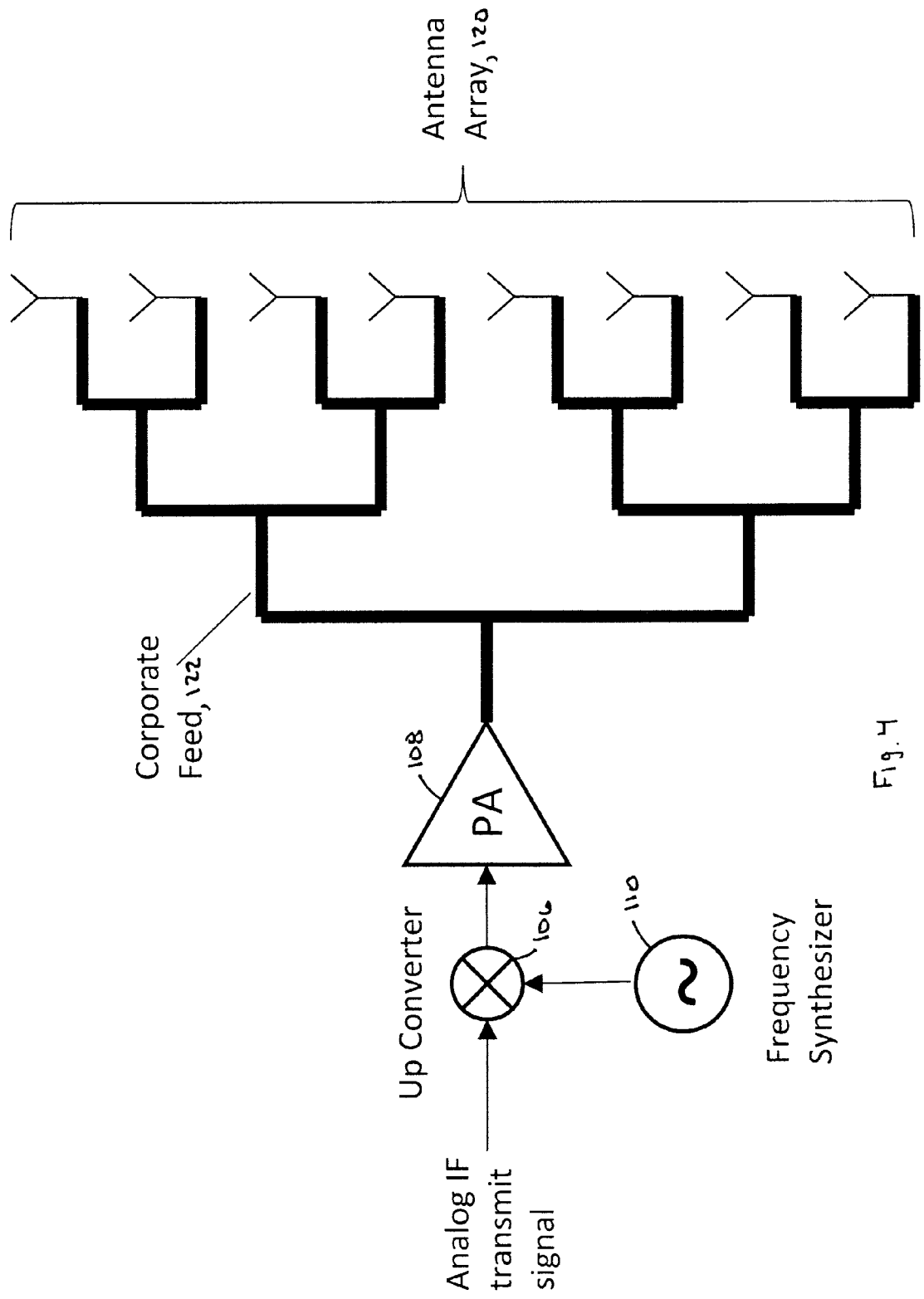
FIG. 4 depicts a schematic diagram of a wireless transmitter for a phased-array antenna system with PA output signal distributed through a corporate feed, and without amplitude or phase control for antenna transmitted signals.

If instead of applying the transmitted signal to a single antenna, we applied the transmitted signal to multiple antennas (e.g., antenna array), we could use the transmitter system illustrated in FIG. 4, which is typical for classical phased arrays. As this case illustrates only a transmitter, there is no need to include a duplexer or antenna switch. These devices would be present if a receiver were added to the diagram.

The power amplifier output signal is distributed to each antenna element of an antenna array 120 by a corporate feed 122. A corporate feed was described earlier in general terms. The particular corporate feed illustrated in FIG. 4 has a binary-tree architecture. As illustrated, corporate feed 122 first splits the output signal of power amplifier 108 into two theoretically identical signals, then it splits each resulting signal into two theoretically identical signals again, and so on until all antennas receive identical signals. The main practical challenge in making corporate feeds is the precision in signal splitting and signal transmission through all branches such that the signals applied to the antennas are practically equal with very low phase and magnitude errors. Corporate feeds have stringent geometrical constraints because a major contributor for the output signal precision is multi level geometrical symmetry.

The corporate feed with binary tree architecture as in FIG. 4 is the simplest such component and is useful in linear arrays. If the array is two-dimensional (e.g. planar), a more complicated corporate feed is needed such as based on H-trees. In this case, the signal splits into four identical components at every node, which in practice presents serious challenges.

Another way of describing the distribution of RF signals through a corporate feed is by calling it a "parallel synchronous distribution." The front of a signal wave starting from the root of the corporate feed (connected to the output of power amplifier 108 in FIG. 4) travels towards the antennas, splitting successively into many wave fronts, which travel together in "parallel," reaching the antennas at the same time or synchronously, despite the fact the antennas are located at different positions in space. A serial distribution, such as sending the RF signal from first antenna to second antenna to third antenna and so on would not result in synchronous antenna-array operation because there would be significant delays added to each individual antenna signal. These delays are significant when they are large in comparison with the duration of the symbols contained in the modulated transmitter signals (these symbols carry the information to be transmitted). Once the transmitter signal is up-converted to RF, the symbol duration becomes comparable with the delays due to RF signal distribution.

Figure 5:
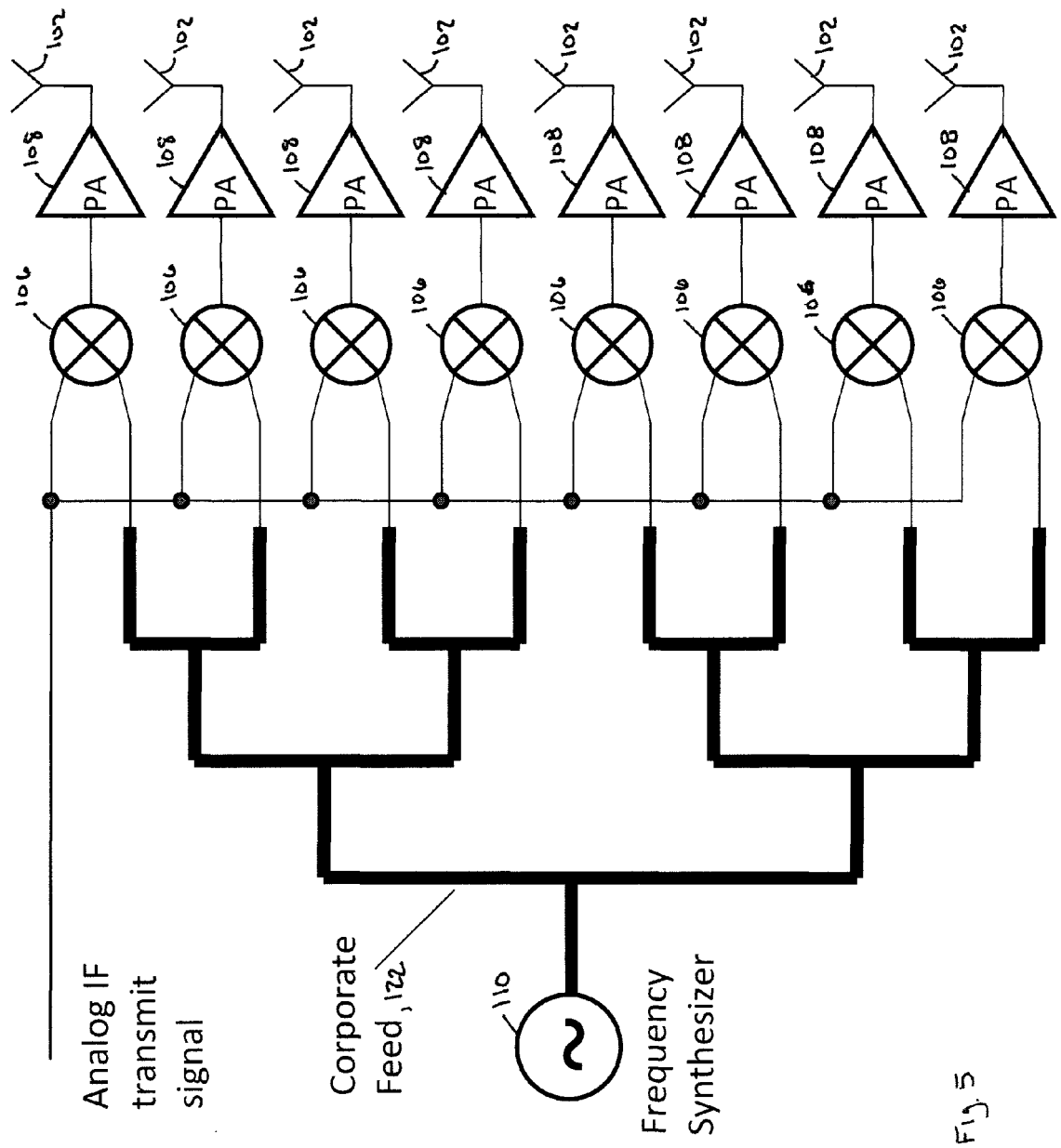
FIG. 5 depicts a schematic diagram of a wireless transmitter for a phased-array antenna system with LO signal distributed through a corporate feed, with intermediate frequency (IF) signal up-conversion at each individual antenna, with PA at each individual antenna, and without amplitude or phase control for antenna transmitted signals.

A different approach from that of FIG. 4 for accomplishing the same transmitter function is shown in FIG. 5. In this diagram, the LO signal, rather than the modulated RF signal, is distributed using corporate feed 122. The analog transmit IF signal is up-converted to RF separately by a corresponding up-converter mixer 106 for each antenna element 102. The reason why a corporate feed need not be used to distribute the IF signal in this case is that the signal delays due to electromagnetic-wave propagation throughout the system are small compared to the symbol duration at IF.

Active Array Transmitter Based on BDS Signal Distribution

Figure 6:
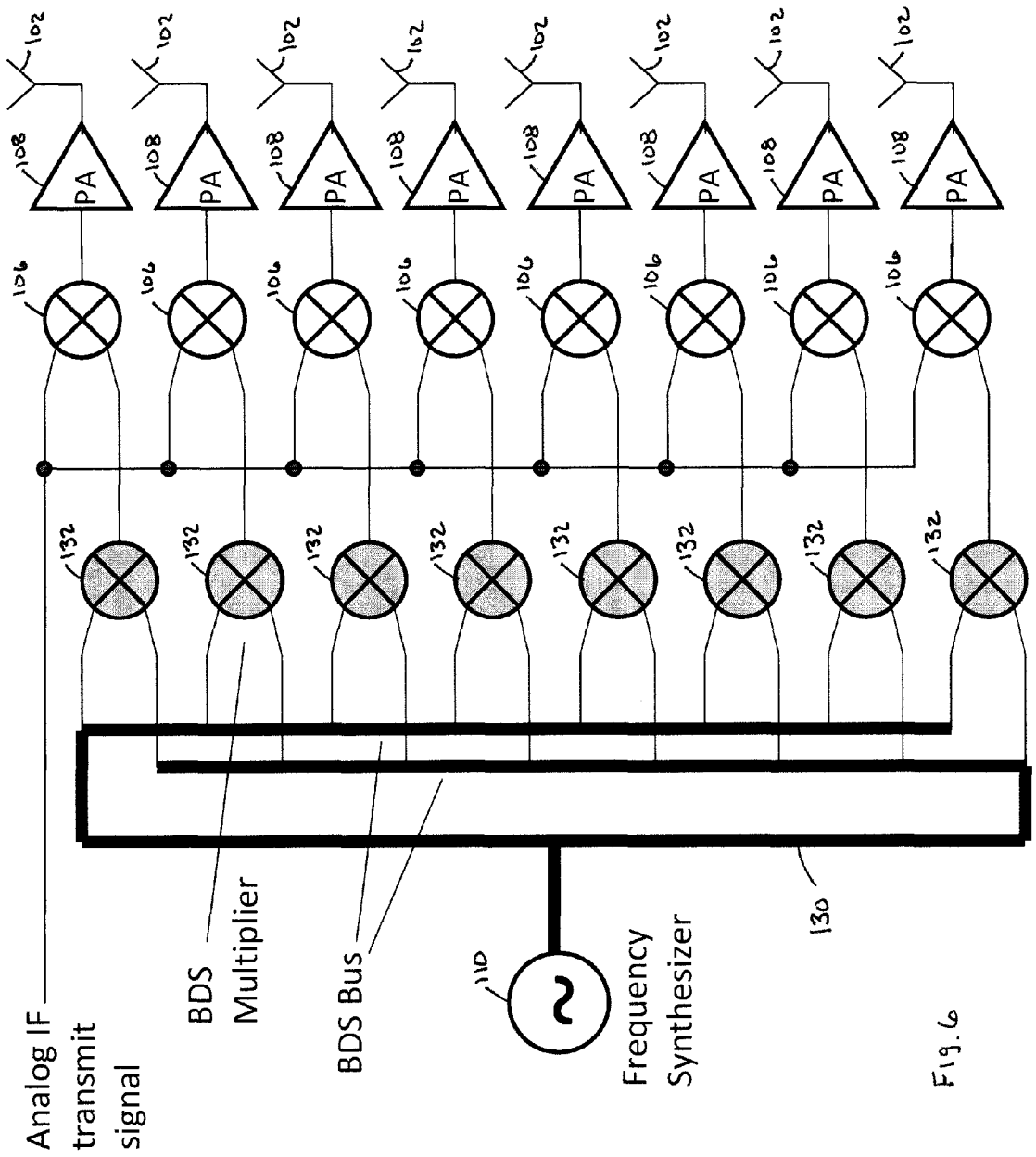
FIG. 6 depicts a schematic diagram of a wireless transmitter for a phased-array antenna system with LO signal distributed through a BDS system, with IF signal up-conversion at each individual antenna, with PA at each individual antenna, and without amplitude or phase control for antenna transmitted signals.

The corporate feed can be eliminated by using BDS distribution described above. In that case, the large delays resulting from serial connectivity are compensated automatically by the BDS methodology. FIG. 6 shows a scheme corresponding to the one shown in FIG. 5 but with a BDS bus 130 and BDS multipliers 132 used to distribute the LO signals. In this case, the synchronized LO signals are generated by BDS multipliers 132 and the analog IF transmit signal is converted to RF for each antenna element 102 by an up-converter mixer 106 associated with each antenna element 122. So, in this example, there is an equal number of BDS multipliers 132 and up-converter mixers 106.

Figure 7:
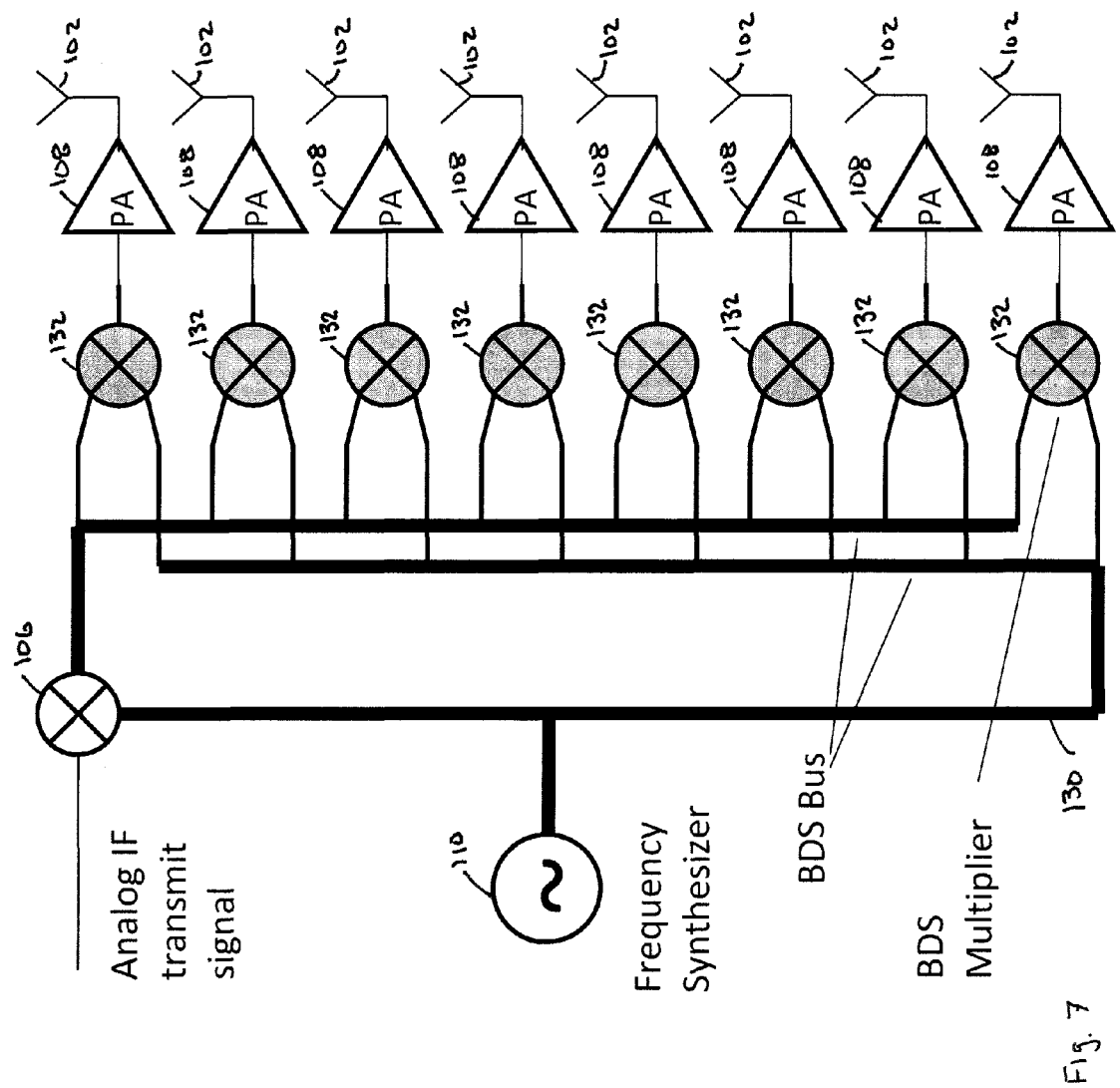
FIG. 7 depicts a schematic diagram of a wireless transmitter for a phased-array antenna system with LO signal and IF signal distributed through a BDS system, with PA at each individual antenna, and without amplitude or phase control for antenna transmitted signals.

As should be apparent, the system of FIG. 6 is redundant in terms of mixer/multiplier circuit use since the functionality of the up conversion mixers is included in the BDS multipliers. A simpler configuration which eliminates the redundancy is shown in FIG. 7, where the IF signal is up converted to half RF only once, before being distributed through one of the two BDS trees. More specifically, there is one up-converter mixer 106 which receives the LO signal and generates an RF signal that is supplied to the other tree of the BDS bus 130. So, one tree of the BDS bus is carrying the LO signal and the tree branch of the BDS bus is carrying the RF signal. BDS multipliers 132 multiply these two distributed signals to generate an effectively synchronized RF distribution. (Note that the BDS trees may simply be BDS lines or BDS trunks with no branches. In other words, use of the word "tree" in the current description is not meant to imply the BDS network needs to be as complicated as shown in FIG. 3 and that will continue to be true for the rest of the description.)

Amplitude and Phase Setting under Electronic Control

Figure 8A:
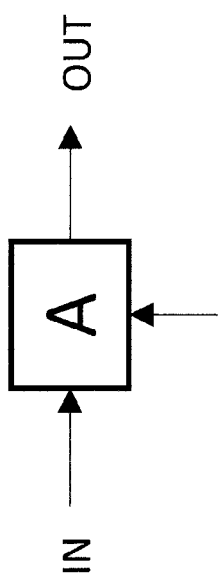
FIGS. 8(a)-(c) illustrate A-Setting, P-Setting, and A/P-Setting circuits.
Figure 8B:
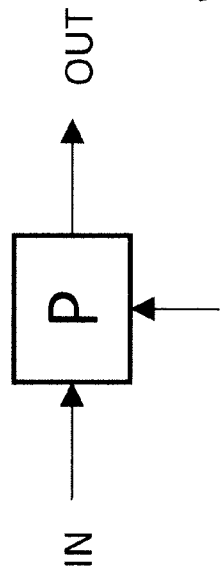

The active array transmitters considered so far have synchronized antenna signals but have no mechanisms for changing the relative phase or amplitude of individual antenna signals. This capability is necessary to create various radiation patterns and is realized by using additional circuits called A-Setting, P-Setting, or A/P-Setting circuits, illustrated in FIGS. 8(a)-(c).

Figure 9A:
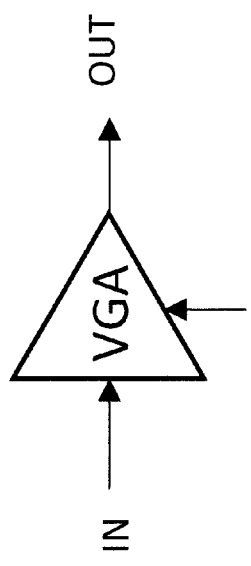
FIGS. 9(a)-(c) depict schematic diagrams for possible implementations of A-Setting and P-Setting circuits.

An A-Setting circuit is equivalent to a variable gain amplifier, as illustrated in FIG. 9(a). The ratio of the output signal amplitude to the input signal amplitude is programmable and is set by electronic control. Typically, this control is analog or digital (preferred), changing circuit parameters such as bias conditions, feedback resistor ratios, etc.

Figure 9B:
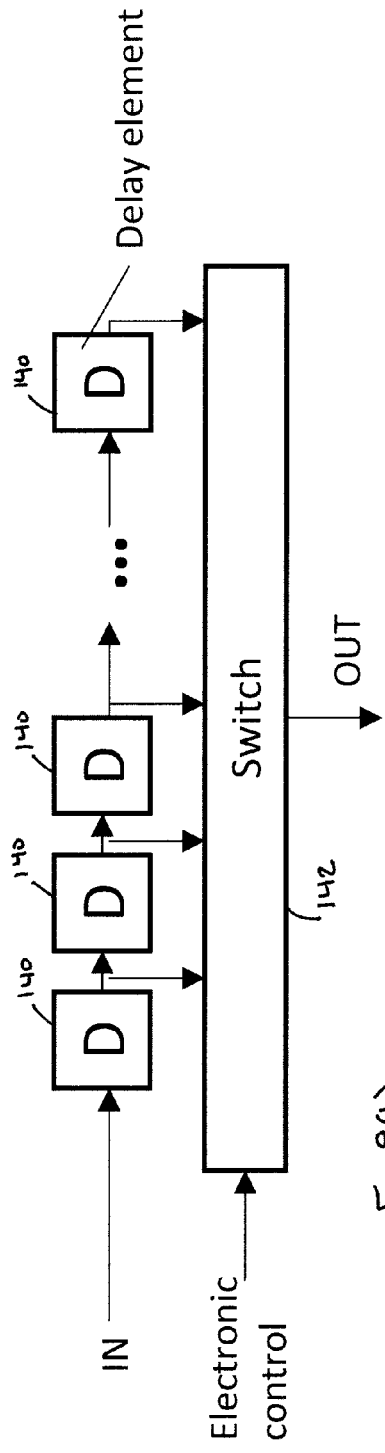
Figure 9C:
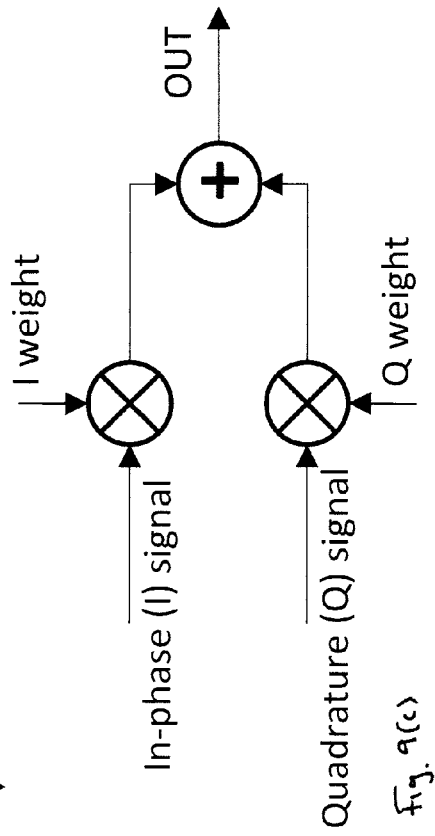

A P-Setting circuit has the fundamental capability of shifting the input signal in phase (or time) under electronic control. FIGS. 9(b) and 9(c) show possible practical realizations of P-Setting circuits. In FIG. 9(b), multiple delay elements 140 are used to delay the input signal by fixed amounts and a multiple-input/single-output switch (or multiplexer) 142 under electronic control is used to connect to the output the desired delayed version of the input.

A different type of P-Setting circuit is shown in FIG. 9(c). This circuit uses the principle of vector summation. Quadrature signals (I and Q) are first weighted in amplitude by multiplying with constants (alternately, one could use A-Setting circuits to do this) and then the multiplied signals are added. Depending on the value of the weights (i.e., amplitude changes), the output signal shifts in phase by well-controlled values.

Figure 8C:
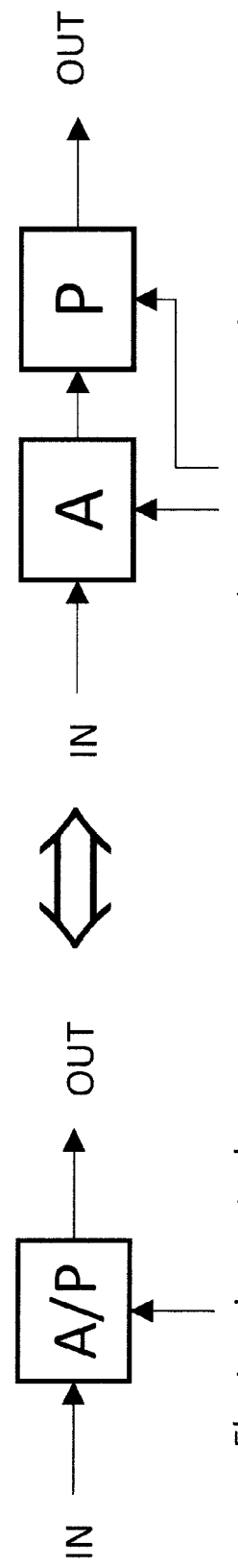

The A/P-Setting circuits can set both the output amplitude and the output phase under electronic controls. In principle, the A/P-Setting circuit is a series combination of A-Setting and P-Setting circuits, as illustrated in FIG. 8(c). The I/Q vector summation circuit of FIG. 9(c) can be used as an A/P-Setting circuit in addition to being a P-Setting circuit. (Note that in the circuits described herein the use of an A/P-Setting circuit is meant to imply that it can function to control both amplitude and phase, only phase, or only amplitude.)

Active Array Transmitter with BDS Distribution and Amplitude/Phase Control

Figure 10:
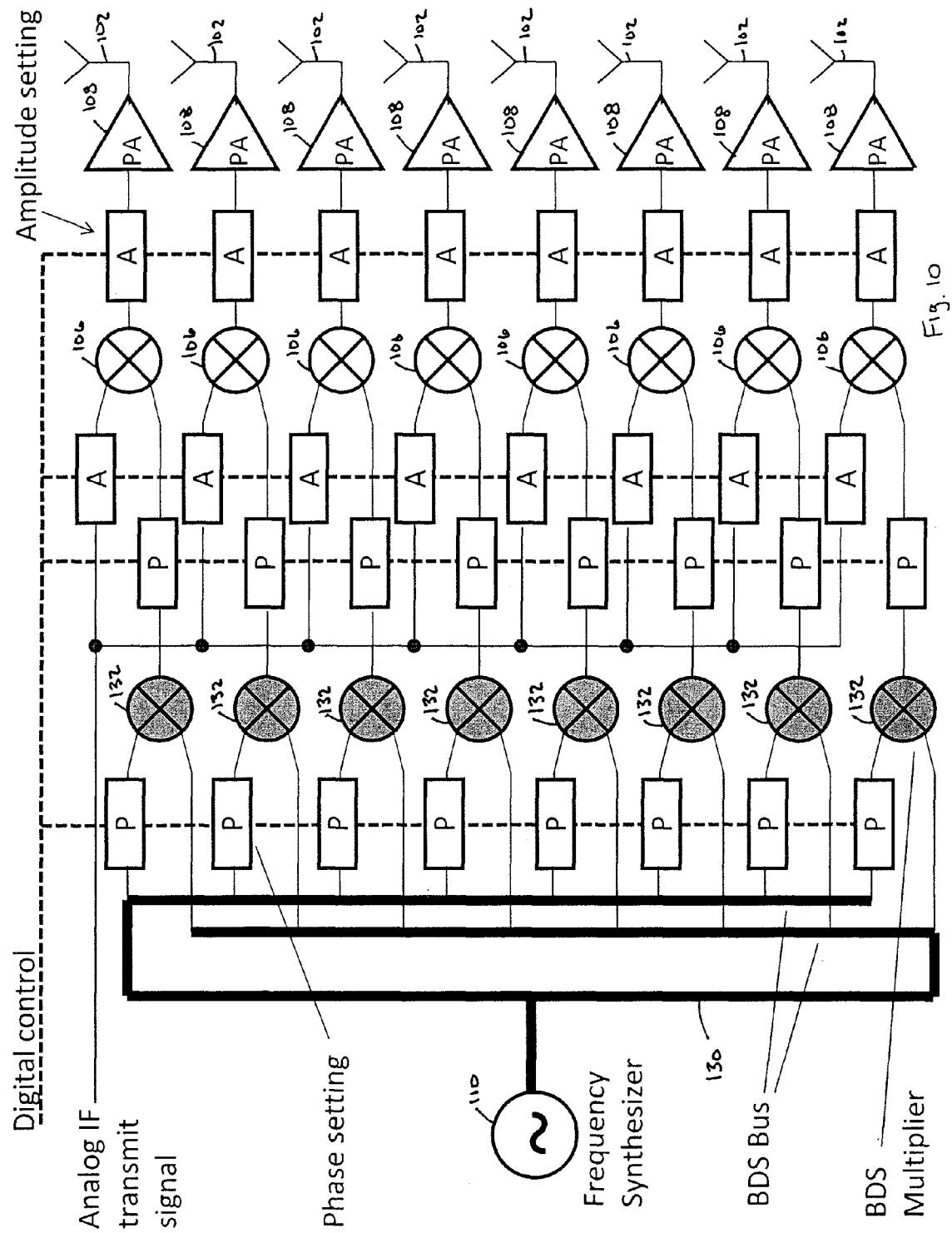
FIG. 10 depicts a schematic diagram of a wireless transmitter for a phased-array antenna system with LO signal distributed through a BDS system, with IF signal up-conversion at each individual antenna, with PA at each individual antenna, and with amplitude or phase control for antenna transmitted signals.

The antenna array transmitter in FIG. 10 is derived from the circuit in FIG. 6 by adding A-Setting and P-Setting circuits at various points in the network. This topology is just one of many possibilities for giving the basic transmitter of FIG. 6 the capability to control independently the amplitude and phase values of the individual antenna signals. Digital controls are preferred but analog controls are also possible.

It is useful to have at least one P-Setting circuit associated with each BDS multiplier, either at one of the inputs of the BDS multiplier or at the output of the BDS multiplier. The illustrated circuit includes a P-Setting circuit at both locations relative to the BDS multiplier.

Similarly, it is useful to have at least one A-Setting circuit associated with each up-converter mixer 106, either at one of the inputs of the up-converter mixer or at the output of the up-converter mixer. The illustrated circuit includes an A-Setting circuit at both locations relative to the up-converter mixer.

Figure 11A:
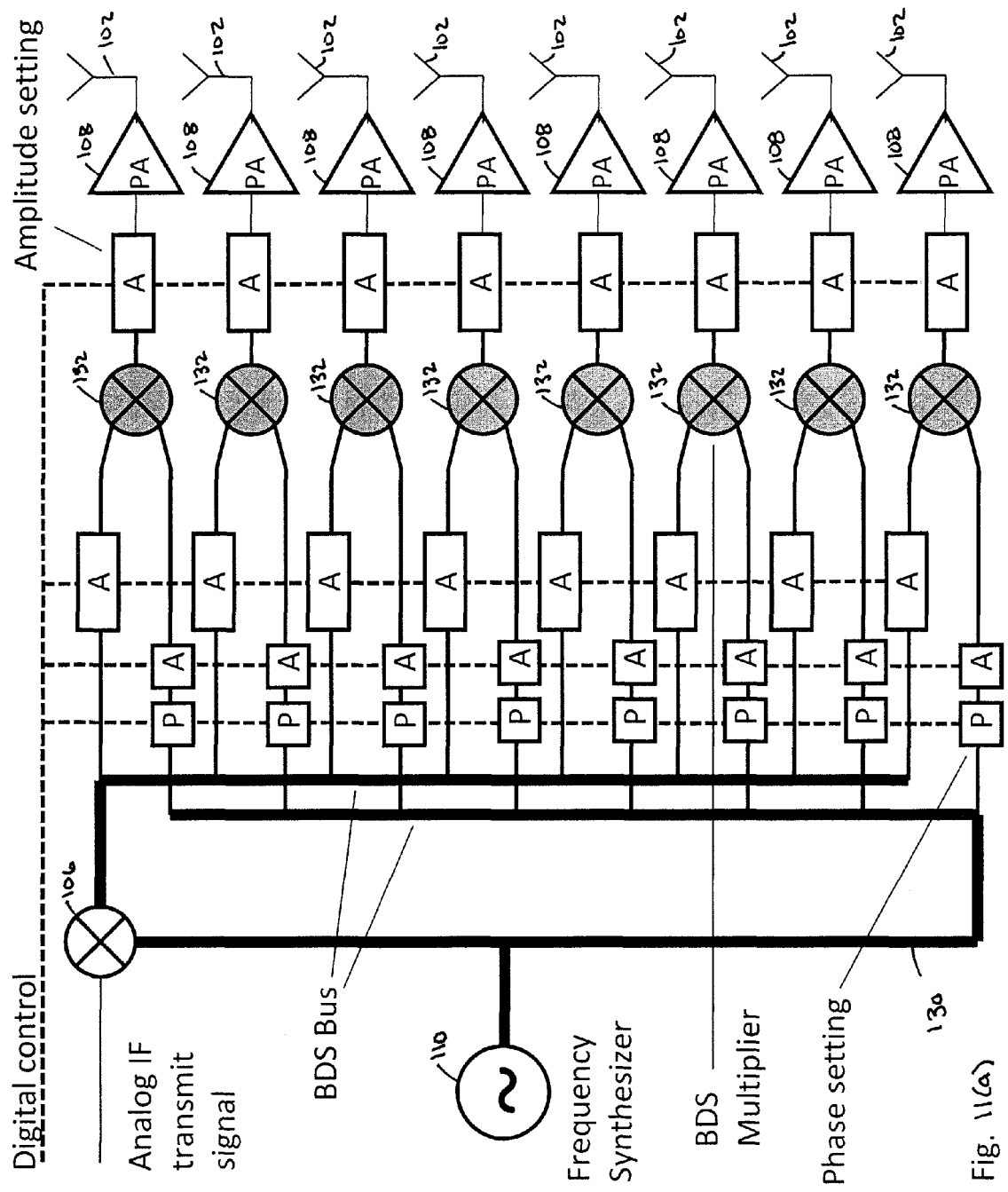
FIGS. 11(a)-(d) depict schematic diagrams of various wireless transmitters for a phased-array antenna system with LO signal and IF signal distributed through a BDS system, with PA at each individual antenna, and with amplitude or phase control for antenna transmitted signals.
Figure 11B:
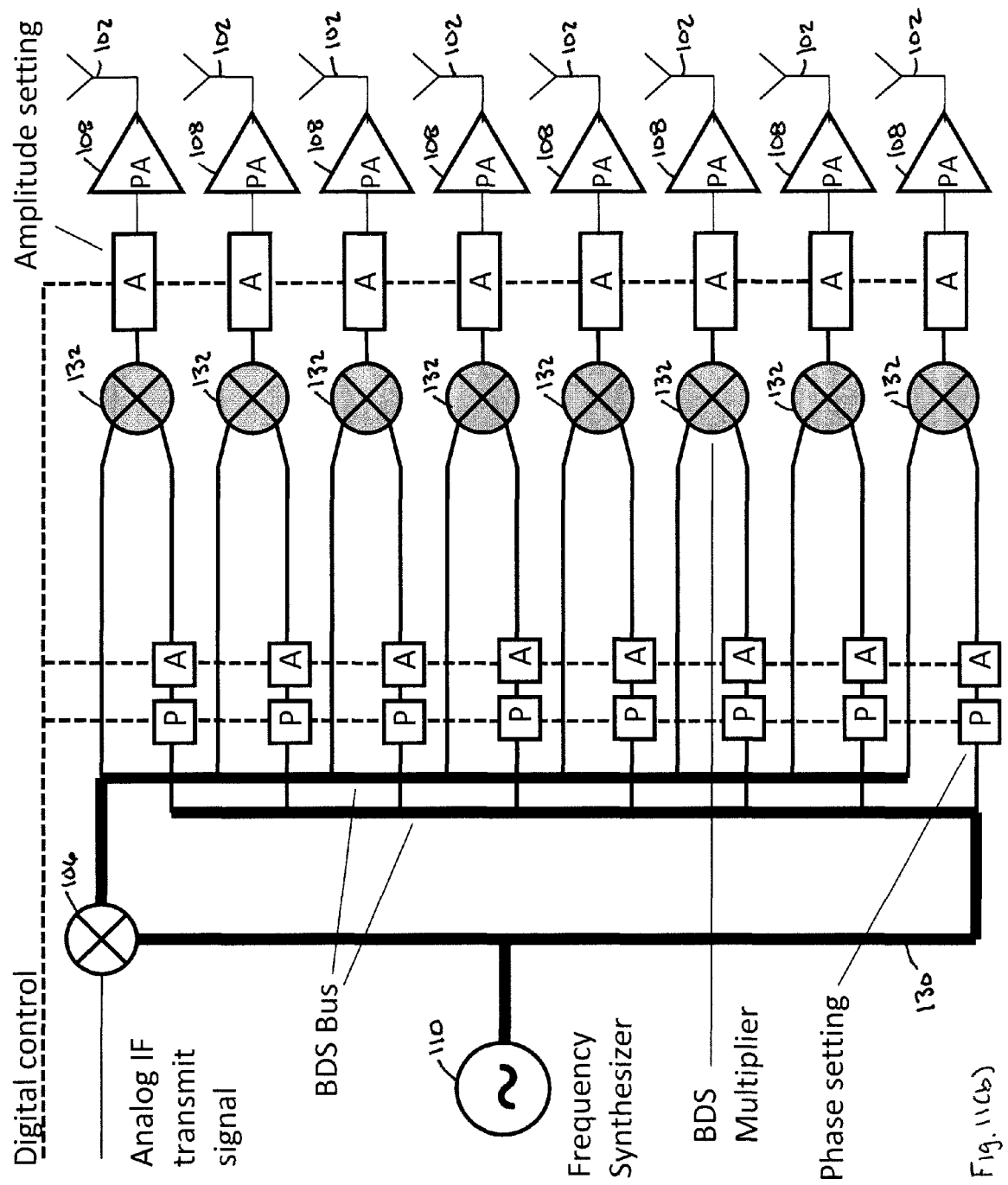
Figure 11C:
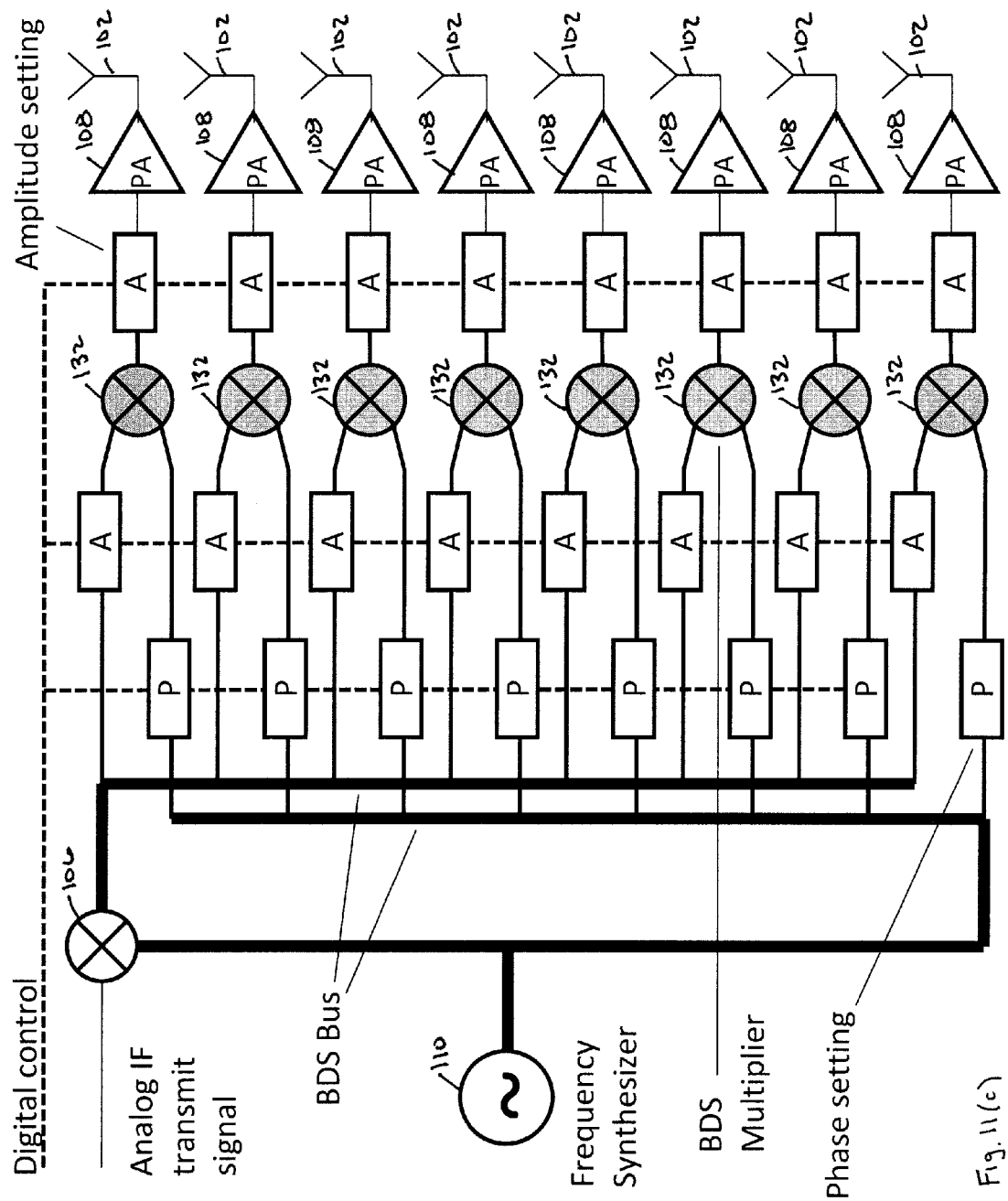
Figure 11D:
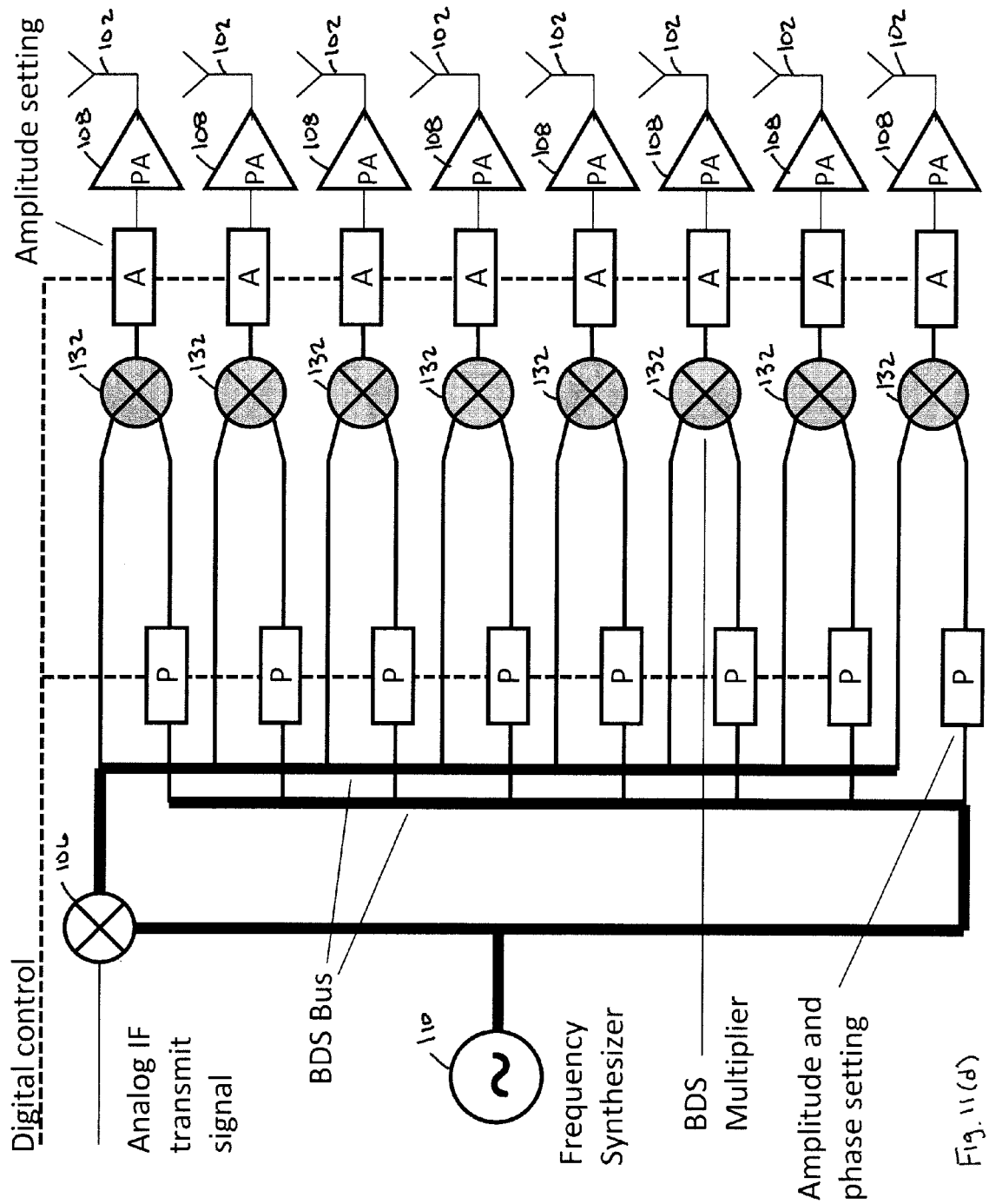

FIG. 11(a) shows an antenna array transmitter derived from the circuit of FIG. 7 in which the up-conversion is performed on a signal delivered to one of the trees of the BDS. More specifically, up-converter mixer 106 up converts the IF transmit signal and delivers it to one of the BDS trees so that one BDS tree carries the LO signal and the other BDS tree is carrying the modulated LO signal.

It is useful to include a P-Setting circuit in association with each BDS multiplier 132. In the described embodiment, the P-Setting circuit is in an input line to the BDS multiplier, more specifically, the input line that receives the distributed, un-modulated LO signal from the BDS bus. The P-Setting circuit could be in other locations (e.g. the other input line or the output line). However, it is easier to control the phase of the un-modulated signal than it is to control the phase of a modulated signal.

Similarly, it is useful to have at least one A-Setting circuit associated with each BDS multiplier 132, either at one of the inputs of the BDS multiplier or at the output of the BDS multiplier mixer. The system illustrated in FIG. 11(*a*) includes an A-Setting circuit at both inputs and the output of each BDS multiplier, though it should be appreciated that setting the amplitude is easier done on the un-modulated signal. An alternative approach is illustrated by FIG. 11(*b*) according to which an A-Setting circuit is located in the same input to the BDS multiplier that has the P-Setting circuit and at the output of each BDS multiplier. Yet another approach is illustrated by FIG. 11(*c*) according to which an A-Setting circuit is located in the input to the BDS multiplier that does not have the P-Setting circuit and at the output of each BDS multiplier. And still another approach is illustrated in FIG. 11(*d*) according to which an A-Setting circuit is located only on the output of each BDS multiplier.

Active Array Receiver Based on Corporate Feed Signal Aggregation

The receiver subsystem in the typical wireless transceiver of FIG. 3 using a single antenna includes a low noise amplifier (LNA) 150, a down-conversion mixer (Down Converter) 152, a channel IF filter 154, an automatic gain control (AGC) 156, an analog-to-digital converter (ADC) 158, and baseband digital processing 115. The receiver down converter mixer 152 uses an LO signal generated by frequency synthesizer 110. Typically, low noise amplifier 150 receives from antenna 102 a very small desired signal and other undesired large interfering signals. Down converter mixer 152 moves this combination of signals to an IF where filters remove the undesired interference. Automatic gain control 156 amplifies the desired signal to a level where the analog-to-digital converter 158 can digitize it with appropriate resolution. After digitization, the received signal is further processed so that the digital information it carries can be extracted.

Figure 12:
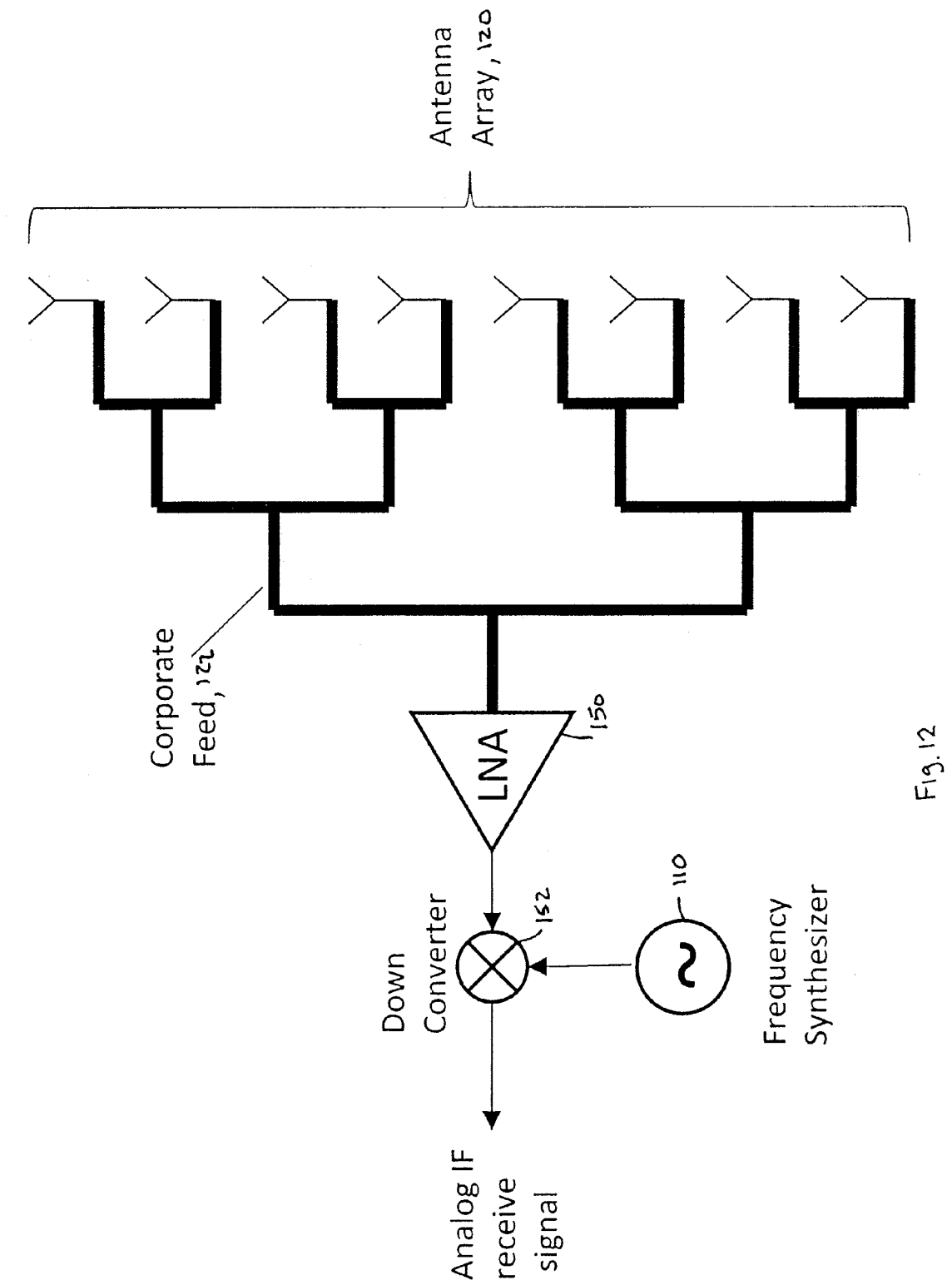
FIG. 12 depicts a schematic diagram of a wireless receiver for a phased-array antenna system with LNA input signal accumulated through a corporate feed, and without amplitude or phase control for antenna received signals.

Similar to the transmitter case, an antenna array may be used instead of a single antenna with the help of a corporate feed. Such a system is shown in FIG. 12 using binary topology corporate feed 122 for a linear array 120. In this case, the antenna signals travel in opposite directions as compared to the transmitter signal and they aggregate as they move towards the input of low noise amplifier 150. Planar arrays would require a more complicated corporate feed, such as an H-tree based configuration.

Figure 13:
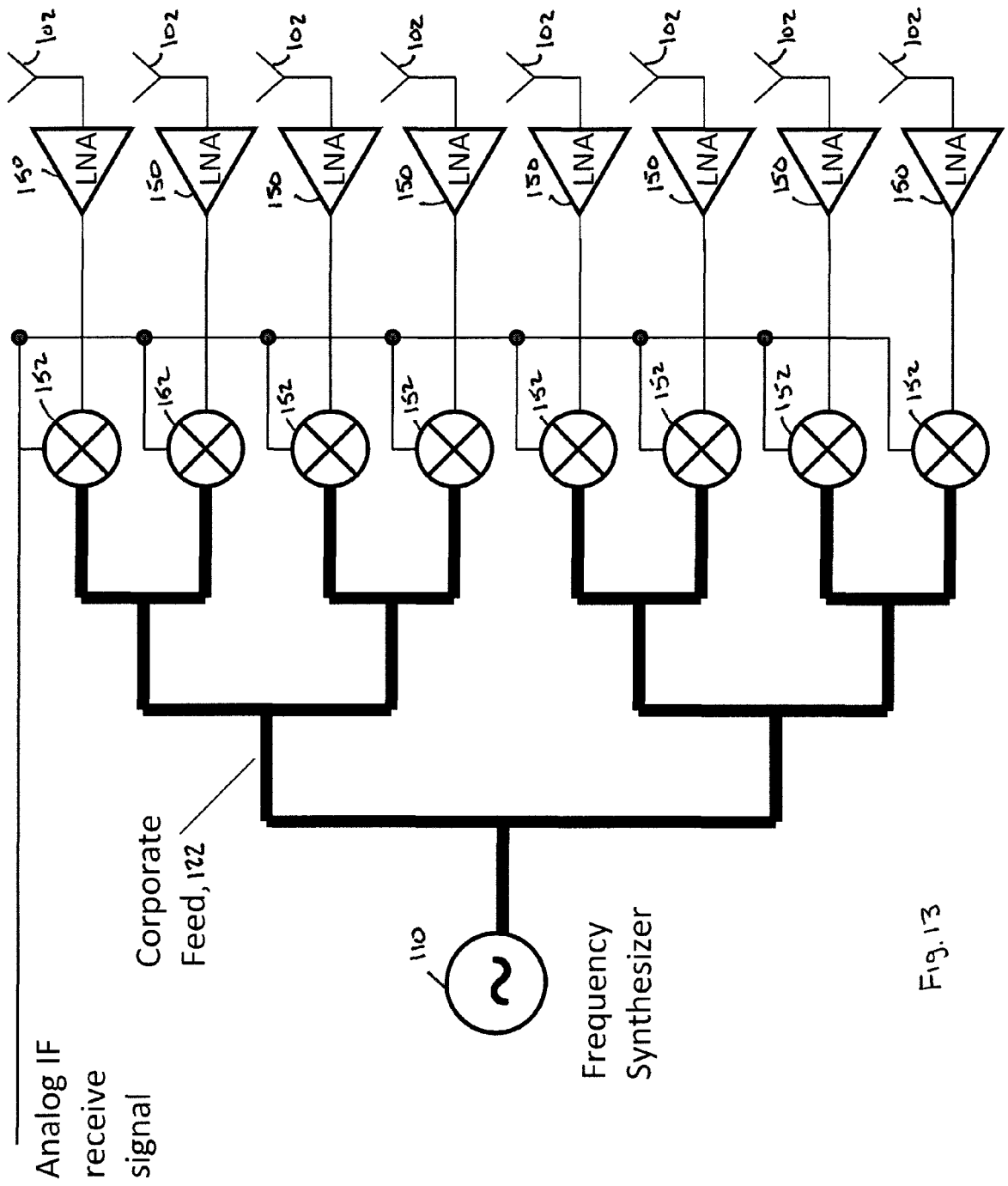
FIG. 13 depicts a schematic diagram of a wireless receiver for a phased-array antenna system with LO signal distributed through a corporate feed, with IF signal down-conversion at each individual antenna, with LNA at each individual antenna, and without amplitude or phase control for antenna received signals.

FIG. 13 shows a receiver which uses corporate feed 122 for LO signal distribution and down-conversion mixer 152 for each antenna signal. More specifically, it has a down-conversion mixer 152 for each antenna element 102. The received signal from each antenna element 102 is amplified by an associated low noise amplifier 150 and supplied to one side of down-conversion mixer 152. A corporate feed 122 distributes the LO signal from frequency synthesizer 110 to each down-conversion mixer 152, which in turn uses that signal to down-convert the amplified signal to an analog IF received signal. Signal aggregation is accomplished at IF by simply tying all IF signals together on the same line. As in the transmitter case, the signal delays at IF are small compared to the symbol duration.

Active Array Receiver Based on BDS LO Signal Distribution

Figure 14:
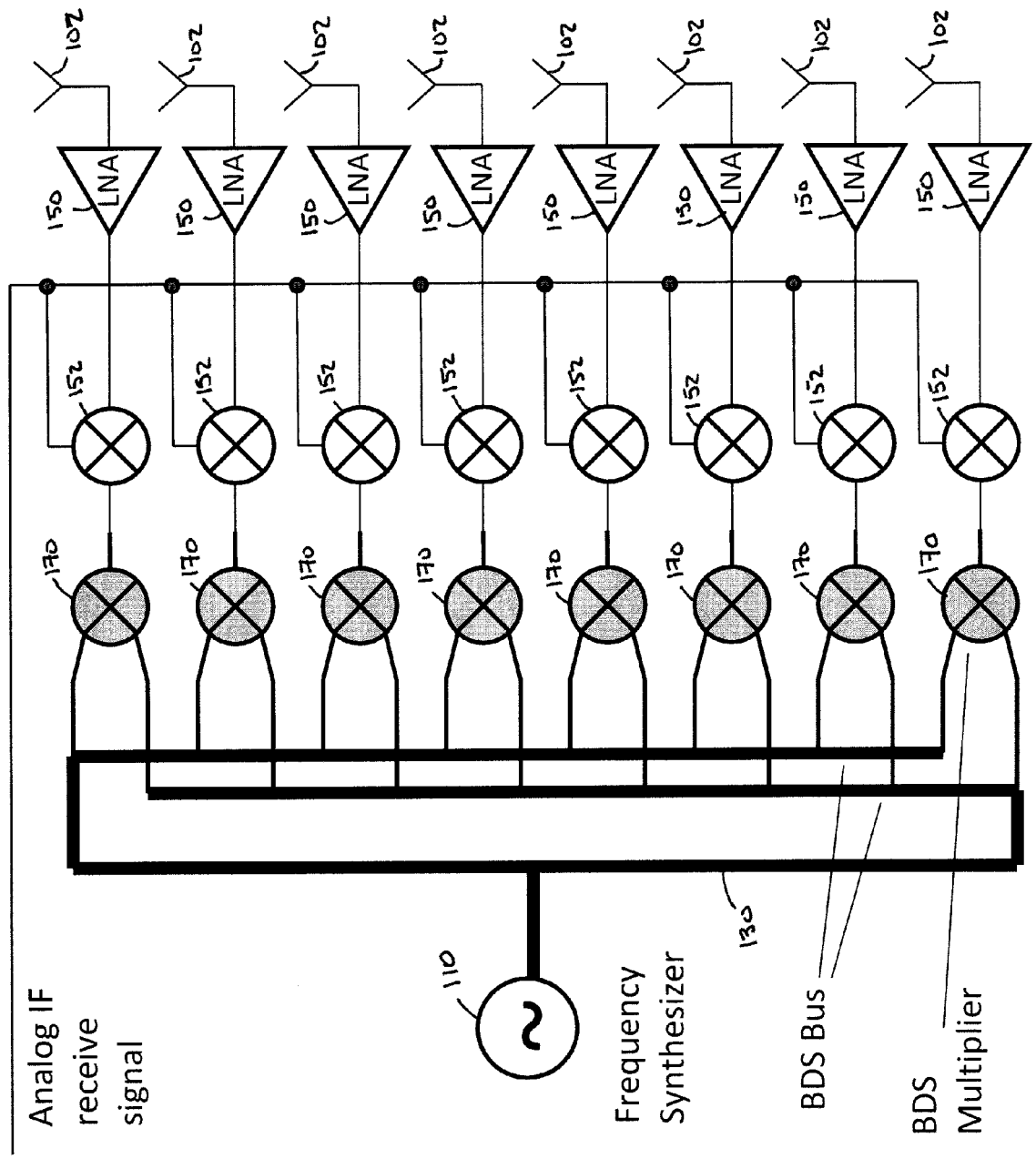
FIG. 14 depicts a schematic diagram of a wireless receiver for a phased-array antenna system with LO signal distributed through a BDS system, with IF signal down-conversion at each individual antenna, with LNA at each individual antenna, and without amplitude or phase control for antenna received signals.

If corporate feed LO distribution 122 in FIG. 13 is replaced by BDS LO distribution, we obtain the receiver shown in FIG. 14. As in the other examples, the BDS LO distribution is accomplished through a BDS bus 130 with a BDS multipliers 170 connected at various locations on that bus, one for each up-conversion mixer 152/antenna element 102.

A variation of this scheme uses the BDS bus not only for LO distribution but also for aggregation of the IF signals. In other words, instead of having a separate IF line for connecting the IF signals from individual antennas as in FIG. 14, one of the BDS trees would be used for this purpose. This is possible in principle because the LO and IF signals are widely separated in frequency. Simple filters would be necessary to separate the two signals. For example, the connections between the BDS bus and BDS multipliers in FIG. 14 would contain high-pass filters, allowing the LO signal into BDS multipliers 170 but blocking the IF signal. The aggregated IF received signal would be extracted from the BDS bus with low-pass filters blocking the LO signal.

Active Array Receiver with BDS LO Distribution and Amplitude/Phase Control

As in the transmitter case, we can modify the receiver of FIG. 14 to add capability for amplitude and/or phase control of the individual antenna signals. This enables us to electronically control the shape and direction of the beam pattern of the antenna array, as in the case of the previously described transmitter. Such a modification is shown in FIG. 15(*a*) using P-Setting and A-Setting circuits. As indicated a P-Setting circuit is added to one input of each BDS multiplier 170 and an A-Setting circuit is added to the output of each down-conversion mixer 152.

Another approach is shown in FIG. 15(*b*). In this example, a P-Setting circuit is also added to each output of a BDS multiplier 170 before the signal passes to the corresponding down-conversion mixer 152. Still other arrangements exist that involve placing A/P-Setting, A-Setting, or P-Setting circuits at various other points in the network, similar to what was described before in connection with the transmitter.

TAPA Circuits with Two Input Terminals

Previously, transmitters and receivers were discussed separately. The term "transceiver" used herein means either a separate transmitter, or a separate receiver, or a system including both transmitter and receiver. The active array transceivers discussed above, which use BDS buses, contain TAPA circuits (Tunable Amplitude and Phase ATAC circuits) with two input terminals, each coupled to a corresponding one of the two trees of the BDS bus. Next, we show general cases of such TAPA circuits.

A first class of TAPA circuits with two inputs is illustrated in FIGS. 16(*a*)-(*d*). The TAPA circuits in this class include a single BDS multiplier (or mixer) 180 and at least one A/P-Setting circuit connected to at least one of the BDS multiplier (or mixer) terminals so as to allow all signals coming from the BDS bus 130 to travel towards the output. In these examples, the A/P-Setting circuit, under electronic control, can modulate amplitude, phase or both of the signal passing through them. These TAPA circuits provide output signals, which are coherent with the output of a virtual BDS multiplier connected to the same inputs, the output signals having amplitude and phase values controlled by electronic control circuitry (e.g. a programmed digital processor). Each tree of the BDS bus carries a modulated or un-modulated carrier at frequency f, one tree carrying its signal in one direction (e.g. down) and the other tree carrying its signal in the opposite direction (e.g. up). If one tree is carrying a modulated carrier signal the other will carry an un-modulated signal.

Figure 17:
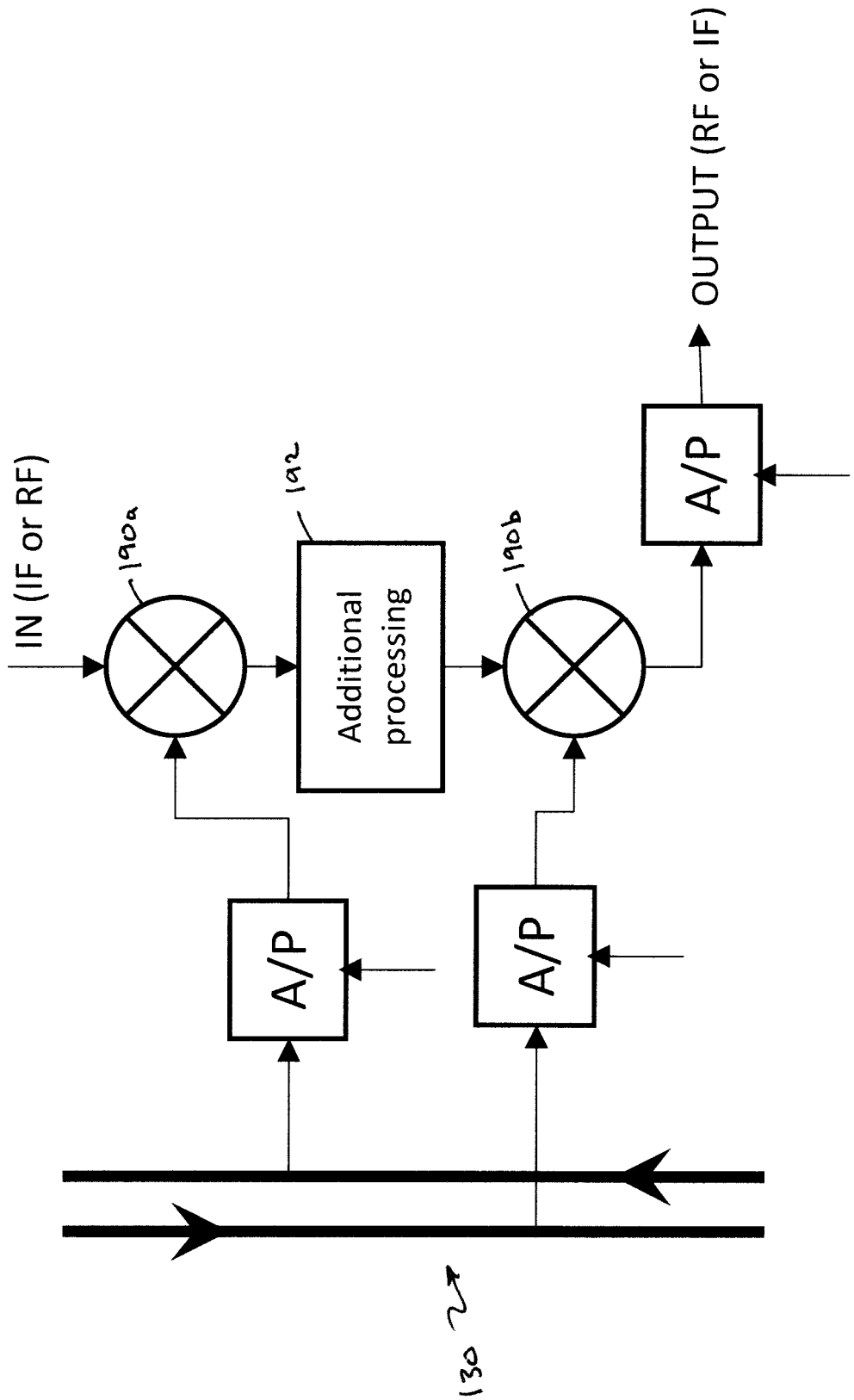
FIG. 17 depicts a schematic diagram of a TAPA circuit, which may be used in a phased-array antenna system, with two multiplications, with two A/P-Setting circuits placed before multiplication and with an A/P-Setting circuit placed after multiplications.

A second class of TAPA circuits with two inputs is illustrated in FIG. 17. The TAPA circuits in this class include two BDS multipliers (or mixers) 190*a* and 190*b* and at least one A/P-Setting circuit connected to at least one of the BDS multiplier (or mixer) terminals such as to allow all signals coming from the BDS bus to travel towards the output. Additional processing (e.g. filtering) is performed on the signal from BDS multiplier (or mixer) 190a to eliminate unwanted frequency bands produced by BDS multiplier (or mixer) 190a. Note that if the implementation is used within a transmitter, then the input to multiplier (or mixer) 190a is an IF signal and the output of the overall circuit is an RF signal. On the other hand, if the implementation is within a receiver, then the input to multiplier (or mixer) 190a is an RF signal and the output of the overall circuit is an IF signal.

The particular embodiment in FIG. 17 contains three A/P-Setting circuits as shown. The TAPA circuits in this class can provide signal synchronization, amplitude/phase control, and frequency conversion (up or down conversion). The added frequency conversion functionality compared to the TAPA circuits in the first class is due to the use of two multipliers or mixers. This is similar to the transmitter in FIG. 10 or the receiver in FIGS. 15(a)-(b), which contain two multipliers or mixers per antenna circuit.

TAPA Circuits with Three Input Terminals

In principle, it is necessary to use at least two distribution tree networks in the BDS bus to be able to accomplish signal synchronization over the entire system based on the BDS principle. However, by using a BDS bus with three distribution tree networks instead of two distribution tree networks additional transceiver circuits are possible. These additional transceiver circuits have similar topologies to previously discussed topologies (see FIGS. 6, 7, 10, and 11(a)-(d)) and their variations. The main reason for using more than two tree distribution networks is to facilitate the design of better TAPA circuits, which can take advantage of signal distribution redundancy.

Figure 18A:
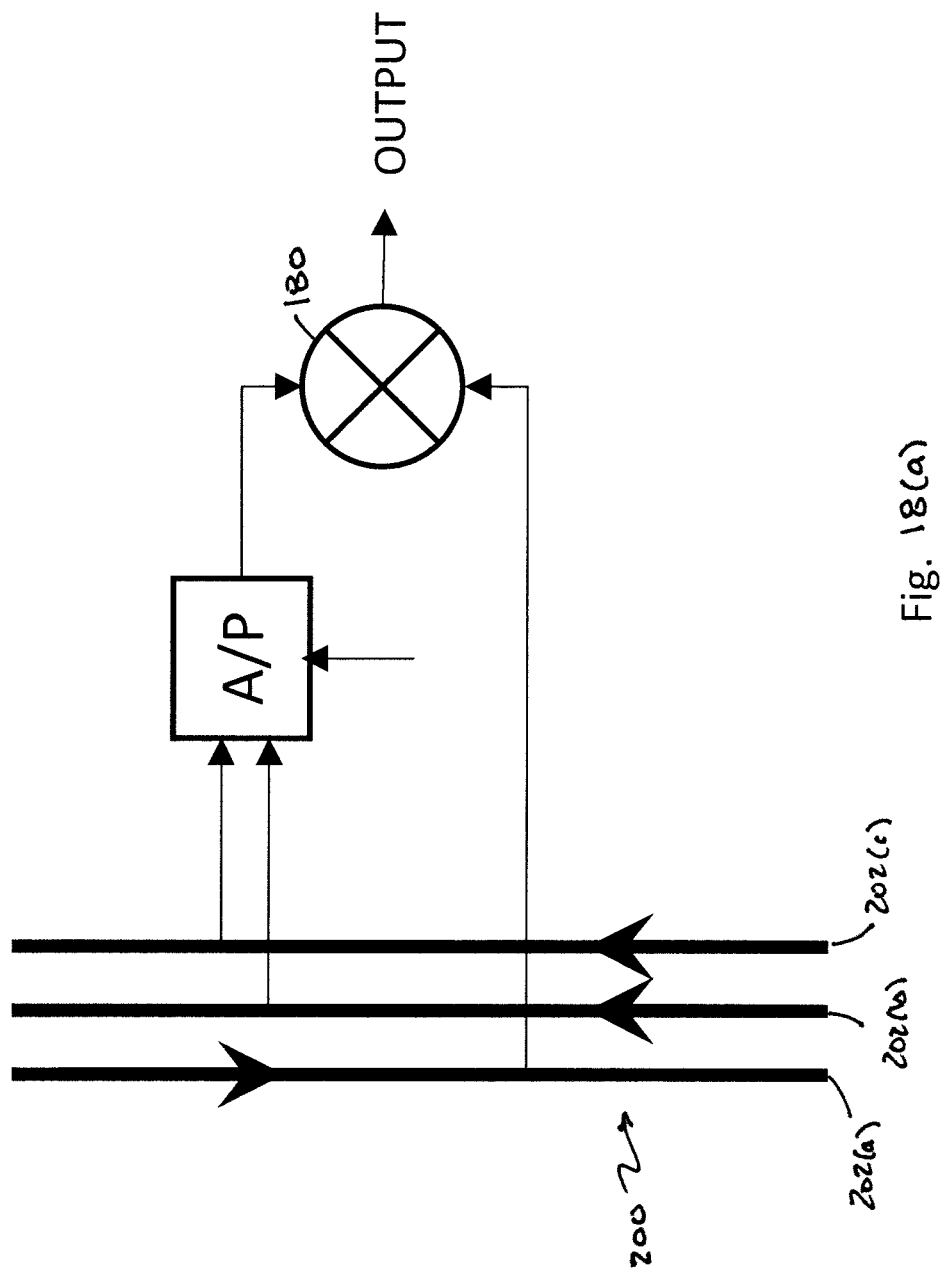
FIG. 18(a) depicts a schematic diagram of a TAPA circuit, which may be used in a phased-array antenna system, with one BDS multiplication and with an A/P-Setting circuit placed before BDS multiplication, the A/P-Setting circuit receiving two equal but phase shifted input signals.

FIG. 18(a) shows a BDS bus 200 with three distribution tree networks (as elsewhere, only local portions of the tree networks are shown). Two networks 202(a) and 202(b) are the usual BDS networks with signals propagating in opposite directions. In general, we will call one direction "upwards" and the other direction "downwards." The third distribution tree 202(c) also carries a signal going upwards. The carrier of this signal is equal to the carrier of the other signal going upwards but it is phase shifted with respect to that signal by a fixed amount. For example, one of the signals travelling upwards on network 202(b) has the carrier phase P1 and the other signal travelling upwards on network 202(c) has the carrier phase P2.

Figure 18B:
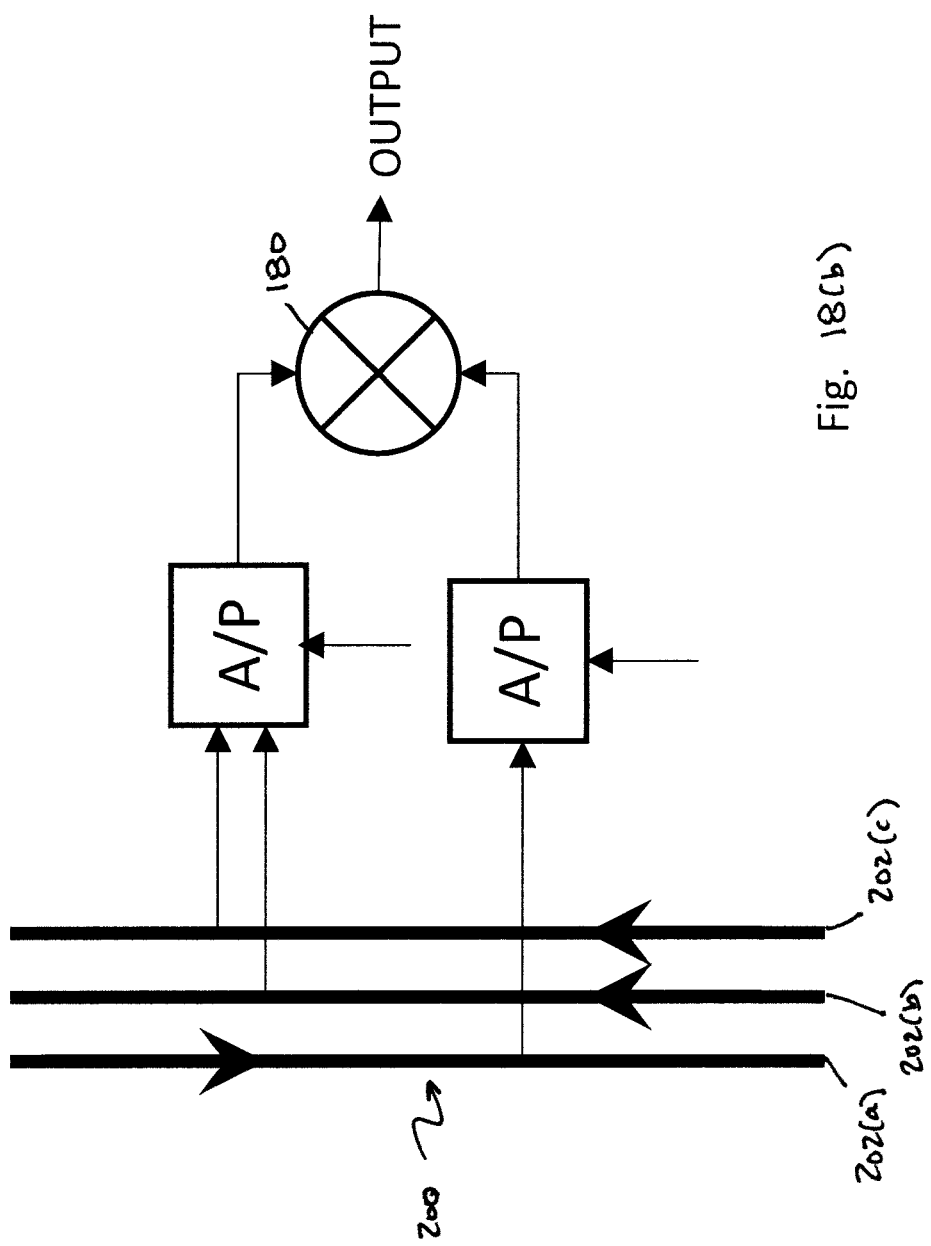
FIG. 18(b) depicts a schematic diagram of a TAPA circuit, which may be used in a phased-array antenna system, with one BDS multiplication and with two A/P-Setting circuits placed before BDS multiplication, one A/P-Setting circuit receiving two equal but phase shifted input signals.
Figure 19:
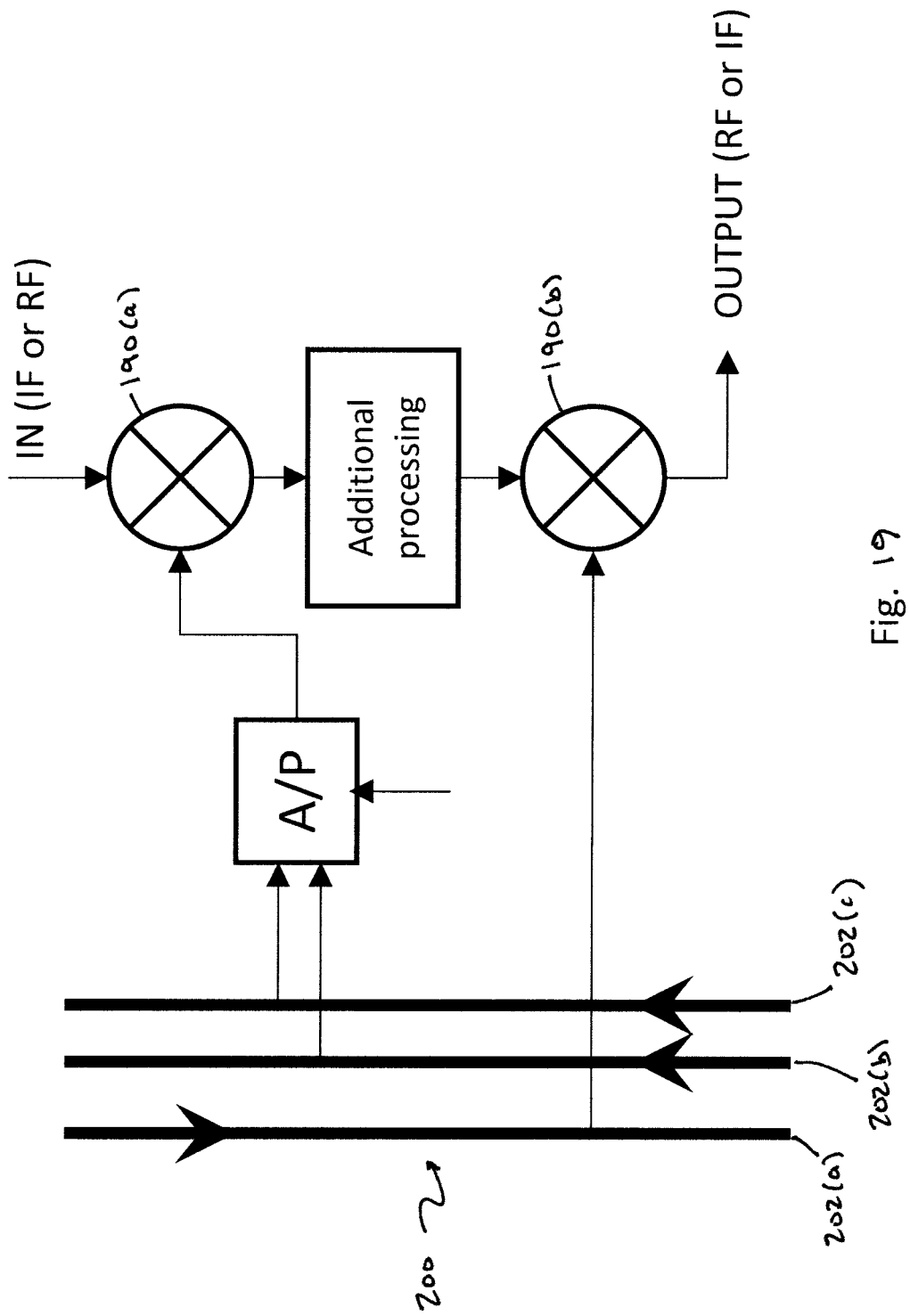
FIG. 19 depicts a schematic diagram of a TAPA circuit, which may be used in a phased-array antenna system, with two multiplications and with an A/P-Setting circuit placed before multiplication, the A/P-Setting circuit receiving two equal but phase shifted input signals.

The TAPA circuit of FIG. 18(a) contains an A/P-Setting circuit with two inputs connected to the trees with signals travelling upwards (i.e., tree 202(b) and tree 202(c)). The rest of the circuit is identical with the circuit in FIG. 16(b). The A/P-Setting circuit for this TAPA circuit can be implemented efficiently based on the vector summation principle shown in FIG. 9(c). Preferably, the two phases P1 and P2 should be different by ninety degrees (i.e., the two signals travelling upwards should be in quadrature) but many other phase shifts would also be acceptable. Obvious extensions of this circuit are shown in FIGS. 18(b) and (c). The circuit in FIG. 19 is analogous to the one shown in FIG. 17.

Figure 20:
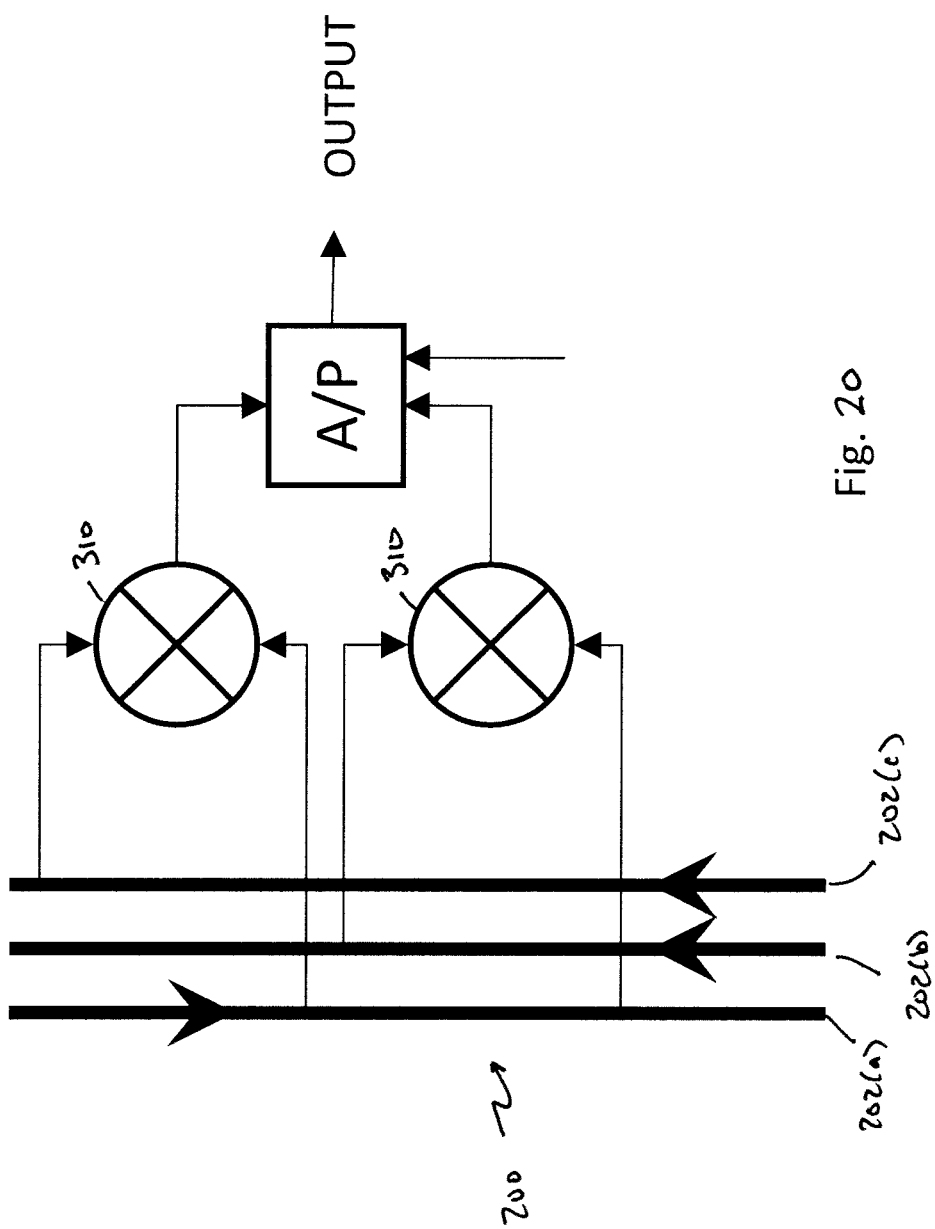
FIG. 20 depicts a schematic diagram of a TAPA circuit, which may be used in a phased-array antenna system, with two BDS multiplications, each BDS multiplication receiving independent BDS signal pairs and with an A/P-Setting circuit placed after BDS multiplications.

A different usage of the BDS bus with three distribution tree networks is shown in FIG. 20. This TAPA circuit uses two BDS multipliers 310 to extract two signals in fixed phase relationship, such as quadrature signals (if P1 and P2 differ by ninety degrees). The A/P-Setting circuit which follows can use the vector summation method of FIG. 9(c).

TAPA Circuits with Multiple Input Terminals

Figure 21:
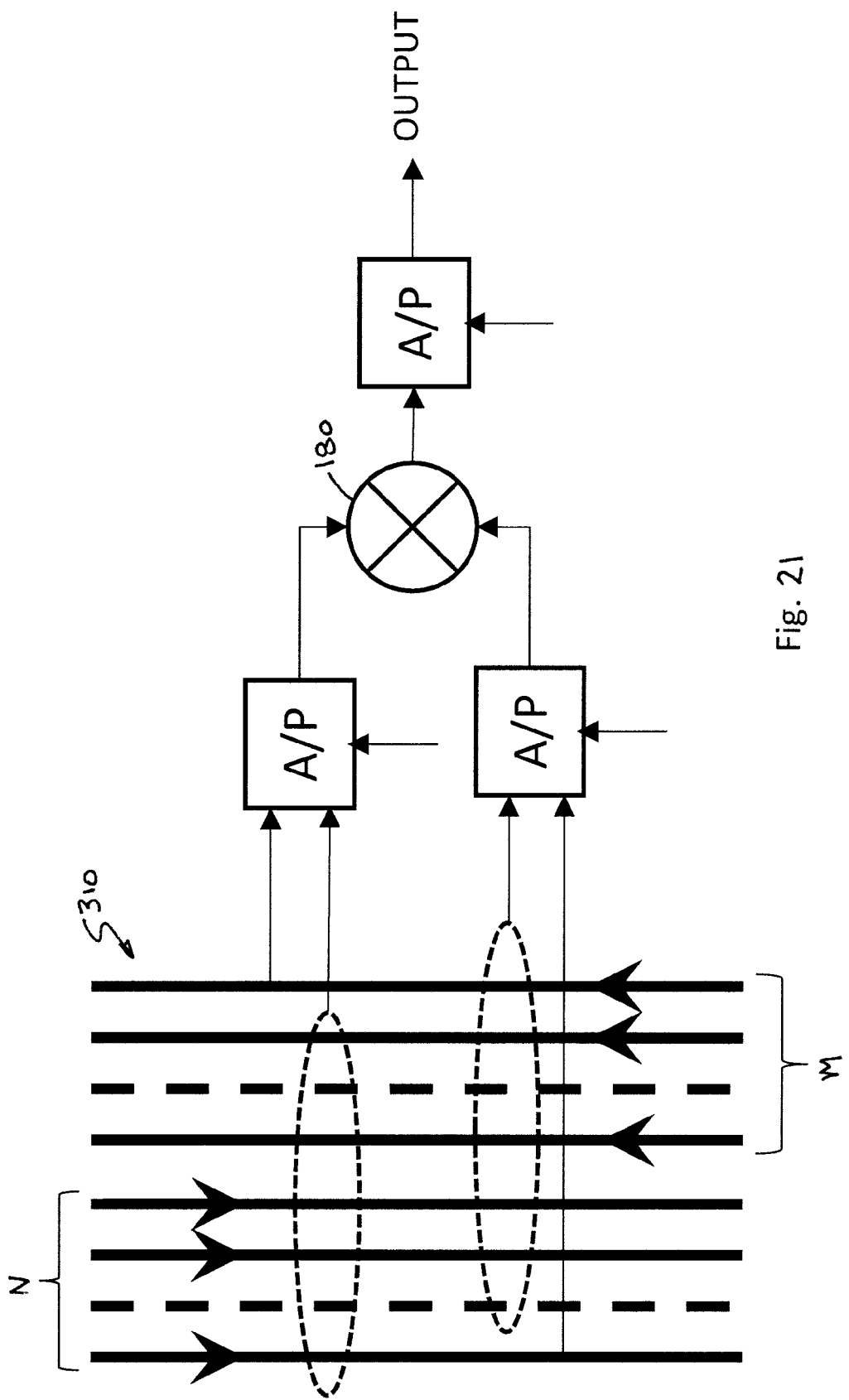
FIG. 21 depicts a schematic diagram of a TAPA circuit, which may be used in a phased-array antenna system, with one BDS multiplication, with two A/P-Setting circuits placed before BDS multiplication, the A/P-Setting circuits receiving multiple BDS signal pairs and multiple equal but phase shifted signals, and with an A/P-Setting circuit placed after BDS multiplication.
Figure 22:
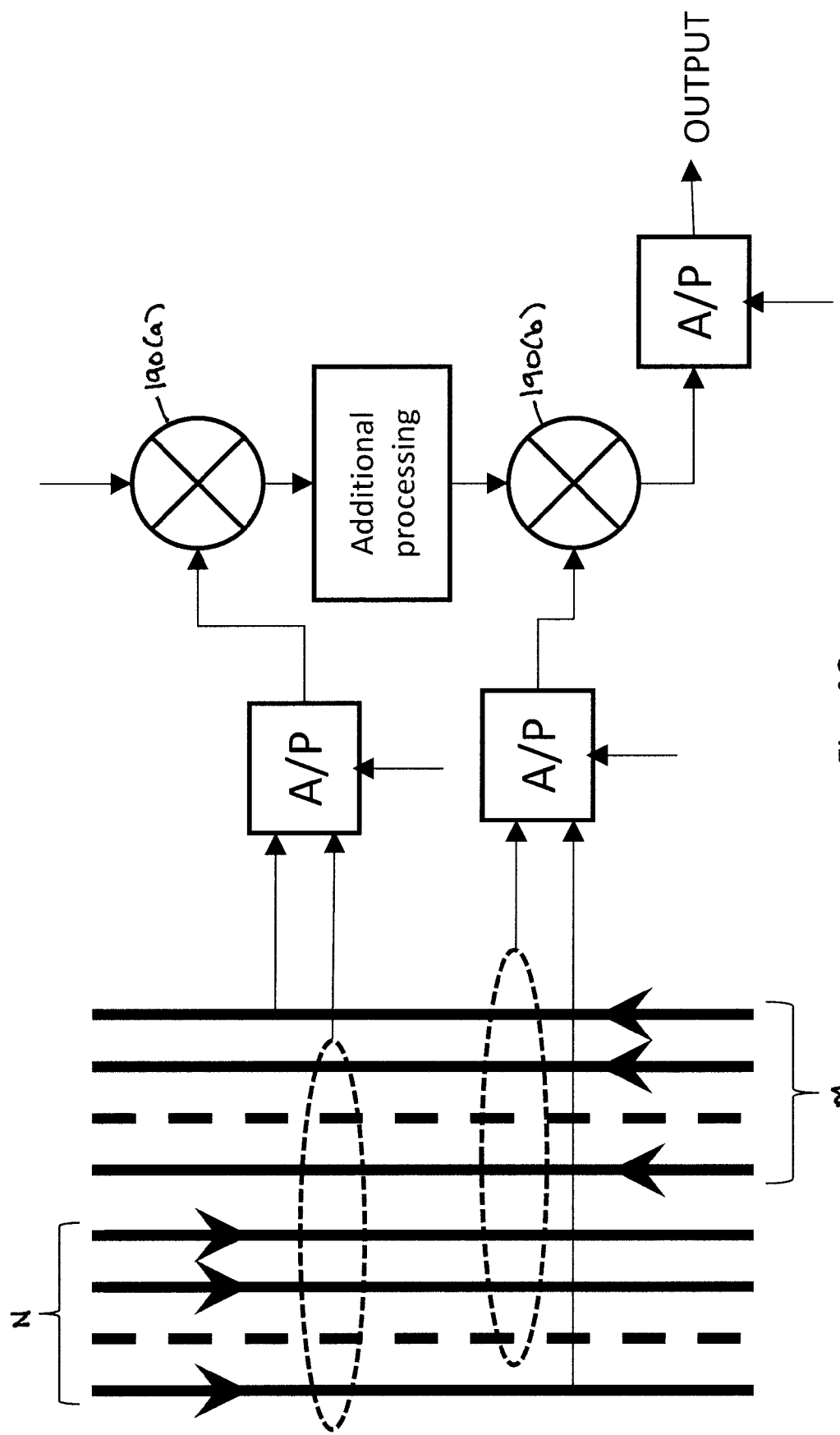
FIG. 22 depicts a schematic diagram of a TAPA circuit, which may be used in a phased-array antenna system, with two BDS multiplication, with two A/P-Setting circuits placed before BDS multiplication, the A/P-Setting circuits receiving multiple BDS signal pairs and multiple equal but phase shifted signals, and with an A/P-Setting circuit placed after BDS multiplication.

FIGS. 21 and 22 show generalizations of the concepts introduced above regarding TAPA circuits with three input terminals. In general, we could use a BDS bus 310 with multiple distribution trees carrying signals upwards with different phases and multiple distributions trees carrying signals downwards with different phases. TAPA circuits with multiple inputs could be designed to use the signal distribution redundancy in the upwards and downwards directions to obtain highly accurate phase and magnitude tuning functionality.

Figure 18C:
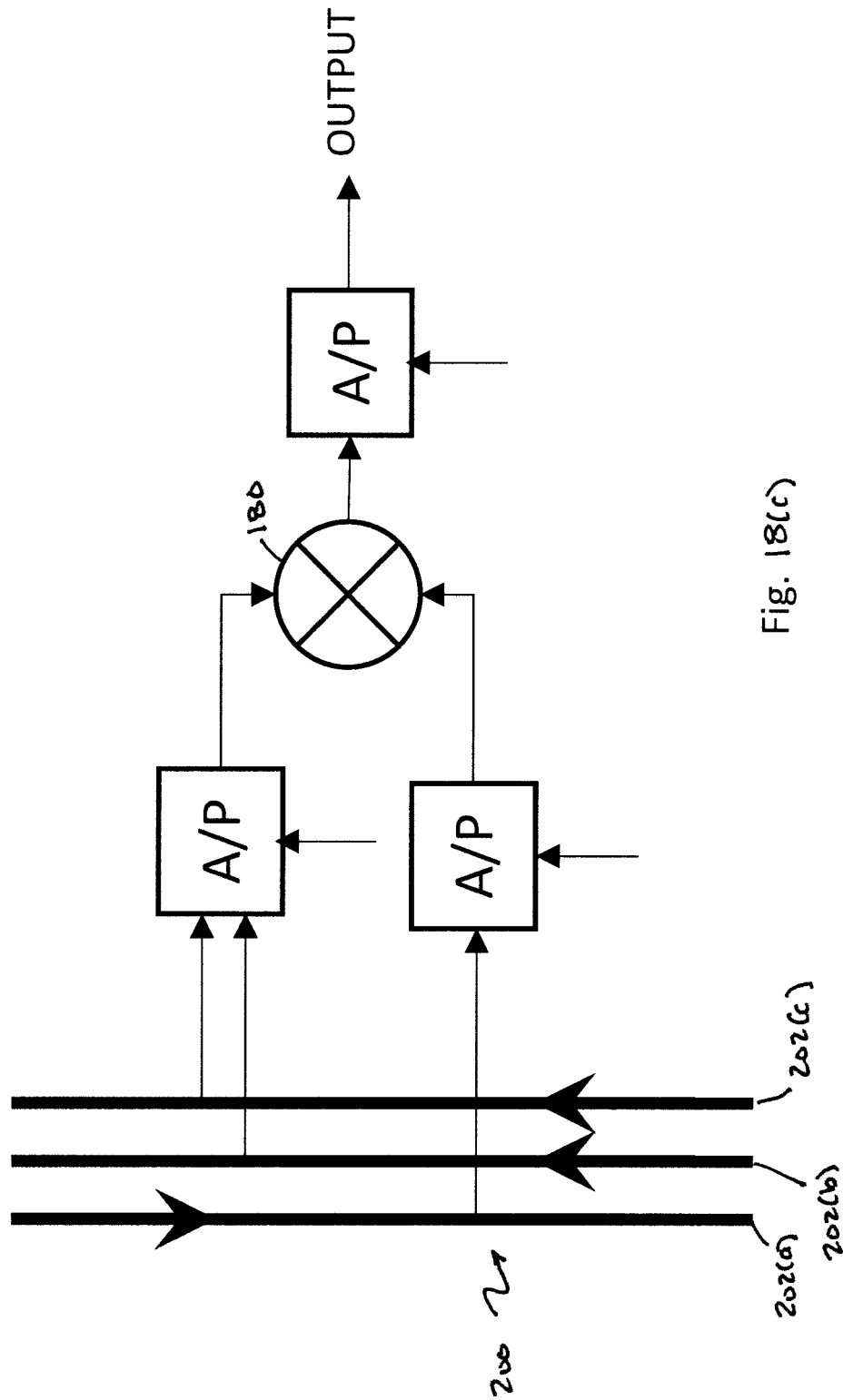
FIG. 18(c) depicts a schematic diagram of a TAPA circuit, which may be used in a phased-array antenna system, with one BDS multiplication, with two A/P-Setting circuits placed before BDS multiplication, one A/P-Setting circuit receiving two equal but phase shifted input signals, and with an A/P-Setting circuit placed after BDS multiplication.

For example, the TAPA circuit in FIG. 21 is a generalization of the TAPA circuit in FIG. 18(c). Rather than using an A/P-Setting circuit combining classical In-phase (I) and Quadrature (Q) signals as in FIG. 18(c), the TAPA circuit of FIG. 21 uses A/P-Setting circuits combining multiple phase signals. For example, the A/P-Setting circuit gets one of its inputs the signal from one of the trees carrying signals upward and the other of its inputs from any one of the other trees. This allows more possibilities of optimum signal combining for a desired output effect (e.g. generation of phase shifts and/or amplitude scaling). This optimum condition is defined when the A/P-Setting functionality is easiest to implement.

The TAPA circuit in FIG. 22 is a generalization of the TAPA circuit in FIG. 19. Like the previous discussion, the main benefit of this generalization is the use of multiple phasing to obtain optimum (easy) A/P-Setting circuits.

Using the BDS Bus for IF Receiver Signal Aggregation and Transport

Figure 15A:
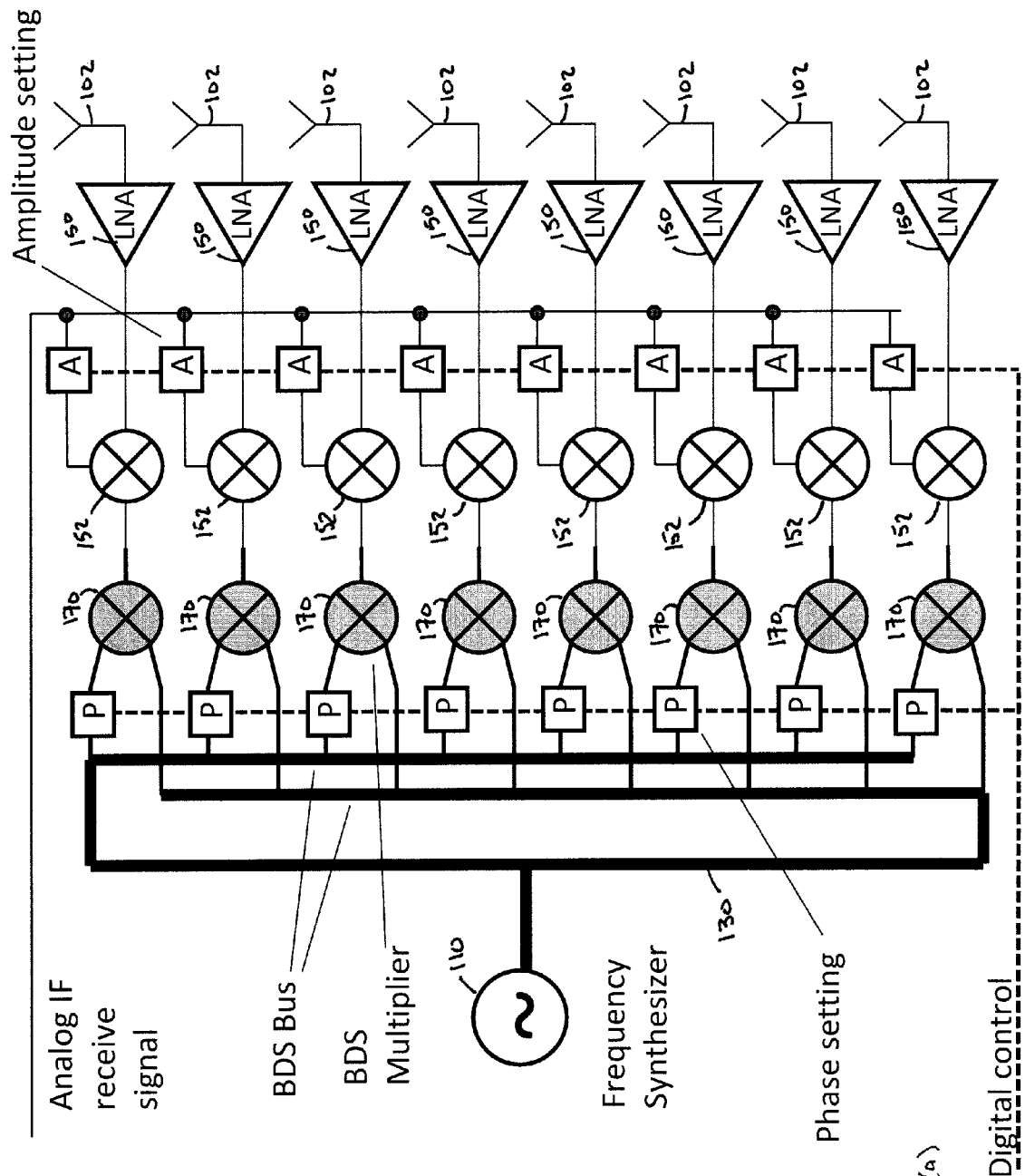
Figure 16A:
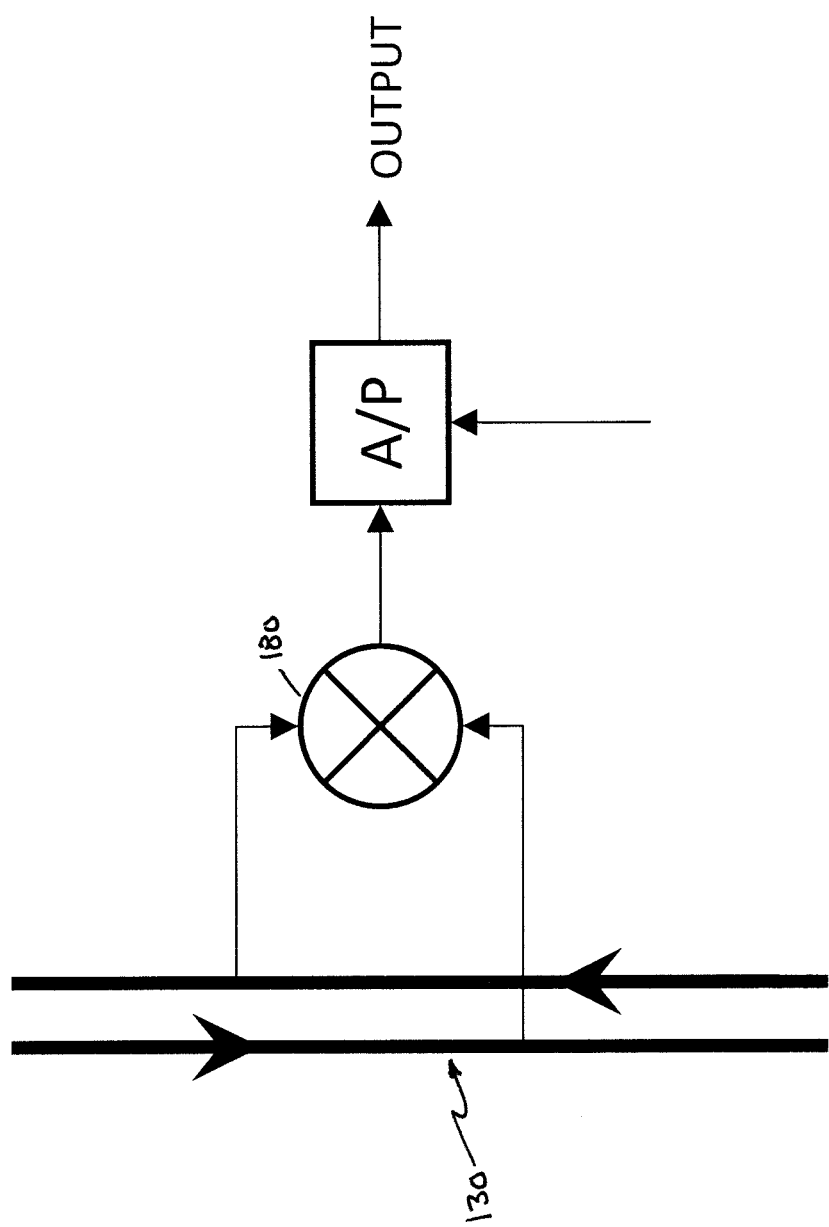
FIG. 16(a) depicts a schematic diagram of a TAPA circuit, which may be used in a phased-array antenna system, with a single BDS multiplication and with an A/P-Setting circuit placed after BDS multiplication.
Figure 16B:
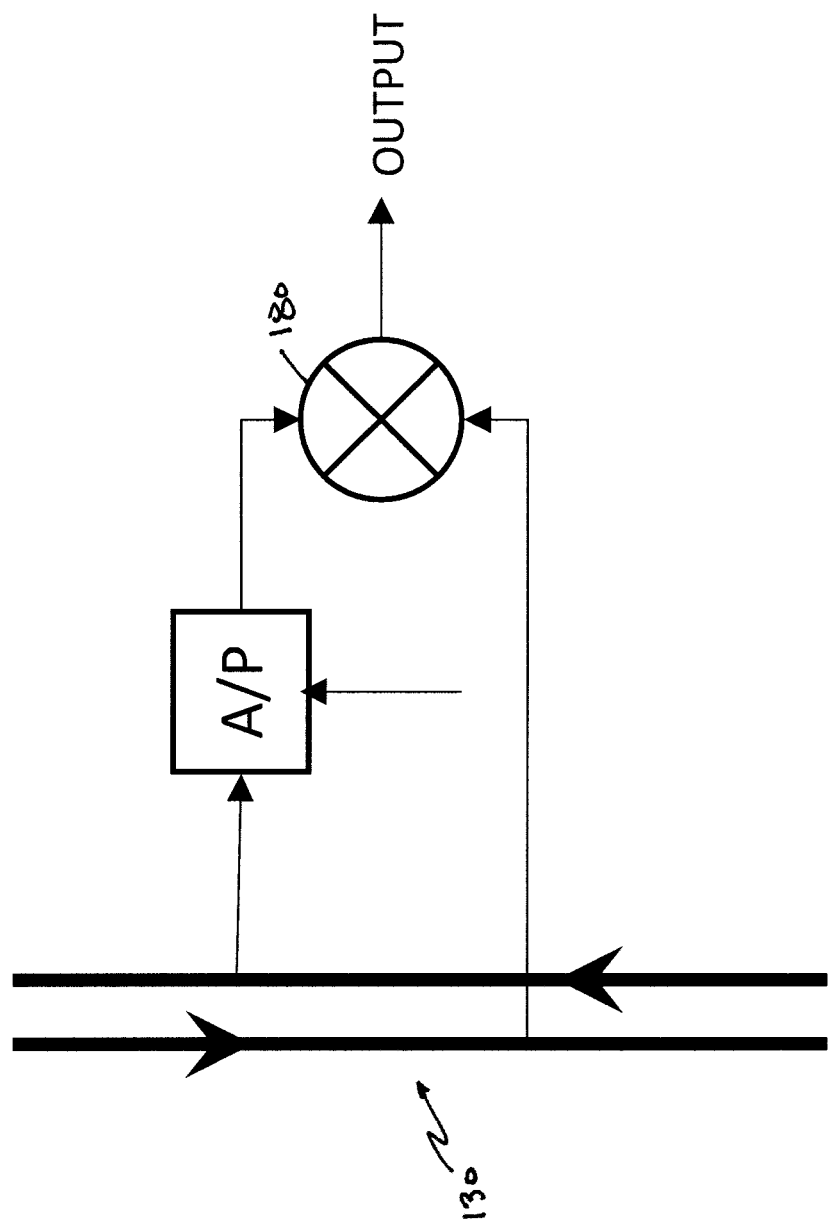
FIG. 16(b) depicts a schematic diagram of a TAPA circuit, which may be used in a phased-array antenna system, with a single BDS multiplication and with an A/P-setting circuit placed before BDS multiplication.
Figure 16C:
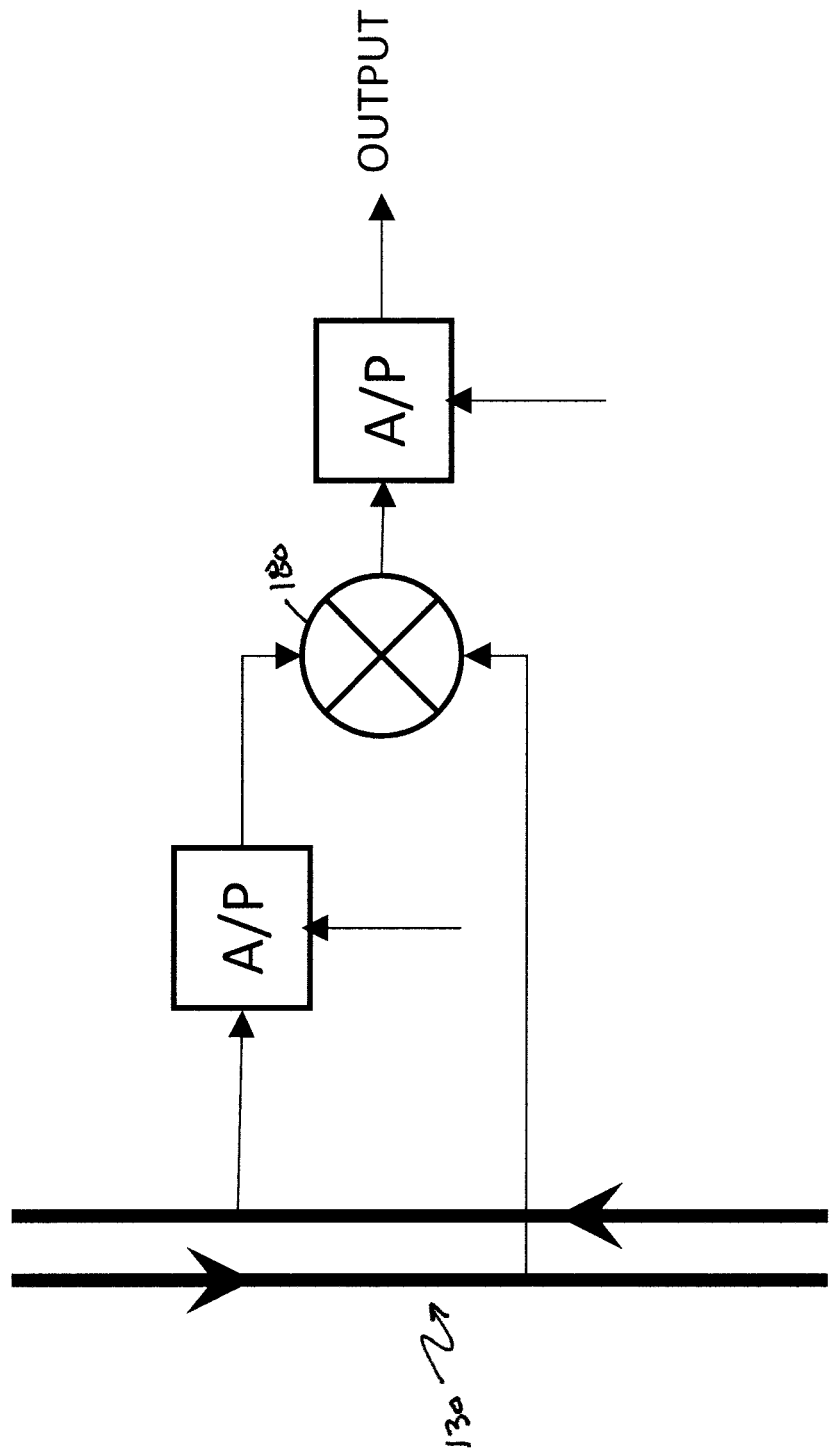
FIG. 16(c) depicts a schematic diagram of a TAPA circuit, which may be used in a phased-array antenna system, with a single BDS multiplication, with an A/P-Setting circuit placed before BDS multiplication and with another A/P-Setting circuit placed after BDS multiplication.
Figure 16D:
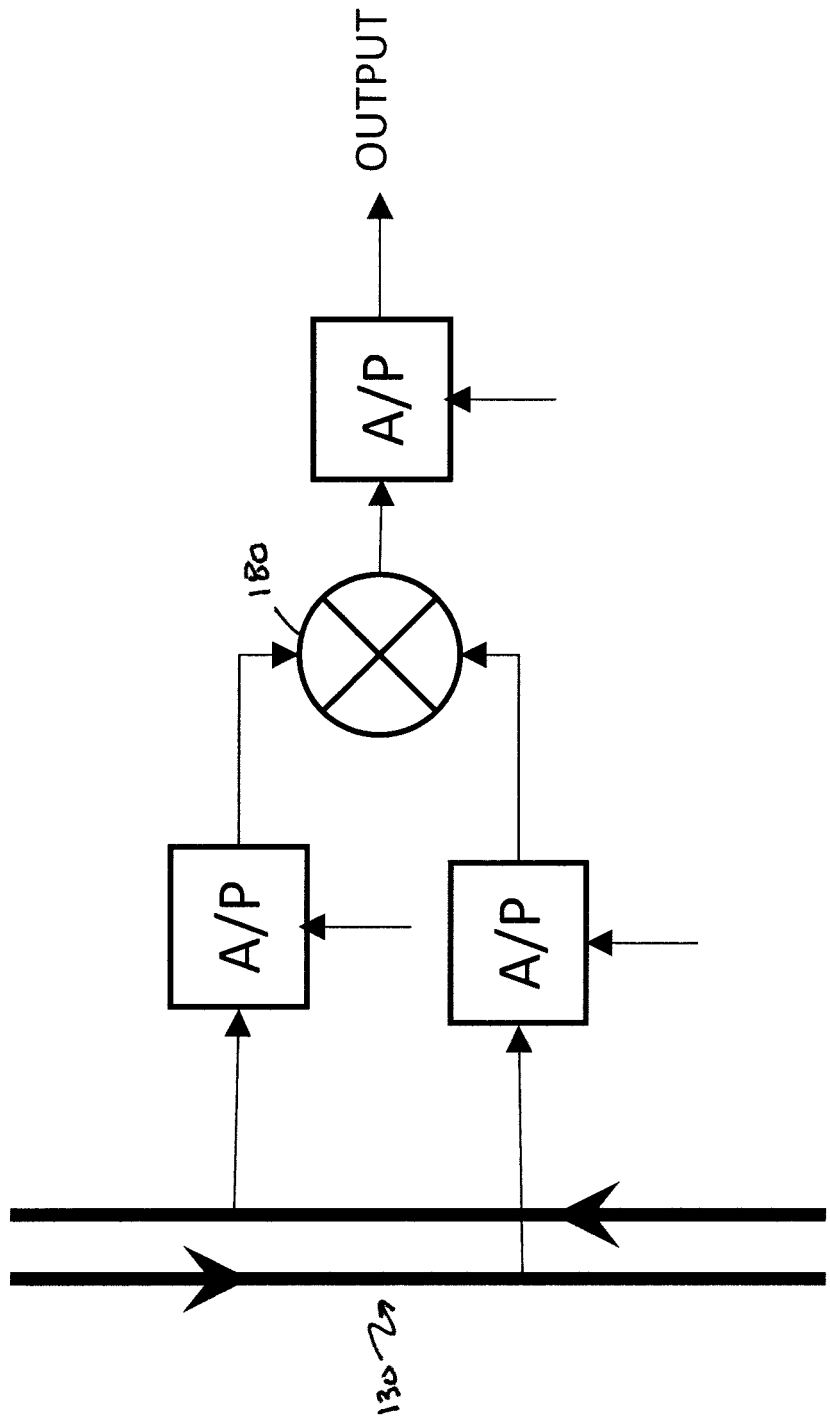
FIG. 16(d) depicts a schematic diagram of a TAPA circuit, which may be used in a phased-array antenna system, with a single BDS multiplication, with two A/P-Setting circuits placed before BDS multiplication and with an A/P-Setting circuit placed after BDS multiplication.

In the receiver circuits discussed above (e.g. FIGS. 14, 15(a)-(b)), the receiver IF signals are aggregated and transported on separate IF buses. The minimum number of wires for the IF bus is two as there are In-phase (I) and Quadrature (Q) IF signals, assuming of course in-phase and quadrature signals are used. In typical practical implementations, the IF buses will contain four wires, as differential designs are preferred. Two wires will be used to aggregate and carry the In-phase (I) differential IF signals and two wires will be used to aggregate and carry the Quadrature (Q) differential IF signals.

According to one aspect of this invention, each receiver in the array is connected to the BDS bus and to the IF bus. The minimum number of wires for the BDS bus is two (two signals traveling in opposite directions), assuming non-differential (also called single-ended) designs. However, in most practical cases the use of differential designs will require at least four wires (two wires for the differential BDS signals propagating in one direction and two wires for the differential BDS signals propagating in the opposite direction). Therefore, in non-differential designs each receiver will be connected to at least four wires (two for the BDS bus and two for the IF bus) and in differential designs each receiver will be connected to eight wires (four for the BDS bus and four for the IF bus). While routing eight wires on the board is well within the usual capabilities for system assembly, minimizing the number of wires is still desirable for cost reasons. Next, we show that the BDS signals and the IF signals can be transported on a single bus with four wires for differential designs and two wires for non-differential designs.

Figure 23:
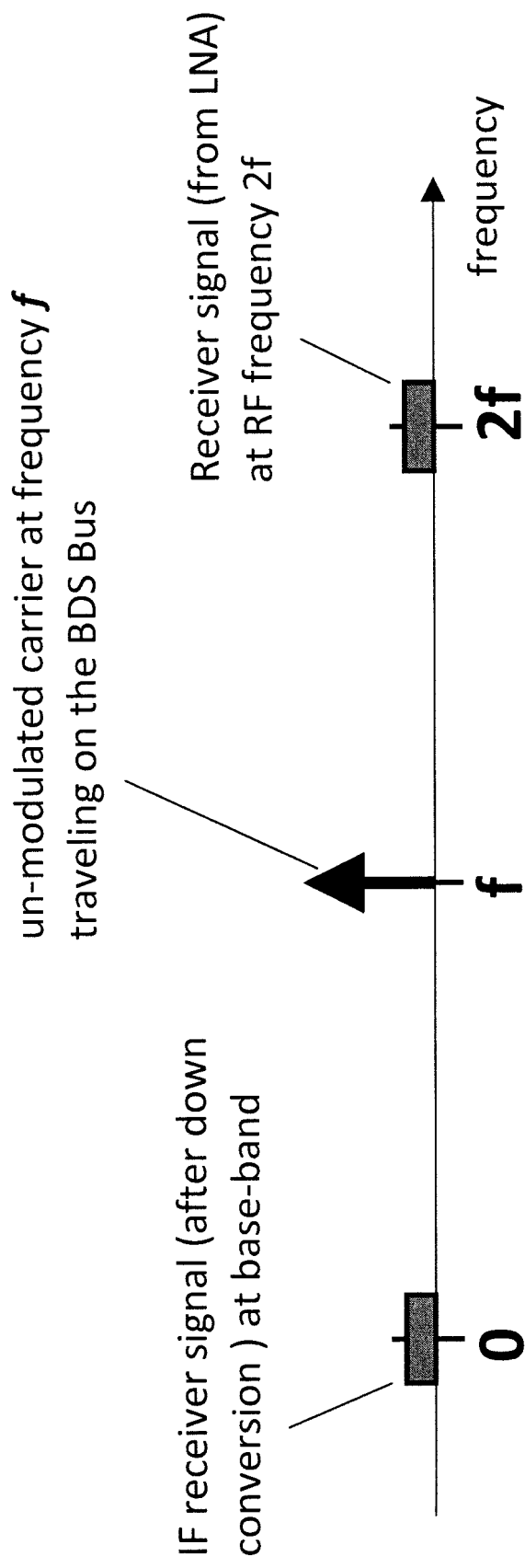
FIG. 23 depicts the frequency plan for the receivers in FIGS. 14, 15(a)-(b) assuming direct conversion.

FIG. 23 shows the typical frequency spectrum for the receivers described earlier (e.g. FIGS. 14, 15(a)-(b)) assuming direct conversion (zero IF), i.e., assuming that the RF signal coming from the antenna is converted to base-band in one step. Naturally, direct conversion requires I/Q processing. In other words, there will be two real IF signals (I and Q). It is common to call the I/Q signal pair a "Complex IF" signal. FIGS. 14, 15(a)-(b) involve complex IF signals, in general.

The BDS signals shown in FIG. 23 are at frequency f and the RF signal coming from the antenna is at frequency 2f. After direct conversion, the complex IF signal is at DC (zero frequency). So, clearly the various signals in this receiver system are widely separated in frequencies. Therefore, it is possible to combine them on the same transmission means (assuming a linear system) without producing mutual interference and with easy ways to separate them through frequency selective filters.

Figure 24A:
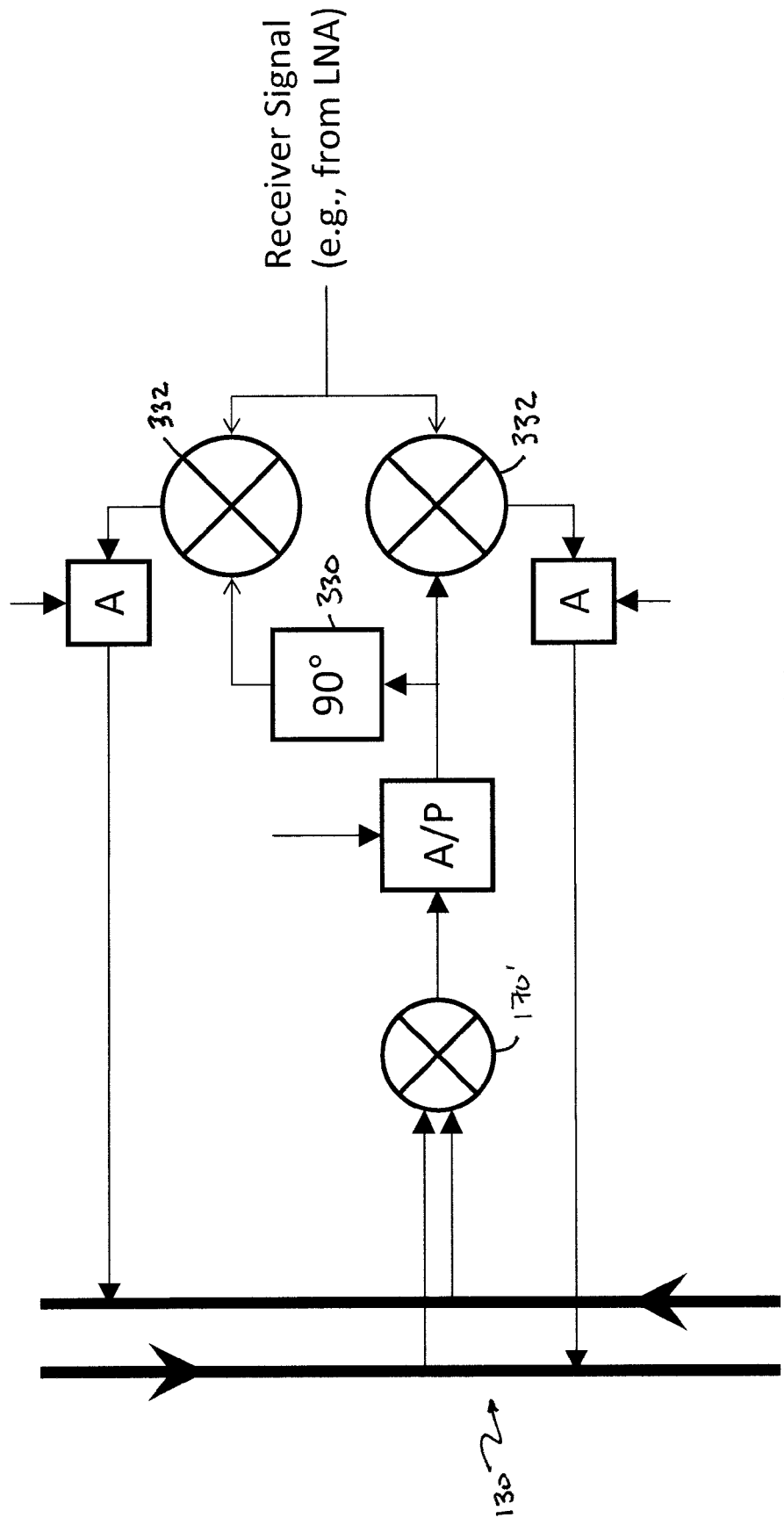
FIG. 24(a) depicts a receiver in which the BDS bus is used to carry BDS signals and aggregate and carry IF signals.

FIG. 24(a) illustrates the use of the BDS bus for complex IF signals aggregation and transport. The I and Q IF signals are simply dumped into the same BDS bus that supplies the upward and downward un-modulated carrier signals at frequency f. BDS multiplier 170' generates the synchronized carrier signal which passes through an A/P-Setting circuit. Since the BDS bus will contain IF signals at low frequencies, BDS multiplier 170' must be capable of rejecting these signals. This function is accomplished by the simple use of high-pass filters in the BDS multiplier inputs (not shown in the figure). Alternately, one could use a filter at the output of the BDS multiplier. The generation of complex IF signals is accomplished with the use of a 90 degree phase shifter 330, though other methods are also available for complex IF generation. Phase shifter 330 process the output of the A/P-Setting circuit to generate a carrier signal that is 90 degrees out of phase with the synchronized carrier signal. Using these two carrier signals, two receiver mixers 332 down-covert the received signal to generate an In-phase receiver intermediate frequency (IF) signal and a quadrature intermediate frequency (IF) signal. Each of the I and Q signals is then processed by a corresponding electronically controlled A-Setting circuit before it is dumped onto a respective one of the two networks in BDS bus 130.

Figure 24B:
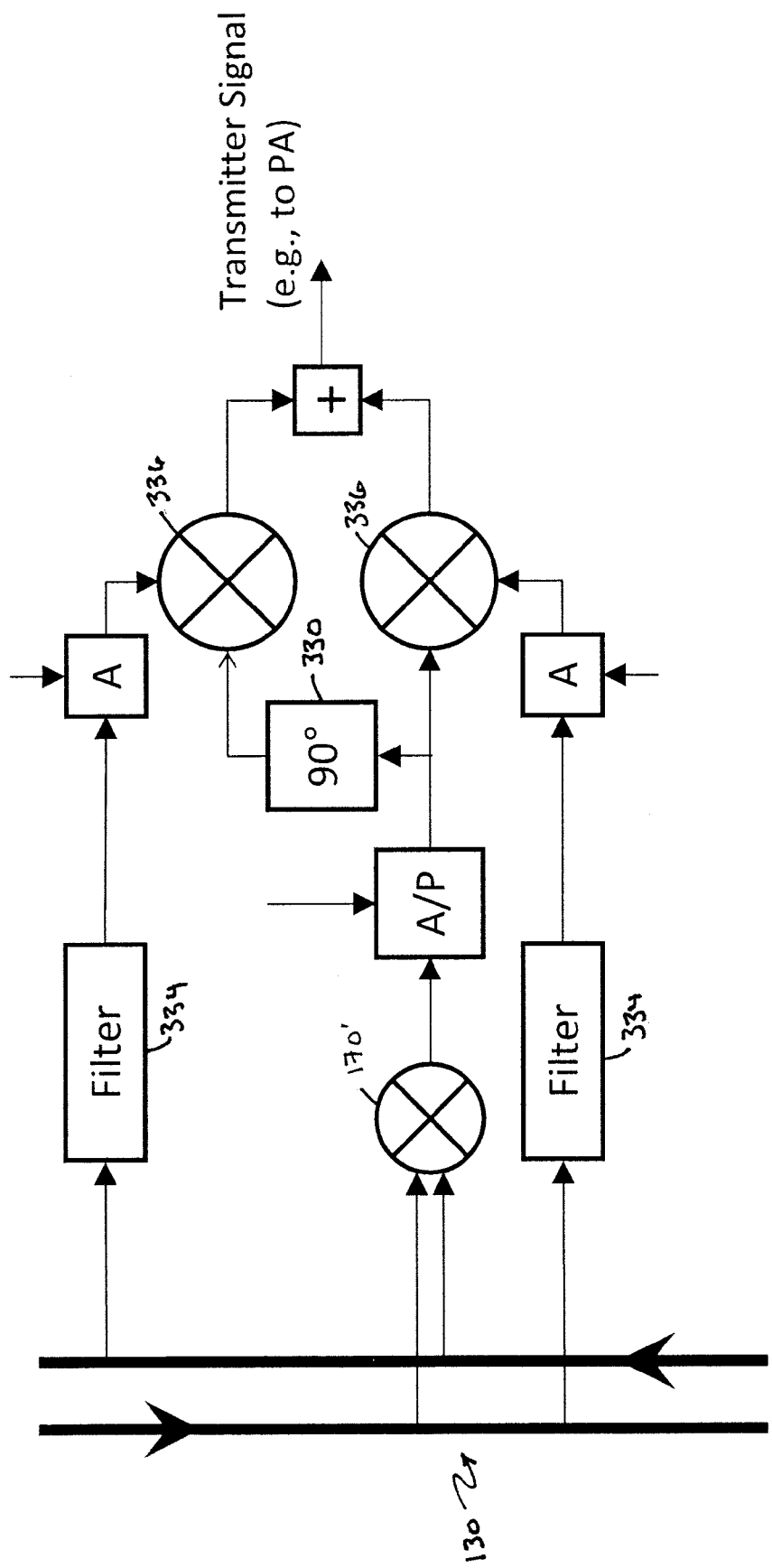
FIG. 24(b) depicts a transmitter in which the BDS bus is used to carry BDS signals and carry the transmitter IF signals.

The frequency plan in FIG. 23 is also valid for use in connection with the transmitter in FIG. 6, assuming direct conversion and the use of complex IF signals. Similar to the receiver case, it is possible to use BDS bus 130 to carry the transmitter complex IF signals, as shown in FIG. 24(b). Thus, one network of BDS bus 130 (e.g. the one carrying upward signals) carries the un-modulated carrier signal and the transmitter IF in-phase signal; and the other network (e.g. the one carrying downward signals) carries the un-modulated carrier signal and the transmitter IP quadrature signal. Additional filters 334 are necessary to eliminate the BDS carriers before applying the IF I/Q signals to up-conversion mixers 336. As in the receiver case, IF signal magnitude scaling may be performed with A-Setting circuits.

The receiver in FIG. 24(a) and the transmitter in FIG. 24(b) may be used simultaneously. In this case, an obvious variation would be to carry the complex transmitter IF signals on the receiver BDS bus and to carry the complex receiver IF signals on the transmitter BDS bus.

Figure 25:
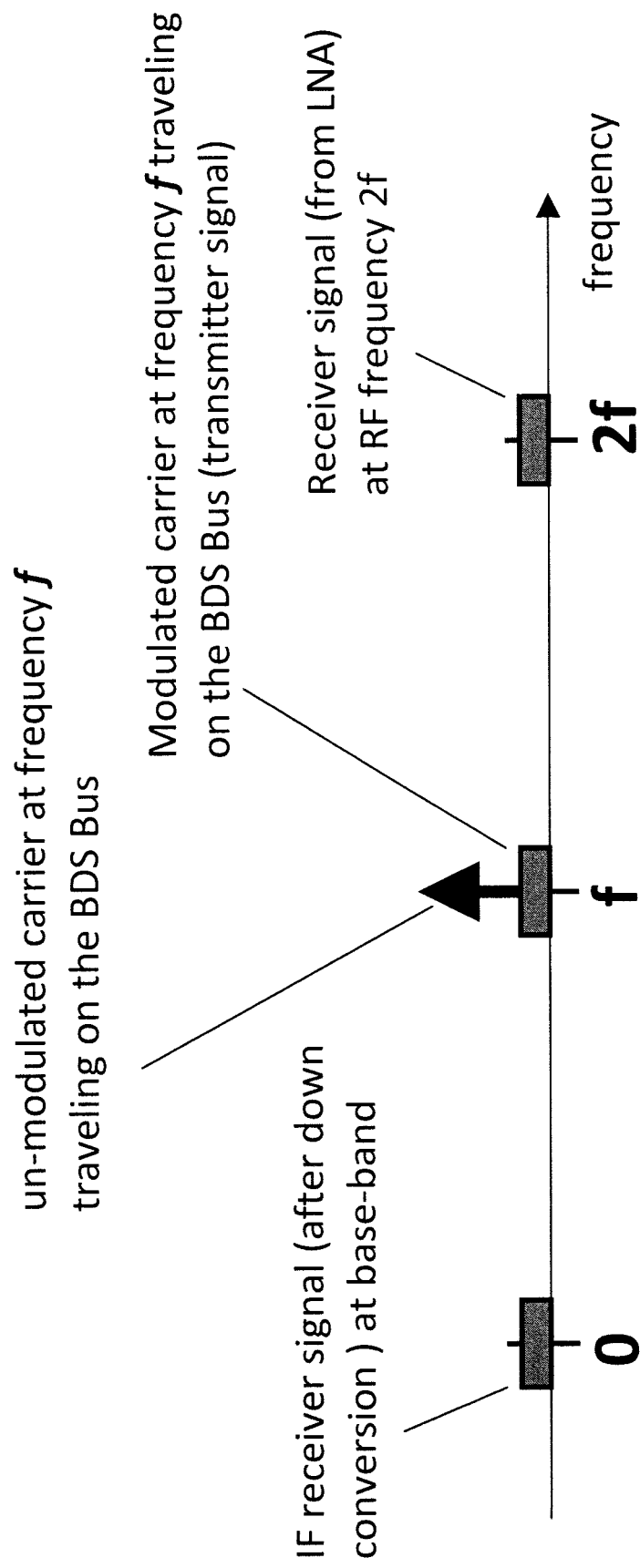
FIG. 25 depicts the frequency plan in FIG. 23 with modulated BDS signaling.
Figure 26:
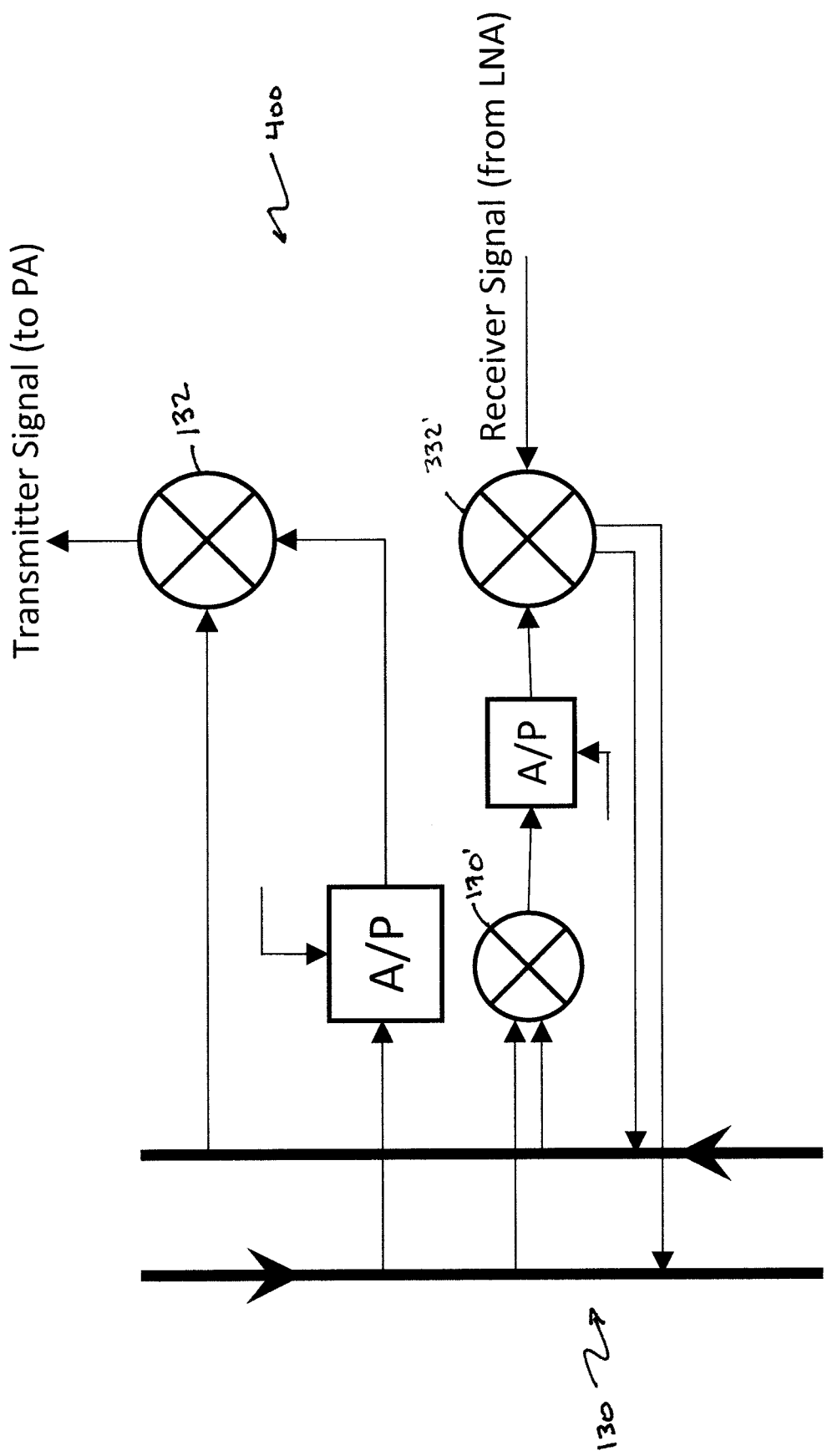
FIG. 26 depicts a TDD transceiver in which the BDS bus is used to carry modulated BDS signals and aggregate and carry IF signals.

FIG. 23 shows that at frequency f there is ample room to place a modulated signal, still very far in frequency from the ether signals. This suggests that the scheme in FIG. 24 could be combined with the up-conversion scheme in FIGS. 11(a)-(e). For example, FIG. 25 shows the placing of a transmitter modulated signal on one of the BDS lines. The corresponding transceiver circuit 400 is shown in FIG. 26. This is a transceiver operating in TDD (time division multiplexing) mode, i.e., the transmitter and the receiver portions operate at different times (not simultaneously). In transmitting mode, the circuit operates as the one in FIG. 11, while in receiver mode it operates as the one in FIG. 24.

In transceiver 400, BDS bus 130 has a first network or tree with the un-modulated carrier signal at frequency f traveling "downward" and a second network or tree with the modulated carrier signal (the IF signal) traveling "upward" during Tx mode and an un-modulated carrier at frequency f traveling "upward" in the Rx mode. The receiver side of the circuit may be structured as shown in FIGS. 15 and 24. It includes a BDS multiplier 170' for generating the synchronized carrier signal and a down conversion I/Q mixer pair 332' for generating the intermediate frequency (IF) I/Q signal pair with the I signal dumped onto the "upward" network and the Q signal dumped onto the "downward" network (or vice versa). As was explained in connection with the circuit shown in FIG. 24, BDS multiplier 170' includes filtering to block the IF signal that is also carried on the BDS bus. Also, note that A/P-Setting circuit is placed at the output of BDS multiplier 170' though, as should be apparent from the prior descriptions, A-Setting, P-Setting and/or A/P-Setting circuits could be placed in multiple other locations, depending on the performance requirements.

Figure 27:
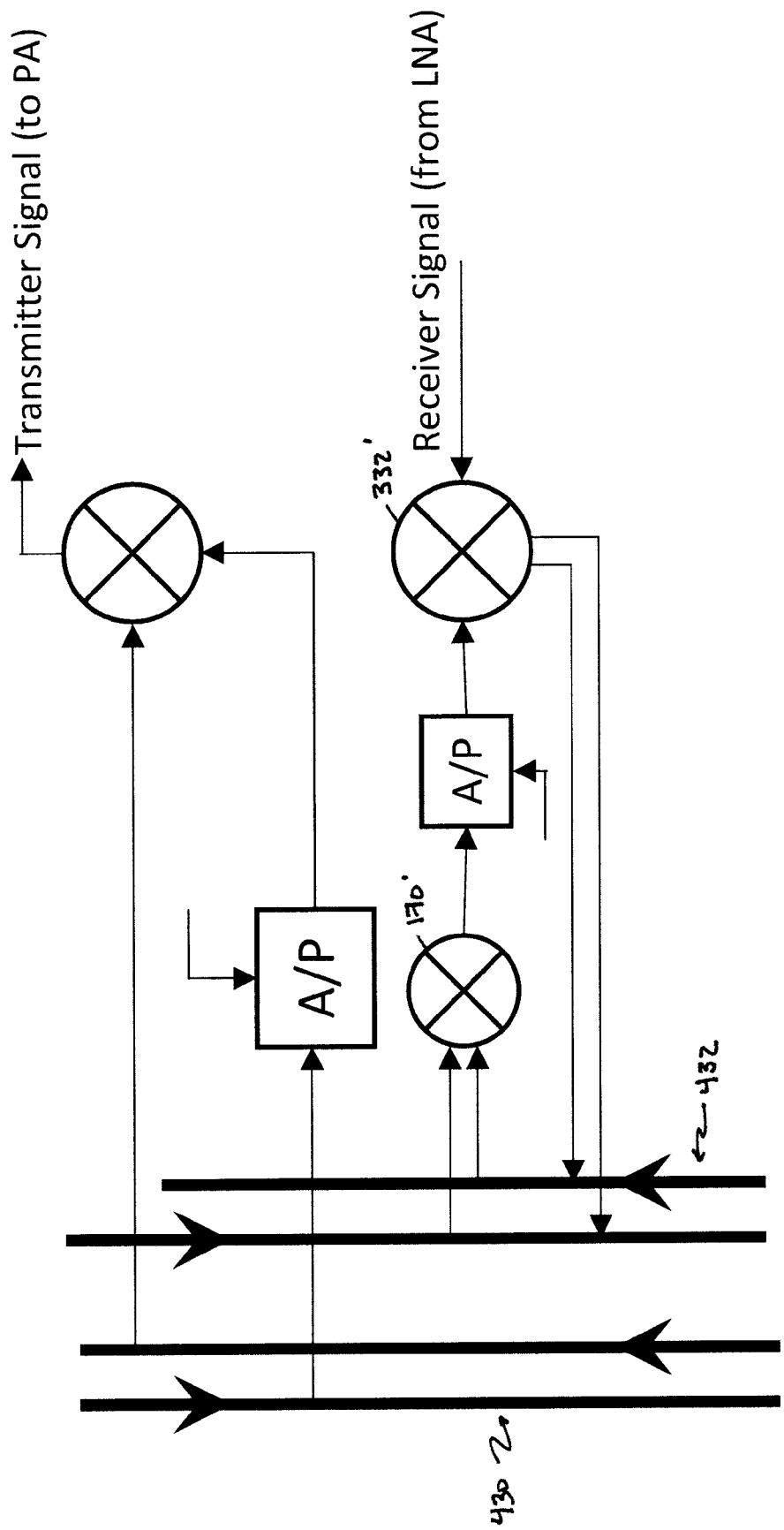
FIG. 27 depicts a FDD transceiver in which a first BDS bus is used to carry modulated BDS signals and a second BDS bus is used to aggregate and carry receiver IF signals The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the Figures.

The FDD (frequency division multiplexing) equivalent of the transceiver in FIG. 26 is shown in FIG. 27. In this case, the transmitter and the receiver operate at the same time but the receiver RF frequency is different from the transmitter RF frequency. Thus, there are two BDS buses 430 and 432, one for the receiver operating at frequency f1 (BDS bus 432) and one for the transmitter operating at frequency f2 (BDS bus 430). For direct up and direct down designs (one step frequency translation), f1 is at half receiver RF and f2 is at half transmitter RF. The description of the structure of the circuit shown in FIG. 27 is basically the same as the description of the circuit shown in FIG. 26, except for the use of two BDS buses, one for the transmitter side and the other for the receiver side.

The transceiver in FIG. 26 can be regarded as a "degenerate" form of the transceiver in FIG. 27 where the two BDS buses are merged into one. We observe that the transceiver in FIG. 26 may be used in FDD systems if additional filters are employed inside the circuit. This is possible theoretically because the various signals traveling on the two BDS buses on FIG. 27 do not overlap in frequency and can be separated with frequency-selective filters.

Other embodiments are within the following claims.

The invention claimed is:

1. A transmitter system for an array of antenna elements, said transmitter system comprising:
   a bidirectional signaling (BDS) network including a first network for carrying a first carrier signal and a second network for carrying a second carrier signal, and having a set of n phase synchronous location pairs $(a_i, b_i)$, each corresponding to a location $a_i$ on the first network and a location $b_i$ on the second network; and
   a plurality of tunable transmitter circuits, each for driving a corresponding different antenna element of the array of antenna elements, wherein each tunable transmitter circuit of the plurality of tunable transmitter circuits has an output line for carrying an output signal and first and second input lines electrically connected to the first and second networks of the BDS network at locations of a corresponding one of the set of phase synchronous location pairs, and comprises:
   a multiplier having a first input electrically connected to the first input line of that tunable transmitter circuit;
   a phase setting circuit having a control input for receiving a phase control signal, said phase setting circuit electrically connected to said multiplier for controlling the phase of the output signal of that tunable transmitter circuit; and
   an amplitude setting circuit after the multiplier and having a control input for receiving an amplitude control signal, said amplitude setting circuit for controlling the amplitude of the output signal of that tunable transmitter circuit.

2. The transmitter system of claim 1, wherein within each tunable transmitter circuit, the phase setting circuit is electrically connected to the multiplier within that tunable transmitter circuit to implement a configuration selected from the group consisting of a first configuration and a second configuration, the first configuration having said phase setting circuit between the first input line of the tunable transmitter circuit and the first input of said multiplier, and the second configuration having said phase setting circuit between the output of said multiplier and the output line of said tunable transmitter circuit.

3. The transmitter system of claim 1, wherein each tunable transmitter circuit of the plurality of tunable transmit circuits further comprises a power amplifier having an input electrically connected to the amplitude setting circuit within that tunable transmitter circuit and for providing a drive signal to the corresponding antenna element of the array of antenna elements.

4. The transmitter system of claim 1 for processing an IF transmit signal and wherein each tunable transmitter circuit of the plurality of tunable transmit circuits further comprises an up-conversion mixer having a first input for receiving a signal derived from the IF transmit signal, a second input for receiving a signal from the output of the multiplier in that tunable transmitter circuit, and an output for providing a signal to the output line of that tunable transmitter circuit.

5. The transmitter system of claim 4, wherein within each tunable transmitter circuit of the plurality of transmitter circuits the multiplier within that tunable transmitter circuit has a second input electrically connected to the second input of that tunable transmit circuit.

6. The transmitter system of claim 1, further comprising an up-conversion mixer for mixing the first carrier signal and an IF transmit signal to generate the second carrier signal on the second network of the BDS network.

7. The transmitter system of claim 6, wherein within each tunable transmitter circuit of the plurality of transmitter circuits the multiplier within that tunable transmitter circuit has a second input electrically connected to the second input of that tunable transmit circuit.

8. The transmitter system of claim 1 for processing an IF transmit signal and wherein each tunable transmitter circuit of the plurality of tunable transmitter circuits further comprises an up-conversion mixer with a first input electrically coupled to the output of the multiplier in that tunable transmit circuit, a second input for receiving the IF transmit signal, and an output electrically coupled to the amplitude setting circuit in that tunable transmit circuit.

9. The transmitter system of claim 1 for processing an IF transmit signal and wherein each tunable transmit circuit of the plurality of tunable transmit circuits (1) further comprises a second multiplier having an output, a first input, and a second input electrically connected to the second input line of that tunable transmit circuit, (2) wherein the first mentioned multiplier in that tunable transmit circuit has an output and a second input for receiving the IF transmit signal, and (3) wherein the first input of the second multiplier is electrically connected to the output of the first mentioned multiplier in that tunable transmit circuit.

10. A receiver system for an array of antenna elements, said receiver system comprising:
a bidirectional signaling (BDS) network including a first network for carrying a first carrier signal and a second network for carrying a second carrier signal, and having a set of n phase synchronous location pairs $(a_i, b_i)$, each corresponding to a location $a_i$ on the first network and a location $b_i$ on the second network; and a plurality of tunable receiver circuits, each for receiving input from a corresponding antenna element of the array of antenna elements, wherein each tunable receiver circuit of the plurality of tunable receiver circuits has an output line and first and second input lines electrically connected to the first and second networks of the BDS network at locations of a corresponding one of the phase synchronous location pairs, and comprises:
a multiplier having a first input electrically connected to the first input line of that tunable receiver circuit and having an output;
a phase setting circuit having a control input for receiving a phase control signal for controlling phase of a signal passing through the phase setting circuit, said phase setting circuit electrically connected to said multiplier;
a mixer having a first input for receiving a signal from the corresponding antenna element of the array of antenna elements, a second input for receiving a local carrier signal obtained from the BDS network, and an output; and
an amplitude setting circuit having an input, an output, and a control input for receiving an amplitude control signal for controlling amplitude of a signal passing through the amplitude setting circuit, said amplitude setting circuit connected to one of the mixer for that tunable receiver circuit and the multiplier for that tunable receiver circuit.

11. The receiver system of claim 10, wherein within each tunable receiver circuit of the plurality of tunable receiver circuits, the phase setting circuit is electrically connected to the multiplier within that tunable receiver circuit to implement a configuration selected from the group consisting of a first configuration and a second configuration, the first configuration having said phase setting circuit between the first input line of the tunable receiver circuit and the first input of said multiplier, and the second configuration having said phase setting circuit electrically connected to the output of said multiplier.

12. The receiver system of claim 10, wherein each tunable receiver circuit of the plurality of tunable receiver circuits further comprises a low noise amplifier having an input for receiving a signal from the corresponding antenna element of the plurality of antenna elements and an output electrically connected to the first input of the mixer in that tunable receiver circuit.

13. The receiver system of claim 10, wherein within each tunable receiver circuit of the plurality of receiver circuits the multiplier within that tunable receiver circuit has a second input electrically connected to the second input of that tunable receiver circuit.

14. The receiver system of claim 10, wherein within each tunable receiver circuit of the plurality of tunable receiver circuits, the second input of the mixer for that tunable receiver circuit is electrically connected to the output of the multiplier for that tunable receiver circuit.

15. The receiver system of claim 1, wherein within each tunable receiver circuit of the plurality of tunable receiver circuits the input of the amplitude setting circuit in that tunable receiver circuit is electrically connected to the output of the mixer in that tunable receiver circuit.

16. The receiver system of claim 15, further comprising a receive signal line and wherein within each tunable receiver circuit of the plurality of tunable receiver circuits the output of the amplitude setting circuit in that tunable receiver circuit is electrically connected to the receive signal line.

17. The receiver system of claim 10, wherein within each tunable receiver circuit of the plurality of tunable receiver circuits the output of the amplitude setting circuit for that tunable receiver circuit is electrically connected to one of the first and second networks of the BDS network.

18. The receiver system of claim 1, wherein within each tunable receiver circuit of the plurality of tunable receiver circuits the second input of the mixer for that tunable receiver circuit is electrically connected to the second input line of that tunable receiver circuit.

19. The receiver system of claim 18, wherein within each tunable receiver circuit of the plurality of tunable receiver circuits the second input of the multiplier in that tunable receiver circuit is electrically connected to the output of the mixer in that tunable receiver circuit.

20. The receiver system of claim 19, wherein within each tunable receiver circuit of the plurality of tunable receiver circuits the output of the multiplier for that tunable receiver circuit is electrically coupled to the input of the amplitude setting circuit for that tunable receiver circuit.

21. The receiver system of claim 20, wherein within each tunable receiver circuit of the plurality of tunable receiver circuits the output of the amplitude setting circuit for that tunable receiver circuit is electrically connected to one of the first and second networks of the BDS network.

22. A transceiver system for an array of antenna elements, said transceiver system comprising:
- a bidirectional signaling (BDS) network including a first network for carrying a first carrier signal and a second network for carrying a second carrier signal, and having a set of n phase synchronous location pairs $(a_i, b_i)$, each corresponding to a location $a_i$ on the first network and a location $b_i$ on the second network;
- an up-conversion mixer for mixing the first carrier signal and an IF transmit signal to generate the second carrier signal on the second network of the BDS network; and
- a plurality of transceiver circuits, each for connecting to a corresponding different antenna element of the array of antenna elements and each transceiver circuit comprising:
  (1) a transmitter circuit for driving the corresponding antenna element of the array of antenna elements, said transceiver circuit having an output line for carrying an output signal and first and second input lines electrically connected to the first and second networks of the BDS network at locations of a corresponding one of the set of phase synchronous location pairs, and comprising a multiplier having a first input electrically connected to the first input line of that transmitter circuit; and
  (2) a receiver circuit for receiving input from the corresponding antenna element of the array of antenna elements, said receiver circuit having an output line and first and second input lines electrically connected to the first and second networks of the BDS network at locations of a corresponding one of the phase synchronous location pairs, and comprising:
    (a) a multiplier having a first input electrically connected to the first input line of that receiver circuit and having an output; and
    (b) a mixer having a first input for receiving a signal from the corresponding antenna element of the array of antenna elements, a second input for receiving a local carrier signal obtained from the BDS network, and an output.

23. The transceiver system of claim 22, wherein within each transceiver circuit of the plurality of transceiver circuits, the output line of the receiver circuit in that transceiver circuit is electrically connected to one of the first and second networks of the BDS network.

24. The transceiver system of claim 22, wherein within each transceiver circuit of the plurality of transceiver circuits, the transmitter circuit further comprises:
- a phase setting circuit having a control input for receiving a phase control signal, said phase setting circuit electrically connected to the multiplier in that transmitter circuit for controlling the phase of the output signal of that transmitter circuit; and
- an amplitude setting circuit after the multiplier in that transmitter circuit and having a control input for receiving an amplitude control signal, said amplitude setting circuit for controlling the amplitude of the output signal of that transmitter circuit.

25. The transceiver system of claim 22, wherein within each transceiver circuit of the plurality of transceiver circuits, the receiver circuit further comprises:
- a phase setting circuit having a control input for receiving a phase control signal, said phase setting circuit electrically connected to the multiplier in that receiver circuit for controlling phase of the output signal of the receiver circuit;
- an amplitude setting circuit electrically connected to the output of the mixer in that receiver circuit and having a control input for receiving an amplitude control signal.

26. The transceiver system of claim 25, wherein within each transceiver circuit of the plurality of transceiver circuits the output of the amplitude setting circuit within the receiver circuit for that transceiver circuit is electrically connected to one of the first and second networks of the BDS network.

27. A transceiver system for an array of antenna elements, said transceiver system comprising:
- a bidirectional signaling (BDS) network including a first network for carrying a first carrier signal and a second network for carrying a second carrier signal, and having a set of n phase synchronous location pairs $(a_i, b_i)$, each corresponding to a location $a_i$ on the first network and a location $b_i$ on the second network; and
- a plurality of transceiver circuits, each for connecting to a corresponding different antenna element of the array of antenna elements and each transceiver circuit comprising:
  (1) a transmitter circuit for driving the corresponding antenna element of the array of antenna elements, said transceiver circuit having an output line for carrying an output signal and first and second input lines electrically connected to the first and second networks of the BDS network at locations of a corresponding one of the set of phase synchronous location pairs, and comprising a multiplier having a first input electrically connected to the first input line of that transmitter circuit; and
  (2) a receiver circuit for receiving input from the corresponding antenna element of the array of antenna elements, said receiver circuit having an output line electrically connected to one of the first and second networks of the BDS network and first and second input lines electrically connected to the first and second networks of the BDS network at locations of a corresponding one of the phase synchronous location pairs, and comprising:
    (a) a multiplier having a first input electrically connected to the first input line of that receiver circuit and having an output; and
    (b) a mixer having a first input for receiving a signal from the corresponding antenna element of the array of antenna elements, a second input for receiving a local carrier signal obtained from the BDS network, and an output.

* * * * *